(12) United States Patent
Wang et al.

(10) Patent No.: US 12,213,128 B2
(45) Date of Patent: Jan. 28, 2025

(54) TECHNIQUES FOR TRANSMITTING HYBRID AUTOMATIC REPEAT REQUEST FEEDBACK

(71) Applicant: QUALCOMM Incorporated, San Diego, CA (US)

(72) Inventors: Xiao Feng Wang, San Diego, CA (US); Peter Gaal, San Diego, CA (US); Alberto Rico Alvarino, San Diego, CA (US); Liangping Ma, San Diego, CA (US); Alexei Yurievitch Gorokhov, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/735,631

(22) Filed: May 3, 2022

(65) Prior Publication Data

US 2022/0361197 A1 Nov. 10, 2022

Related U.S. Application Data

(60) Provisional application No. 63/185,936, filed on May 7, 2021.

(51) Int. Cl.
*H04W 4/00* (2018.01)
*H04L 1/1812* (2023.01)
(Continued)

(52) U.S. Cl.
CPC ....... *H04W 72/1263* (2013.01); *H04L 1/1812* (2013.01); *H04L 5/0053* (2013.01); *H04W 72/0446* (2013.01); *H04W 72/23* (2023.01)

(58) Field of Classification Search
CPC ............. H04W 72/1263; H04W 72/23; H04W 72/0446; H04L 1/1812; H04L 5/0053
See application file for complete search history.

(56) References Cited

U.S. PATENT DOCUMENTS

2019/0313386 A1* 10/2019 Hwang ................. H04L 5/0094
2022/0022237 A1* 1/2022 Kim ..................... H04B 7/0408
(Continued)

OTHER PUBLICATIONS

Nokia, et al., "Reliability Improvements for RRC_Connected UEs", 3GPP Draft, 3GPP TSG RAN WG1 Meeting #104bis-e, R1-2102656, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 6, 2021 (Apr. 6, 2021), XP051993178, 30 Pages.
(Continued)

*Primary Examiner* — Abdelnabi O Musa
(74) *Attorney, Agent, or Firm* — Holland & Hart LLP

(57) ABSTRACT

Methods, systems, and devices for wireless communications are described. A user equipment (UE) may receive an indication of a codebook type for transmitting hybrid automatic repeat request (HARQ) feedback by the UE to a second device (e.g., a network device, a satellite, or a base station). The indication of the codebook type may indicate a HARQ feedback transmission configuration, such as a static HARQ feedback transmission configuration. The HARQ transmission configuration may be associated with a one bit or two bit HARQ codebook. The UE may receive a scheduled downlink shared channel transmission, and attempt to decode the received downlink shared channel transmission. The UE may transmit (or refrain from transmitting) the HARQ feedback based on the decoding of the scheduled downlink shared channel transmission and in accordance with the feedback mode.

30 Claims, 16 Drawing Sheets

(51) Int. Cl.
  *H04L 5/00* (2006.01)
  *H04W 72/0446* (2023.01)
  *H04W 72/1263* (2023.01)
  *H04W 72/23* (2023.01)

(56) References Cited

U.S. PATENT DOCUMENTS

| | | | |
|---|---|---|---|
| 2022/0264614 A1* | 8/2022 | Yu | H04W 72/23 |
| 2022/0361218 A1* | 11/2022 | He | H04L 5/0053 |
| 2024/0032031 A1* | 1/2024 | Yi | H04L 1/1896 |
| 2024/0064765 A1* | 2/2024 | Zhu | H04L 5/0055 |
| 2024/0260116 A1* | 8/2024 | Ying | H04B 7/1853 |

OTHER PUBLICATIONS

Partial International Search Report—PCT/US2022/027673—ISA/EPO—Aug. 1, 2022 (2104282WO).
VIVO: "Discussion on Mode 1 Resource Allocation Mechanism", 3GPP Draft, 3GPP TSG RAN WG1 Meeting #98bis, R1-1911419, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 13, 2019 (Oct. 13, 2019), XP051800859, 15 Pages.
International Search Report and Written Opinion—PCT/US2022/027673—ISA/EPO—Oct. 28, 2022 (2104282WO).
Lenovo, et al., "HARQ-ACK Feedback Enhancement for lIoT/URLLC", 3GPP TSG RAN WG1 #104bis-e, R1-2103610, 3rd Generation Partnership Project, Mobile Competence Centre, 650, route des lucioles, f-06921 Sophia-Antipolis Cedex, France, vol. RAN WG1, No. e-Meeting, Apr. 12, 2021-Apr. 20, 2021, 6 Pages, Apr. 7, 2021, XP052178301, p. 3-p. 4.
Moderator (Mediatek): "Summary for [104b-e-NR-7.1CRs-01] Clarification on DAI Size in DCI Format 1_1 for CA", 3GPP TSG RAN WG1 Meeting #104bis, R1-2104009, 3rd Generation Partnership Project, Mobile Competence Centre, 650, Route Des Lucioles, F-06921, Sophia-Antipolis Cedex, France, vol. RAN WG1, No. e-Meeting, Apr. 12, 2021-Apr. 20, 2021, Apr. 19, 2021, XP051996130, p. 2.

* cited by examiner

TECHNIQUES FOR TRANSMITTING HYBRID AUTOMATIC REPEAT REQUEST FEEDBACK

CROSS REFERENCE

The present application for patent claims the benefit of U.S. Provisional Patent Application No. 63/185,936 by WANG et al., entitled "TECHNIQUES FOR TRANSMITTING HYBRID AUTOMATIC REPEAT REQUEST FEEDBACK," filed May 7, 2021, assigned to the assignee hereof, and expressly incorporated by reference herein.

INTRODUCTION

The following relates to wireless communications, including techniques for transmitting feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving an indication of a codebook type for transmitting hybrid automatic repeat request (HARQ) feedback, the indication of the codebook type indicating a static HARQ feedback codebook, where the indicated static HARQ feedback codebook is associated with a fixed codebook size, receiving a downlink shared message, and transmit the HARQ feedback based on a decoding result of the received downlink shared message and in accordance with the codebook type.

An apparatus for wireless communications at a UE is described. The apparatus may include a processor, and memory coupled with the processor. The processor may be configured receive an indication of a codebook type for transmitting HARQ feedback, the indication of the codebook type indicating a static HARQ feedback codebook, where the indicated static HARQ feedback codebook is associated with a fixed codebook size, receive a downlink shared message, and transmit the HARQ feedback based on a decoding result of the received downlink shared message and in accordance with the codebook type.

Another apparatus for wireless communications at a UE is described. The apparatus may include means for receiving an indication of a codebook type for transmitting HARQ feedback, the indication of the codebook type indicating a static HARQ feedback codebook, where the indicated static HARQ feedback codebook is associated with a fixed codebook size, means for receiving a downlink shared message, and means for transmit the HARQ feedback based on a decoding result of the received downlink shared message and in accordance with the codebook type.

A non-transitory computer-readable medium storing code for wireless communications at a UE is described. The code may include instructions executable by a processor to receive an indication of a codebook type for transmitting HARQ feedback, the indication of the codebook type indicating a static HARQ feedback codebook, where the indicated static HARQ feedback codebook is associated with a fixed codebook size, receive a downlink shared message, and transmit the HARQ feedback based on a decoding result of the received downlink shared message and in accordance with the codebook type.

Some examples of the method, apparatuses, and non-transitory computer-readable medium described herein may further include operations, features, means, or instructions for transmitting a positive acknowledgement that the UE successfully decoded the received downlink shared message.

Some examples of the method, apparatuses, and non-transitory computer-readable medium described herein may further include operations, features, means, or instructions for determining that the UE unsuccessfully decoded a second downlink shared message and determining to refrain from transmitting a second HARQ feedback transmission based on the second downlink shared message being unsuccessfully decoded.

Some examples of the method, apparatuses, and non-transitory computer-readable medium described herein may further include operations, features, means, or instructions for receiving a first downlink control message, the first downlink control message associated with the received downlink shared message and decoding the received first downlink control message, where the HARQ feedback may be based on the received first downlink control message being successfully decoded and the received downlink shared message being successfully decoded.

Some examples of the method, apparatuses, and non-transitory computer-readable medium described herein may further include operations, features, means, or instructions for decoding a second received downlink control message, second the received downlink control message associated with a second downlink shared message, determining that the UE unsuccessfully decoded the second downlink shared message, and transmitting a second HARQ feedback based on the second downlink shared message being unsuccessfully decoded and the second received downlink control message being successfully decoded, the second HARQ feedback including a negative acknowledgement.

In some examples of the method, apparatuses, and non-transitory computer-readable medium described herein, the codebook type may be associated with a one bit HARQ feedback size for the HARQ feedback by the UE.

Some examples of the method, apparatuses, and non-transitory computer-readable medium described herein may further include operations, features, means, or instructions for receiving a first message that indicates a first set of resources for the HARQ feedback associated with the downlink shared message and a second message that indicates a second set of resources for a second HARQ feedback associated with a second downlink shared message, the first set of resources and the second set of resources associated with unique time resources.

Some examples of the method, apparatuses, and non-transitory computer-readable medium described herein may further include operations, features, means, or instructions for receiving a first message that indicates a first set of resources for the HARQ feedback associated with the downlink shared message and a second message that indicates a second set of resources for a second HARQ feedback associated with a second downlink shared message, the first set of resources and the second set of resources overlapping in time and determining an error associated with the first set of resources and the second set of resources based on the first set of resources and the second set of resources overlapping in time.

In some examples of the method, apparatuses, and non-transitory computer-readable medium described herein, transmitting the HARQ feedback may include operations, features, means, or instructions for transmitting an uplink control message including the HARQ feedback.

In some examples of the method, apparatuses, and non-transitory computer-readable medium described herein, receiving the indication of the codebook type may include operations, features, means, or instructions for receiving a radio resource control (RRC) message including the indication of the codebook type.

A method for wireless communications at a UE is described. The method may include receiving an indication of a codebook type for HARQ feedback, the codebook type indicating a HARQ codebook size and usage of downlink assignment index counters included in downlink control information (DCI), receiving one or more downlink assignment index counters that indicate a total number of scheduled downlink shared messages, receiving the scheduled downlink shared messages, and transmitting the HARQ feedback based on a decoding result of the received scheduled downlink shared messages, the received downlink assignment index counter, and in accordance with the codebook type.

An apparatus for wireless communications at a UE is described. The apparatus may include a processor, and memory coupled with the processor. The processor may be configured to receive an indication of a codebook type for HARQ feedback, the codebook type indicating a HARQ codebook size and usage of downlink assignment index counters included in DCI, receive one or more downlink assignment index counters that indicate a total number of scheduled downlink shared messages, receive the scheduled downlink shared messages, and transmit the HARQ feedback based on a decoding result of the received scheduled downlink shared messages, the received downlink assignment index counter, and in accordance with the codebook type.

Another apparatus for wireless communications at a UE is described. The apparatus may include means for receiving an indication of a codebook type for HARQ feedback, the codebook type indicating a HARQ codebook size and usage of downlink assignment index counters included in DCI, means for receiving one or more downlink assignment index counters that indicate a total number of scheduled downlink shared messages, means for receiving the scheduled downlink shared messages, and means for transmitting the HARQ feedback based on a decoding result of the received scheduled downlink shared messages, the received downlink assignment index counter, and in accordance with the codebook type.

A non-transitory computer-readable medium storing code for wireless communications at a UE is described. The code may include instructions executable by a processor to receive an indication of a codebook type for HARQ feedback, the codebook type indicating a HARQ codebook size and usage of downlink assignment index counters included in DCI, receive one or more downlink assignment index counters that indicate a total number of scheduled downlink shared messages, receive the scheduled downlink shared messages, and transmit the HARQ feedback based on a decoding result of the received scheduled downlink shared messages, the received downlink assignment index counter, and in accordance with the codebook type.

In some examples of the method, apparatuses, and non-transitory computer-readable medium described herein, the HARQ codebook size may be equal to one bit.

Some examples of the method, apparatuses, and non-transitory computer-readable medium described herein may further include operations, features, means, or instructions for transmitting a positive acknowledgement based on the decoding result of the scheduled downlink shared messages being successful, where the positive acknowledgement includes the one bit.

Some examples of the method, apparatuses, and non-transitory computer-readable medium described herein may further include operations, features, means, or instructions for determining that the UE unsuccessfully decoded at least one downlink shared message of a second set of scheduled downlink shared messages and transmitting a negative acknowledgement based on the at least one downlink shared message being unsuccessfully decoded, where the negative acknowledgement includes the one bit.

Some examples of the method, apparatuses, and non-transitory computer-readable medium described herein may further include operations, features, means, or instructions for determining that the UE unsuccessfully decoded each downlink shared message included in a second set of scheduled downlink shared messages and determining to refrain from a transmission of a second HARQ feedback based on each downlink shared message included in the second set of scheduled downlink shared messages being unsuccessfully decoded.

In some examples of the method, apparatuses, and non-transitory computer-readable medium described herein, the HARQ codebook size may be equal to two bits.

Some examples of the method, apparatuses, and non-transitory computer-readable medium described herein may further include operations, features, means, or instructions for transmitting a two-bit HARQ feedback transmission that indicate that the UE successfully decoded the received scheduled downlink shared messages.

Some examples of the method, apparatuses, and non-transitory computer-readable medium described herein may further include operations, features, means, or instructions for determining that the UE unsuccessfully decoded one downlink shared message of a second set of scheduled downlink shared messages and transmitting a two-bit HARQ feedback transmission that indicates that the UE unsuccessfully decoded one downlink shared message of the second set of scheduled downlink shared messages.

Some examples of the method, apparatuses, and non-transitory computer-readable medium described herein may further include operations, features, means, or instructions for determining that the UE unsuccessfully decoded two downlink shared messages of a second set of scheduled downlink shared messages and transmitting a two-bit HARQ feedback transmission that indicates that the UE unsuccessfully decoded two downlink shared messages of the second set of scheduled downlink shared messages.

Some examples of the method, apparatuses, and non-transitory computer-readable medium described herein may further include operations, features, means, or instructions for determining that the UE unsuccessfully decoded more than two downlink shared messages of a second set of scheduled downlink shared messages and transmitting a two-bit HARQ feedback transmission that indicates that the UE unsuccessfully decoded more than two downlink shared messages of the second set of scheduled downlink shared messages.

In some examples of the method, apparatuses, and non-transitory computer-readable medium described herein, the HARQ codebook size and a HARQ codebook configuration may be predefined and a bit combination included in a HARQ codebook may be based on a number of downlink shared messages successfully decoded by the UE.

Some examples of the method, apparatuses, and non-transitory computer-readable medium described herein may further include operations, features, means, or instructions for transmitting a second HARQ feedback transmission that indicates that the UE unsuccessfully decoded more than one downlink shared messages of a second set of scheduled downlink shared messages and receiving a re-transmitted downlink shared message for each downlink shared message included in the second set of scheduled downlink shared messages.

Some examples of the method, apparatuses, and non-transitory computer-readable medium described herein may further include operations, features, means, or instructions for transmitting a second HARQ feedback transmission that indicates that the UE unsuccessfully decoded one downlink shared messages of a second set of scheduled downlink shared messages and receiving a re-transmitted downlink shared message that may be a bit-wise Exclusive OR of each downlink shared message included in the second set of scheduled downlink shared messages.

Some examples of the method, apparatuses, and non-transitory computer-readable medium described herein may further include operations, features, means, or instructions for receiving a re-transmitted downlink shared message, where a configuration of the re-transmitted downlink shared message may be based on the HARQ feedback, and where the configuration includes a number of retransmissions, a network encoding scheme, or a combination thereof.

Some examples of the method, apparatuses, and non-transitory computer-readable medium described herein may further include operations, features, means, or instructions for receiving a DCI message that indicates the HARQ codebook size.

In some examples of the method, apparatuses, and non-transitory computer-readable medium described herein, the HARQ codebook size may be predefined.

Some examples of the method, apparatuses, and non-transitory computer-readable medium described herein may further include operations, features, means, or instructions for comparing a number of scheduled downlink shared messages to a threshold and determining the HARQ codebook size based on the comparison.

Some examples of the method, apparatuses, and non-transitory computer-readable medium described herein may further include operations, features, means, or instructions for receiving a message that indicates a downlink shared channel re-transmission configuration, the downlink shared channel re-transmission configuration based on a network encoding scheme, the HARQ codebook size, a number of scheduled downlink shared messages, or a combination thereof.

Some examples of the method, apparatuses, and non-transitory computer-readable medium described herein may further include operations, features, means, or instructions for receiving a message that indicates a channel quality indicator table, the channel quality indicator table being associated with the codebook type.

In some examples of the method, apparatuses, and non-transitory computer-readable medium described herein, receiving the one or more downlink assignment index counters may include operations, features, means, or instructions for receiving one or more counter downlink assignment indices that indicate a number of scheduled downlink shared messages, receiving one or more total downlink assignment indices that indicate a number of scheduled downlink shared messages across multiple component carriers, and determining a number of downlink shared messages the UE unsuccessfully decoded based on the one or more counter downlink assignment indices and the one or more total downlink assignment indices.

In some examples of the method, apparatuses, and non-transitory computer-readable medium described herein, receiving the indication of the codebook type may include operations, features, means, or instructions for receiving an RRC signaling message including the indication of the codebook type.

A method for wireless communications at a network device is described. The method may include transmitting an indication of a codebook type for HARQ feedback, the indication of the codebook type indicating a static HARQ feedback codebook, where the indicated static HARQ feedback codebook is associated with a fixed codebook size, transmitting a downlink shared message, and receiving the HARQ feedback in accordance with the codebook type.

An apparatus for wireless communications at a network device is described. The apparatus may include a processor, and memory coupled with the processor. The processor may be configured to transmit an indication of a codebook type for HARQ feedback, the indication of the codebook type indicating a static HARQ feedback codebook, where the indicated static HARQ feedback codebook is associated with a fixed codebook size, transmit a downlink shared message, and receive the HARQ feedback in accordance with the codebook type.

Another apparatus for wireless communications at a network device is described. The apparatus may include means for transmitting an indication of a codebook type for HARQ feedback, the indication of the codebook type indicating a static HARQ feedback codebook, where the indicated static HARQ feedback codebook is associated with a fixed codebook size, means for transmitting a downlink shared message, and means for receiving the HARQ feedback in accordance with the codebook type.

A non-transitory computer-readable medium storing code for wireless communications at a network device is described. The code may include instructions executable by a processor to transmit an indication of a codebook type for HARQ feedback, the indication of the codebook type indicating a static HARQ feedback codebook, where the indicated static HARQ feedback codebook is associated with a fixed codebook size, transmit a downlink shared message, and receive the HARQ feedback in accordance with the codebook type.

Some examples of the method, apparatuses, and non-transitory computer-readable medium described herein may further include operations, features, means, or instructions for receiving a positive acknowledgement that a UE successfully decoded the downlink shared message.

Some examples of the method, apparatuses, and non-transitory computer-readable medium described herein may further include operations, features, means, or instructions for determining a failure by the network device to receive a second a second HARQ feedback transmission associated with a second downlink shared message and re-transmitting the second downlink shared message based on the failure by the network device to receive the second HARQ feedback transmission.

Some examples of the method, apparatuses, and non-transitory computer-readable medium described herein may further include operations, features, means, or instructions for transmitting a downlink control message, the downlink control message associated with the downlink shared message, where the reception of the HARQ feedback may be based on a decoding result of the downlink control message and the downlink shared message by a UE being successful.

Some examples of the method, apparatuses, and non-transitory computer-readable medium described herein may further include operations, features, means, or instructions for transmitting a downlink control message, where the reception of the HARQ feedback may be based on a decoding result of the downlink shared message by a UE being unsuccessful and a decoding result of the downlink control message by the UE being successful, the HARQ feedback including a negative acknowledgement.

In some examples of the method, apparatuses, and non-transitory computer-readable medium described herein, the codebook type may be associated with a one bit HARQ feedback size.

Some examples of the method, apparatuses, and non-transitory computer-readable medium described herein may further include operations, features, means, or instructions for transmitting a first message that indicates a first set of resources for the HARQ feedback associated with the downlink shared message and a second message that indicates a second set of resources for a second HARQ feedback associated with a second downlink shared message, the first set of resources and the second set of resources associated with unique time resources.

In some examples of the method, apparatuses, and non-transitory computer-readable medium described herein, receiving the HARQ feedback may include operations, features, means, or instructions for receiving an uplink control message including the HARQ feedback.

In some examples of the method, apparatuses, and non-transitory computer-readable medium described herein, transmitting the indication of the codebook type may include operations, features, means, or instructions for transmitting an RRC message including the indication of the codebook type.

A method for wireless communications at a network device is described. The method may include transmitting an indication of a codebook type for HARQ feedback, the codebook type indicating a HARQ codebook size and usage of downlink assignment index counters included in DCI, transmitting one or more downlink assignment index counters that indicate a total number of scheduled downlink shared messages, transmitting the scheduled downlink shared messages, and receiving a HARQ feedback transmission in accordance with the codebook type.

An apparatus for wireless communications at a network device is described. The apparatus may include a processor, and memory coupled with the processor. The processor may be configured to transmit an indication of a codebook type for HARQ feedback, the codebook type indicating a HARQ codebook size and usage of downlink assignment index counters included in DCI, transmit one or more downlink assignment index counters that indicate a total number of scheduled downlink shared messages, transmit the scheduled downlink shared messages, and receive a HARQ feedback transmission in accordance with the codebook type.

Another apparatus for wireless communications at a network device is described. The apparatus may include means for transmitting an indication of a codebook type for HARQ feedback, the codebook type indicating a HARQ codebook size and usage of downlink assignment index counters included in DCI, means for transmitting one or more downlink assignment index counters that indicate a total number of scheduled downlink shared messages, means for transmitting the scheduled downlink shared messages, and means for receiving a HARQ feedback transmission in accordance with the codebook type.

A non-transitory computer-readable medium storing code for wireless communications at a network device is described. The code may include instructions executable by a processor to transmit an indication of a codebook type for HARQ feedback, the codebook type indicating a HARQ codebook size and usage of downlink assignment index counters included in DCI, transmit one or more downlink assignment index counters that indicate a total number of scheduled downlink shared messages, transmit the scheduled downlink shared messages, and receive a HARQ feedback transmission in accordance with the codebook type.

In some examples of the method, apparatuses, and non-transitory computer-readable medium described herein, the HARQ codebook size may be equal to one bit.

In some examples of the method, apparatuses, and non-transitory computer-readable medium described herein, receiving the HARQ feedback may include operations, features, means, or instructions for receiving a positive acknowledgement, where the positive acknowledgement includes the one bit and determining that a UE successfully decoded the scheduled downlink shared messages based on the positive acknowledgement.

In some examples of the method, apparatuses, and non-transitory computer-readable medium described herein, receiving the HARQ feedback may include operations, features, means, or instructions for receiving a negative acknowledgement, where the negative acknowledgement includes the one bit and determining that a UE unsuccessfully decoded at least one downlink shared message of the scheduled downlink shared messages based on the negative acknowledgement.

Some examples of the method, apparatuses, and non-transitory computer-readable medium described herein may further include operations, features, means, or instructions for determining a failure by the network device to receive a second HARQ feedback and determining that a UE unsuccessfully decoded each downlink shared message included in a second set of scheduled downlink shared messages based on the failure.

In some examples of the method, apparatuses, and non-transitory computer-readable medium described herein, the HARQ codebook size may be equal to two bits.

In some examples of the method, apparatuses, and non-transitory computer-readable medium described herein, receiving the HARQ feedback may include operations, features, means, or instructions for receiving a two-bit HARQ feedback transmission indicating that a UE successfully decoded the scheduled downlink shared messages.

Some examples of the method, apparatuses, and non-transitory computer-readable medium described herein may further include operations, features, means, or instructions for receiving a two-bit HARQ feedback transmission indicating that a UE unsuccessfully decoded one downlink shared message of the scheduled downlink shared messages.

Some examples of the method, apparatuses, and non-transitory computer-readable medium described herein may further include operations, features, means, or instructions for receiving a two-bit HARQ feedback transmission indicating that a UE unsuccessfully decoded two downlink shared messages of the scheduled downlink shared messages.

Some examples of the method, apparatuses, and non-transitory computer-readable medium described herein may further include operations, features, means, or instructions for receiving a two-bit HARQ feedback transmission indicating that a UE unsuccessfully decoded more than two downlink shared messages of the scheduled downlink shared messages.

In some examples of the method, apparatuses, and non-transitory computer-readable medium described herein, the HARQ codebook size and a HARQ codebook configuration may be predefined, a bit combination included in a HARQ codebook based on a number of downlink shared messages successfully decoded by a UE.

In some examples of the method, apparatuses, and non-transitory computer-readable medium described herein, receiving the HARQ feedback transmission may include operations, features, means, or instructions for receiving the HARQ feedback transmission indicating that a UE unsuccessfully decoded more than one downlink shared message of a second set of scheduled downlink shared messages and transmitting a re-transmitted downlink shared message for each of the scheduled downlink shared messages.

Some examples of the method, apparatuses, and non-transitory computer-readable medium described herein may further include operations, features, means, or instructions for encoding each of the scheduled downlink shared messages via a bit-wise Exclusive OR network encoding procedure and re-transmitting the encoded scheduled downlink shared messages in a single downlink transmission.

Some examples of the method, apparatuses, and non-transitory computer-readable medium described herein may further include operations, features, means, or instructions for transmitting a DCI message indicating the HARQ codebook size.

In some examples of the method, apparatuses, and non-transitory computer-readable medium described herein, the HARQ codebook size may be predefined.

Some examples of the method, apparatuses, and non-transitory computer-readable medium described herein may further include operations, features, means, or instructions for transmitting a message indicating a downlink shared channel re-transmission configuration, the downlink shared channel re-transmission configuration based on a network encoding scheme, the HARQ codebook size, a number of scheduled downlink shared messages, or a combination thereof.

Some examples of the method, apparatuses, and non-transitory computer-readable medium described herein may further include operations, features, means, or instructions for transmitting a message indicating a channel quality indicator table, the channel quality indicator table being associated with the codebook type.

In some examples of the method, apparatuses, and non-transitory computer-readable medium described herein, transmitting the one or more downlink assignment index counters may include operations, features, means, or instructions for transmitting one or more counter downlink assignment indices indicating a number of scheduled downlink shared messages and transmitting one or more total downlink assignment indices indicating a number of scheduled downlink shared messages across multiple component carriers, where the HARQ feedback may be based at on the one or more counter downlink assignment indices and the one or more total downlink assignment indices.

In some examples of the method, apparatuses, and non-transitory computer-readable medium described herein, transmitting the indication of the codebook type may include operations, features, means, or instructions for transmitting an RRC message including the indication of the codebook type.

A method for wireless communications at a UE is described. The method may include receiving an indication of a codebook type for transmitting HARQ feedback by the UE, the indication of the codebook type indicating a static HARQ feedback codebook. The indicated static HARQ feedback codebook is associated with a fixed codebook size. The method may further include receiving a downlink shared channel transmission, decoding the received downlink shared channel transmission, and transmitting the HARQ feedback based on the decoding of the received downlink shared channel transmission and in accordance with the codebook type.

An apparatus for wireless communications at a UE is described. The apparatus may include a processor, and memory coupled with the processor. The processor may be configured to receive an indication of a codebook type for transmitting HARQ feedback by the UE, the indication of the codebook type indicating a static HARQ feedback codebook. The indicated static HARQ feedback codebook is associated with a fixed codebook size. The process and memory may be further configured to receive a downlink shared channel transmission, decode the received downlink shared channel transmission, and transmit the HARQ feedback based on the decoding of the received downlink shared channel transmission and in accordance with the codebook type.

Another apparatus for wireless communications at a UE is described. The apparatus may include means for receiving an indication of a codebook type for transmitting HARQ feedback by the UE, the indication of the codebook type indicating a static HARQ feedback codebook. The indicated static HARQ feedback codebook is associated with a fixed codebook size. The apparatus may include means for receiving a downlink shared channel transmission, means for decoding the received downlink shared channel transmission, and means for transmitting the HARQ feedback based on the decoding of the received downlink shared channel transmission and in accordance with the codebook type.

A non-transitory computer-readable medium storing code for wireless communications at a UE is described. The code may include instructions executable by a processor to receive an indication of a codebook type for transmitting HARQ feedback by the UE, the indication of the codebook type indicating a static HARQ feedback codebook. The indicated static HARQ feedback codebook is associated with a fixed codebook size. The code may further include instructions executable by a processor to receive an indication of a codebook type for receive a downlink shared channel transmission, decode the received downlink shared channel transmission, and transmit the HARQ feedback based on the decoding of the received downlink shared channel transmission and in accordance with the codebook type.

In some examples of the method, apparatuses, and non-transitory computer-readable medium described herein, transmitting the HARQ feedback may include operations, features, means, or instructions for transmitting a positive acknowledgement that the UE successfully decoded the received downlink shared channel transmission.

Some examples of the method, apparatuses, and non-transitory computer-readable medium described herein may further include operations, features, means, or instructions for determining that the UE unsuccessfully decoded a second downlink shared channel transmission and determining to refrain from transmitting a second HARQ feedback transmission based on the decoding of the second downlink shared channel transmission being unsuccessful.

Some examples of the method, apparatuses, and non-transitory computer-readable medium described herein may further include operations, features, means, or instructions for receiving a downlink control channel transmission, the downlink control channel transmission associated with the received downlink shared channel transmission and decoding the received downlink control channel transmission. Transmitting the HARQ feedback may be based on the decoding of the received downlink control channel transmission and the received downlink shared channel transmission being successful.

Some examples of the method, apparatuses, and non-transitory computer-readable medium described herein may further include operations, features, means, or instructions for decoding a received downlink control channel transmission, the received downlink control channel transmission associated with a second downlink shared channel transmission. The method, apparatuses, and non-transitory computer-readable medium described herein may further include operations, features, means, or instructions for determining that the UE unsuccessfully decoded the second downlink shared channel transmission, and transmitting second HARQ feedback based on the decoding of the second downlink shared channel transmission being unsuccessful and the decoding of the received downlink control channel transmission being successful. The second HARQ feedback may include a negative acknowledgement.

In some examples of the method, apparatuses, and non-transitory computer-readable medium described herein, the codebook type may be associated with a one bit HARQ feedback size for transmitting the HARQ feedback by the UE.

Some examples of the method, apparatuses, and non-transitory computer-readable medium described herein may further include operations, features, means, or instructions for receiving a first message indicating of a first set of resources for transmitting the HARQ feedback associated with the downlink shared channel transmission and a second message indicating a second set of resources for transmitting second HARQ feedback associated with a second downlink shared channel transmission, the first set of resources and the second set of resources associated with unique time resources.

Some examples of the method, apparatuses, and non-transitory computer-readable medium described herein may further include operations, features, means, or instructions for receiving a first message indicating a first set of resources for transmitting the HARQ feedback associated with the downlink shared channel transmission and a second message indicating a second set of resources for transmitting second HARQ feedback associated with a second downlink shared channel transmission. The first set of resources and the second set of resources may overlap in time. The method, apparatuses, and non-transitory computer-readable medium described herein may further include operations, features, means, or instructions for determining an error associated with the first set of resources and the second set of resources based on the first set of resources and the second set of resources overlapping in time.

In some examples of the method, apparatuses, and non-transitory computer-readable medium described herein, transmitting the HARQ feedback may include operations, features, means, or instructions for transmitting an uplink control channel transmission including the HARQ feedback.

In some examples of the method, apparatuses, and non-transitory computer-readable medium described herein, receiving the indication of the codebook type may include operations, features, means, or instructions for receiving an RRC message including the indication of the codebook type.

A method for wireless communications at a UE is described. The method may include receiving an indication of a codebook type for transmitting HARQ feedback by the UE. The codebook type may indicate a HARQ codebook size and usage of downlink assignment index counters included in DCI. The method may further include receiving one or more downlink assignment index counters indicating a total number of scheduled downlink shared channel transmissions, receiving the scheduled downlink shared channel transmissions, decoding the received scheduled downlink shared channel transmissions, and transmitting the HARQ feedback based on the decoding of the received scheduled downlink shared channel transmissions, the received downlink assignment index counter, and in accordance with the codebook type.

An apparatus for wireless communications at a UE is described. The apparatus may include a processor, and memory coupled with the processor. The processor may be configured to receive an indication of a codebook type for transmitting HARQ feedback by the UE. The codebook type may indicate a HARQ codebook size and usage of downlink assignment index counters included in DCI. The process and memory may be further configured to receive one or more downlink assignment index counters indicating a total number of scheduled downlink shared channel transmissions, receive the scheduled downlink shared channel transmissions, decode the received scheduled downlink shared channel transmissions, and transmit the HARQ feedback based on the decoding of the received scheduled downlink shared channel transmissions, the received downlink assignment index counter, and in accordance with the codebook type.

Another apparatus for wireless communications at a UE is described. The apparatus may include means for receiving an indication of a codebook type for transmitting HARQ feedback by the UE. The codebook type indicating a HARQ codebook size and usage of downlink assignment index counters included in DCI. The apparatus may further include means for receiving one or more downlink assignment index counters indicating a total number of scheduled downlink shared channel transmissions, means for receiving the scheduled downlink shared channel transmissions, means for decoding the received scheduled downlink shared channel transmissions, and means for transmitting the HARQ feedback based on the decoding of the received scheduled downlink shared channel transmissions, the received downlink assignment index counter, and in accordance with the codebook type.

A non-transitory computer-readable medium storing code for wireless communications at a UE is described. The code may include instructions executable by a processor to receive an indication of a codebook type for transmitting HARQ feedback by the UE. The codebook type indicating a HARQ codebook size and usage of downlink assignment index counters included in DCI. The code may further include instructions executable by a processor to receive one or more downlink assignment index counters indicating a total number of scheduled downlink shared channel transmissions, receive the scheduled downlink shared channel transmissions, decode the received scheduled downlink shared channel transmissions, and transmit the HARQ feedback based on the decoding of the received scheduled downlink shared channel transmissions, the received downlink assignment index counter, and in accordance with the codebook type.

In some examples of the method, apparatuses, and non-transitory computer-readable medium described herein, the HARQ codebook size may be equal to one bit.

In some examples of the method, apparatuses, and non-transitory computer-readable medium described herein, transmitting the HARQ feedback may include operations, features, means, or instructions for transmitting a positive acknowledgement based on the decoding of the scheduled downlink shared channel transmissions being successful, where the positive acknowledgement includes the one bit.

Some examples of the method, apparatuses, and non-transitory computer-readable medium described herein may further include operations, features, means, or instructions for determining that the UE unsuccessfully decoded at least one downlink shared channel transmission of a second set of scheduled downlink shared channel transmissions and transmitting a negative acknowledgement based on the decoding of the at least one downlink shared channel transmission being unsuccessful. The negative acknowledgement may include the one bit.

Some examples of the method, apparatuses, and non-transitory computer-readable medium described herein may further include operations, features, means, or instructions for determining that the UE unsuccessfully decoded each downlink shared channel transmission included in a second set of scheduled downlink shared channel transmissions and determining to refrain from transmitting second HARQ feedback based on the decoding of each of the downlink shared channel transmission included in the second set of scheduled downlink shared channel transmissions being unsuccessful.

In some examples of the method, apparatuses, and non-transitory computer-readable medium described herein, the HARQ codebook size may be equal to two bits.

In some examples of the method, apparatuses, and non-transitory computer-readable medium described herein, transmitting the HARQ feedback may include operations, features, means, or instructions for transmitting a two-bit HARQ feedback transmission indicating that the UE successfully decoded the received scheduled downlink shared channel transmissions.

Some examples of the method, apparatuses, and non-transitory computer-readable medium described herein may further include operations, features, means, or instructions for determining that the UE unsuccessfully decoded one downlink shared channel transmission of a second set of scheduled downlink shared channel transmissions and transmitting a two-bit HARQ feedback transmission indicating that the UE unsuccessfully decoded one downlink shared channel transmission of the second set of scheduled downlink shared channel transmissions.

Some examples of the method, apparatuses, and non-transitory computer-readable medium described herein may further include operations, features, means, or instructions for determining that the UE unsuccessfully decoded two downlink shared channel transmissions of a second set of scheduled downlink shared channel transmissions and transmitting a two-bit HARQ feedback transmission indicating that the UE unsuccessfully decoded two downlink shared channel transmissions of the second set of scheduled downlink shared channel transmissions.

Some examples of the method, apparatuses, and non-transitory computer-readable medium described herein may further include operations, features, means, or instructions for determining that the UE unsuccessfully decoded more than two downlink shared channel transmissions of a second set of scheduled downlink shared channel transmissions and transmitting a two-bit HARQ feedback transmission indicating that the UE unsuccessfully decoded more than two downlink shared channel transmissions of the second set of scheduled downlink shared channel transmissions.

In some examples of the method, apparatuses, and non-transitory computer-readable medium described herein, the HARQ codebook size and a HARQ codebook configuration may be predefined, a bit combination included in a HARQ codebook based on a number of downlink shared channel transmissions successfully decoded by the UE.

Some examples of the method, apparatuses, and non-transitory computer-readable medium described herein may further include operations, features, means, or instructions for transmitting a second HARQ feedback transmission indicating that the UE unsuccessfully decoded more than one downlink shared channel transmissions of a second set of scheduled downlink shared channel transmissions and receiving a re-transmitted downlink shared channel transmission for each downlink shared channel transmission included in the second set of scheduled downlink shared channel transmissions.

Some examples of the method, apparatuses, and non-transitory computer-readable medium described herein may further include operations, features, means, or instructions for transmitting a second HARQ feedback transmission indicating that the UE unsuccessfully decoded one downlink shared channel transmissions of a second set of scheduled downlink shared channel transmissions and receiving a re-transmitted downlink shared channel transmission that may be a bit-wise Exclusive OR of each downlink shared channel transmission included in the second set of scheduled downlink shared channel transmissions.

Some examples of the method, apparatuses, and non-transitory computer-readable medium described herein may further include operations, features, means, or instructions for receiving a re-transmitted downlink shared channel transmission, a configuration of the re-transmission based on the HARQ feedback, where the configuration includes a number of retransmissions, a network encoding scheme, or a combination thereof.

Some examples of the method, apparatuses, and non-transitory computer-readable medium described herein may further include operations, features, means, or instructions for receiving a DCI message indicating the HARQ codebook size.

In some examples of the method, apparatuses, and non-transitory computer-readable medium described herein, the HARQ codebook size may be predefined.

Some examples of the method, apparatuses, and non-transitory computer-readable medium described herein may further include operations, features, means, or instructions for comparing a number of scheduled downlink shared channel transmissions to a threshold and determining the HARQ codebook size based on the comparison.

Some examples of the method, apparatuses, and non-transitory computer-readable medium described herein may further include operations, features, means, or instructions for receiving a message indicating a downlink shared channel re-transmission configuration, the downlink shared channel re-transmission configuration based on a network encoding scheme, the HARQ codebook size, a number of scheduled downlink shared channel transmissions, or a combination thereof.

Some examples of the method, apparatuses, and non-transitory computer-readable medium described herein may further include operations, features, means, or instructions for receiving a message indicating a channel quality indicator table, the channel quality indicator table associated with the codebook type.

In some examples of the method, apparatuses, and non-transitory computer-readable medium described herein, receiving the one or more downlink assignment index counters may include operations, features, means, or instructions for receiving one or more counter downlink assignment indices indicating a number of scheduled downlink shared channel transmissions, and receiving one or more total downlink assignment indices indicating a number of scheduled downlink shared channel transmissions across multiple component carriers. In some examples of the method, apparatuses, and non-transitory computer-readable medium described herein, the operations, features, means, or instructions for may include determining a number of downlink shared channel transmissions the UE unsuccessfully decoded based on the one or more counter downlink assignment indices and the one or more total downlink assignment indices.

In some examples of the method, apparatuses, and non-transitory computer-readable medium described herein, receiving the indication of the codebook type may include operations, features, means, or instructions for receiving a RRC signaling message including the indication of the codebook type.

A method for wireless communications at a base station is described. The method may include transmitting an indication of a codebook type for transmitting HARQ feedback by the UE, the indication of the codebook type indicating a static HARQ feedback codebook. The indicated static HARQ feedback codebook is associated with a fixed codebook size. The method may further transmitting a downlink shared channel transmission, and receiving the HARQ feedback in accordance with the codebook type.

An apparatus for wireless communications at a base station is described. The apparatus may include a processor, and memory coupled with the processor. The processor may be configured to transmit an indication of a codebook type for transmitting HARQ feedback by the UE, the indication of the codebook type indicating a static HARQ feedback codebook. The indicated static HARQ feedback codebook is associated with a fixed codebook size. The process and memory may be further configured transmit a downlink shared channel transmission, and receive the HARQ feedback in accordance with the codebook type.

Another apparatus for wireless communications at a base station is described. The apparatus may include means for transmitting an indication of a codebook type for transmitting HARQ feedback by the UE, the indication of the codebook type indicating a static HARQ feedback codebook. The indicated static HARQ feedback codebook is associated with a fixed codebook size. The apparatus may further include means for transmitting a downlink shared channel transmission, and means for receiving the HARQ feedback in accordance with the codebook type.

A non-transitory computer-readable medium storing code for wireless communications at a base station is described. The code may include instructions executable by a processor to transmit an indication of a codebook type for transmitting HARQ feedback by the UE, the indication of the codebook type indicating a static HARQ feedback codebook. The indicated static HARQ feedback codebook is associated with a fixed codebook size. The code may further include instructions executable by a processor to transmit a downlink shared channel transmission, and receive the HARQ feedback in accordance with the codebook type.

In some examples of the method, apparatuses, and non-transitory computer-readable medium described herein, receiving the HARQ feedback may include operations, features, means, or instructions for receiving a positive acknowledgement that the UE successfully decoded the downlink shared channel transmission.

Some examples of the method, apparatuses, and non-transitory computer-readable medium described herein may further include operations, features, means, or instructions for determining a failure by the base station to receive a second a second HARQ feedback transmission associated with a second downlink shared channel transmission and retransmitting the second downlink shared channel transmission based on the failure by the base station to receive the second HARQ feedback transmission.

Some examples of the method, apparatuses, and non-transitory computer-readable medium described herein may further include operations, features, means, or instructions for transmitting a downlink control channel transmission, the downlink control channel transmission associated with the downlink shared channel transmission, where receiving the HARQ feedback may be based on decoding of the downlink control channel transmission and the downlink shared channel transmission by the UE being successful.

Some examples of the method, apparatuses, and non-transitory computer-readable medium described herein may further include operations, features, means, or instructions for transmitting a downlink control channel transmission, where receiving the HARQ feedback may be based on decoding of the downlink shared channel transmission by the UE being unsuccessful and decoding of the downlink control channel transmission by the UE being successful, the HARQ feedback including a negative acknowledgement.

In some examples of the method, apparatuses, and non-transitory computer-readable medium described herein, the codebook type may be associated with a one bit HARQ feedback size.

Some examples of the method, apparatuses, and non-transitory computer-readable medium described herein may further include operations, features, means, or instructions for transmitting a first message indicating of a first set of resources for the HARQ feedback associated with the downlink shared channel transmission and a second message indicating a second set of resources for second HARQ feedback associated with a second downlink shared channel transmission, the first set of resources and the second set of resources associated with unique time resources.

In some examples of the method, apparatuses, and non-transitory computer-readable medium described herein, receiving the HARQ feedback may include operations, features, means, or instructions for receiving an uplink control channel transmission including the HARQ feedback.

In some examples of the method, apparatuses, and non-transitory computer-readable medium described herein, transmitting the indication of the codebook type may include operations, features, means, or instructions for transmitting a RRC message including the indication of the codebook type.

A method for wireless communications at a base station is described. The method may include transmitting an indication of a codebook type for transmitting HARQ feedback by the UE. The codebook type indicating a HARQ codebook size and usage of downlink assignment index counters included in DCI. The method may further include transmitting one or more downlink assignment index counters indicating a total number of scheduled downlink shared channel transmissions, transmitting the scheduled downlink shared channel transmissions, and receiving a HARQ feedback transmission in accordance with the codebook type.

An apparatus for wireless communications at a base station is described. The apparatus may include a processor, and memory coupled with the processor. The processor may be configured to transmit an indication of a codebook type for transmitting HARQ feedback by the UE. The codebook type indicating a HARQ codebook size and usage of downlink assignment index counters included in DCI. The process and memory may be configured to transmit one or more downlink assignment index counters indicating a total number of scheduled downlink shared channel transmissions, transmit the scheduled downlink shared channel transmissions, and receive a HARQ feedback transmission in accordance with the codebook type.

Another apparatus for wireless communications at a base station is described. The apparatus may include means for transmitting an indication of a codebook type for transmitting HARQ feedback by the UE. The codebook type indicating a HARQ codebook size and usage of downlink assignment index counters included in DCI. The apparatus may include means for transmitting one or more downlink assignment index counters indicating a total number of scheduled downlink shared channel transmissions, means for transmitting the scheduled downlink shared channel transmissions, and means for receiving a HARQ feedback transmission in accordance with the codebook type.

A non-transitory computer-readable medium storing code for wireless communications at a base station is described. The code may include instructions executable by a processor to transmit an indication of a codebook type for transmitting HARQ feedback by the UE. The codebook type indicating a HARQ codebook size and usage of downlink assignment index counters included in DCI. The code may include instructions executable by a processor to transmit one or more downlink assignment index counters indicating a total number of scheduled downlink shared channel transmissions, transmit the scheduled downlink shared channel transmissions, and receive a HARQ feedback transmission in accordance with the codebook type.

In some examples of the method, apparatuses, and non-transitory computer-readable medium described herein, the HARQ codebook size may be equal to one bit.

In some examples of the method, apparatuses, and non-transitory computer-readable medium described herein, receiving the HARQ feedback may include operations, features, means, or instructions for receiving a positive acknowledgement, where the positive acknowledgement includes the one bit and determining that the UE successfully decoded the scheduled downlink shared channel transmissions based on the positive acknowledgement.

In some examples of the method, apparatuses, and non-transitory computer-readable medium described herein, receiving the HARQ feedback may include operations, features, means, or instructions for receiving a negative acknowledgement, where the negative acknowledgement includes the one bit and determining that the UE unsuccessfully decoded at least one downlink shared channel transmission of the scheduled downlink shared channel transmissions based on the negative acknowledgement.

Some examples of the method, apparatuses, and non-transitory computer-readable medium described herein may further include operations, features, means, or instructions for determining a failure by the base station to receive a second HARQ feedback and determining that the UE unsuccessfully decoded each downlink shared channel transmission included in a second set of scheduled downlink shared channel transmissions based on the failure.

In some examples of the method, apparatuses, and non-transitory computer-readable medium described herein, the HARQ codebook size may be equal to two bits.

In some examples of the method, apparatuses, and non-transitory computer-readable medium described herein, receiving the HARQ feedback may include operations, features, means, or instructions for receiving a two-bit HARQ feedback transmission indicating that the UE successfully decoded the scheduled downlink shared channel transmissions.

Some examples of the method, apparatuses, and non-transitory computer-readable medium described herein may further include operations, features, means, or instructions for receiving a two-bit HARQ feedback transmission indicating that the UE unsuccessfully decoded one downlink shared channel transmission of the scheduled downlink shared channel transmissions.

Some examples of the method, apparatuses, and non-transitory computer-readable medium described herein may further include operations, features, means, or instructions for receiving a two-bit HARQ feedback transmission indicating that the UE unsuccessfully decoded two downlink shared channel transmissions of the scheduled downlink shared channel transmissions.

Some examples of the method, apparatuses, and non-transitory computer-readable medium described herein may further include operations, features, means, or instructions for receiving a two-bit HARQ feedback transmission indicating that the UE unsuccessfully decoded more than two downlink shared channel transmissions of the scheduled downlink shared channel transmissions.

In some examples of the method, apparatuses, and non-transitory computer-readable medium described herein, the HARQ codebook size and a HARQ codebook configuration may be predefined, a bit combination included in a HARQ codebook based on a number of downlink shared channel transmissions successfully decoded by the UE.

In some examples of the method, apparatuses, and non-transitory computer-readable medium described herein, receiving the HARQ feedback transmission may include operations, features, means, or instructions for receiving the HARQ feedback transmission indicating that the UE unsuccessfully decoded more than one downlink shared channel transmission of a second set of scheduled downlink shared channel transmissions and transmitting a re-transmitted downlink shared channel transmission for each of the scheduled downlink shared channel transmissions.

Some examples of the method, apparatuses, and non-transitory computer-readable medium described herein may further include operations, features, means, or instructions for encoding each of the scheduled downlink shared channel transmissions via a bit-wise Exclusive OR network encoding procedure and re-transmitting the encoded scheduled downlink shared channel transmissions in a single downlink transmission.

Some examples of the method, apparatuses, and non-transitory computer-readable medium described herein may further include operations, features, means, or instructions for transmitting a DCI message indicating the HARQ codebook size.

In some examples of the method, apparatuses, and non-transitory computer-readable medium described herein, the HARQ codebook size may be predefined.

Some examples of the method, apparatuses, and non-transitory computer-readable medium described herein may further include operations, features, means, or instructions for transmitting a message indicating a downlink shared channel re-transmission configuration, the downlink shared channel re-transmission configuration based on a network encoding scheme, the HARQ codebook size, a number of scheduled downlink shared channel transmissions, or a combination thereof.

Some examples of the method, apparatuses, and non-transitory computer-readable medium described herein may further include operations, features, means, or instructions for transmitting a message indicating a channel quality indicator table, the channel quality indicator table associated with the codebook type.

In some examples of the method, apparatuses, and non-transitory computer-readable medium described herein, transmitting the one or more downlink assignment index counters may include operations, features, means, or instructions for transmitting one or more counter downlink assignment indices indicating a number of scheduled downlink shared channel transmissions and transmitting one or more total downlink assignment indices indicating a number of scheduled downlink shared channel transmissions across multiple component carriers, where the HARQ feedback may be based at on the one or more counter downlink assignment indices and the one or more total downlink assignment indices.

In some examples of the method, apparatuses, and non-transitory computer-readable medium described herein, transmitting the indication of the codebook type may include operations, features, means, or instructions for transmitting an RRC message including the indication of the codebook type.

DETAILED DESCRIPTION

Figure 1:
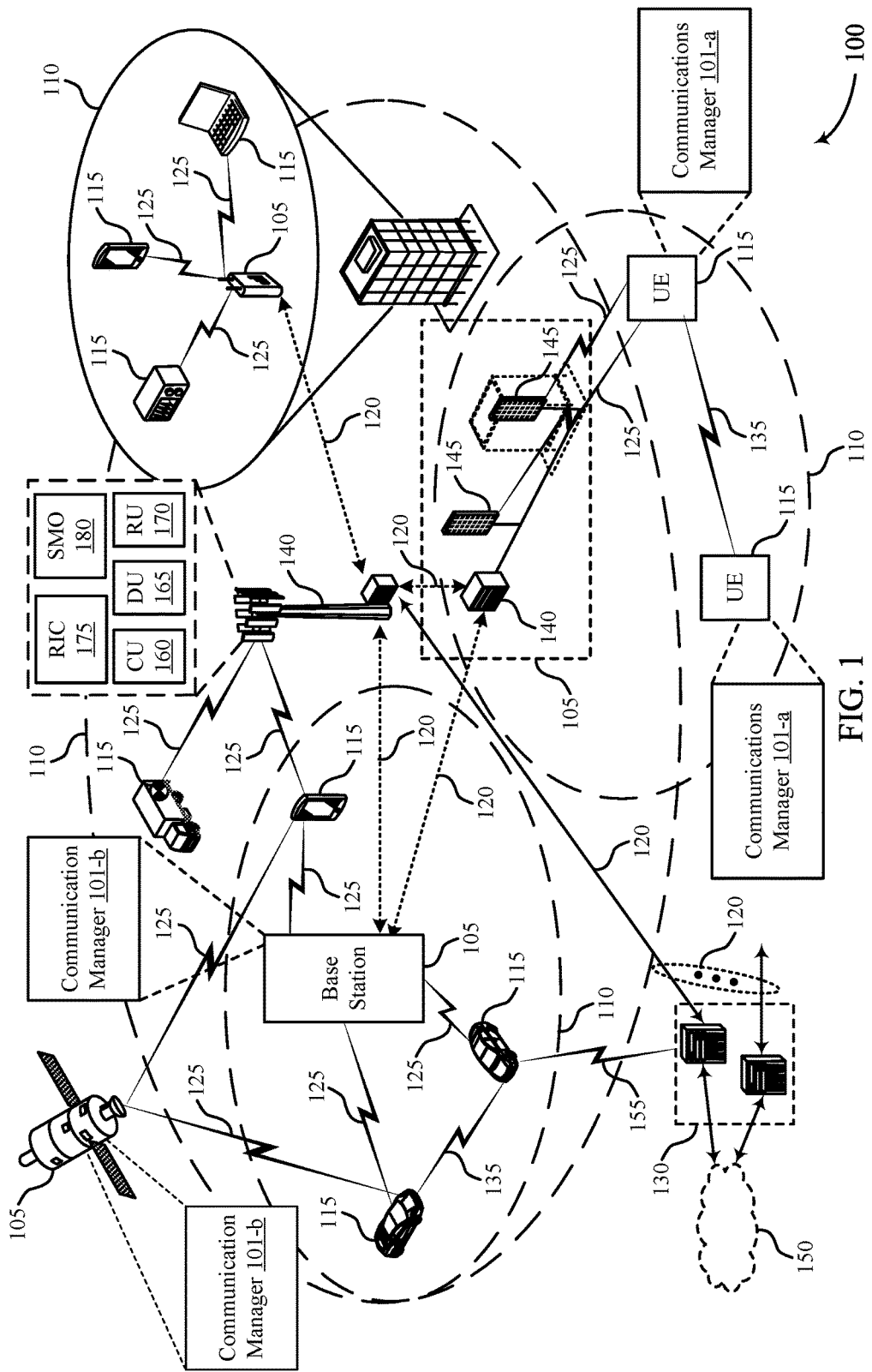
FIG. 1 shows an example of a wireless communications system that supports techniques for transmitting HARQ feedback in accordance with one or more aspects of the present disclosure.

In some wireless communications systems, a first device (e.g., network device, a base station, a satellite) may communicate with one or more second devices (e.g., a UE) via downlink signals and each of the one or more second devices may communicate with one or more first devices via uplink signals. For example, a first device may transmit a control channel (e.g., physical downlink control channel (PDCCH)) transmission indicating information associated with a corresponding shared channel (e.g., physical downlink shared channel (PDSCH)) transmission. A second device may receive the PDCCH and attempt to receive and decode the corresponding PDSCH based on the information included in the PDCCH. The second device may transmit HARQ feedback to the first device (via an uplink signal, such as an uplink control channel) to indicate whether the second device successfully decoded the PDSCH. If the second device successfully decoded the PDSCH, the second device may transmit a positive acknowledgement (ACK) as HARQ feedback. The first device may continue transmitting downlink signals to the second device upon receiving an ACK. If however, the second device unsuccessfully received and/or decoded the PDSCH, the second device may transmit a negative acknowledgement (NACK) as HARQ feedback. Upon receiving a NACK, the first device may re-transmit the PDSCH to the second device.

In some cases, uplink and downlink budgets (e.g., achievable signal-to-noise (SNR) ratio) may not be equal. When this imbalance occurs, downlink throughput may be limited by HARQ feedback. Such imbalances may occur due to limited transmit power at a second device (e.g., a UE). In one example, such imbalances may occur in satellite communications (e.g., non-terrestrial satellite communications, such as in a non-terrestrial network (NTN), which may involve one or more manned anal vehicles or one or more unmanned aerial vehicles (UAVs), or both) where a satellite (e.g., a non-terrestrial satellite, such as an entity that has the capability of wireless communication in an NTN) may transmit with a large transmit power compared to a UE. As a result, a first device (e.g., a network device, a satellite, or a base station, where the satellite or the base station may be referred to as or be an example of a network device) may transmit a downlink message to a second device (e.g., a UE) during a first time period, and the second device may transmit HARQ feedback to the first device during a second time period. The second time period may be longer than the first time period due to the difference in transmit powers between the first device and the second device. Transmitting a second downlink message and/or retransmitting the downlink message based on the HARQ feedback may be limited by the ability of the second device to transmit HARQ feedback (e.g., how quickly the second device may transmit HARQ feedback).

In some cases, a HARQ codebook may be a semi-static HARQ codebook or a dynamic HARQ codebook, where a HARQ codebook may refer to a feedback transmission including a number of feedback information bits. The codebook size of a semi-static codebook may be based on a number of potential PDSCH transmissions that can be scheduled during a HARQ codebook reporting window. The reporting window may be preconfigured or indicated to the second device (e.g., dynamically, semi-statically, or aperiodically). The codebook size of a dynamic HARQ codebook may be equal to a number of transmitted PDSCHs. In scenarios in which an achievable downlink throughput is limited due to unequal uplink and downlink budgets (e.g., as may be present in an NTN), such HARQ codebook designs may be unable to facilitate an increase in downlink throughput, which may further limit or constrain an achievable performance of a device. In other words, some HARQ codebook designs may be inflexible (e.g., a device may be unable to adjust a HARQ codebook design) and thus limiting in terms of how they may facilitate an increase in downlink throughput.

The techniques described herein may adjust HARQ codebook design to increase downlink throughput and reduce power consumption at the second device. In some cases, HARQ codebook design may be adjusted to reduce the HARQ codebook size when the downlink and uplink link budgets are imbalanced so as to increase the efficiency of HARQ reporting. In some implementations, a device may employ one of two different HARQ codebook design adjustments based on whether a HARQ codebook is a semi-static HARQ codebook or a dynamic HARQ codebook. As described herein, a device may employ a first HARQ codebook design adjustment if the HARQ codebook is a semi-static HARQ codebook, and the first HARQ codebook design adjustment may be associated with a configuration or activation of a non-codebook based feedback mode. Alternatively, a device may employ a second HARQ codebook design adjustment if the HARQ codebook is a dynamic HARQ codebook, and the second HARQ codebook design adjustment may be associated with using a fixed codebook size of one or two bits and potentially indicating feedback for multiple PDSCHs via the one or two bits.

For example, in the case of a semi-static HARQ codebook, the first device may configure the second device to operate according to a first feedback mode (e.g., a first codebook type). In some aspects, a codebook size may be equal to one bit in accordance with the first feedback mode. The first feedback mode may be referred to or understood as a non-codebook based feedback mode or a non-codebook type, which may be associated with a scheduling constraint according to which different PUCCHs that correspond to different PDSCHs avoid overlapping in time. In such cases, the second device may receive information associated with a configuration of one HARQ feedback opportunity (e.g., a one bit feedback transmission) per resource window (e.g., per scheduled PDSCH). In some implementations, if the second device successfully decodes a PDSCH (such that a decoding result is a successful decoding), the second device may transmit positive feedback using the one bit. Otherwise (if the second device unsuccessfully decodes the PDSCH, such that a decoding result is an unsuccessful decoding), the second device may refrain from transmitting feedback. In some implementations, if the second device decodes a PDCCH but fails to decode the corresponding PDSCH, the second device may transmit negative feedback using the one bit.

In another example, in the case of a dynamic codebook, the first device may configure the second device to operate according to a second feedback mode (e.g., a second codebook type). In some aspects, a codebook size may be equal to one bit or two bits in accordance with the second feedback mode. The second device may be configured, by the first device, to transmit one HARQ codebook for a set of scheduled PDSCHs. If the first device configures a one bit codebook, the second device may use the one bit to indicate whether the second device successfully decoded all, a subset, or none or the scheduled PDSCHs in the set. For example, the second device may report positive feedback (e.g., transmit a "1") if all PDSCHs are received and successfully decoded and report negative feedback (e.g., transmit a "0") if the second device unsuccessfully decodes at least one PDSCH. In some cases, the second device may be configured to refrain from transmitting a feedback report if the second device unsuccessfully decodes at least one PDSCH (rather than transmitting the negative feedback). In another example, the second device may be configured to refrain from transmitting a feedback report if the second device fails to successfully decode any of the PDSCHs in the set. If the first device configures a two bit codebook, the second device may use a two bit combination to indicate a level of PDSCH decoding success by the second device. For example, the second device may use the two bits to report that the second device successfully decoded each of the PDSCHs in the set, that the second device unsuccessfully decoded one PDSCH in the set, that the second device unsuccessfully decoded two PDSCHs in the set, that the second device unsuccessfully decoded more than two PDSCHs in the set, etc.

As such, the first device may receive the HARQ feedback (e.g., semi-static HARQ feedback, or dynamic HARQ feedback) from the first device and determine whether to re-transmit one or more PDSCHs based on the HARQ feedback and in accordance with the feedback mode or codebook type. In some cases, the first device may re-transmit one or more PDSCHs in separate downlink transmissions. In some cases, the first device may apply network coding to one or more PDSCHs to re-transmit the one or more PDSCHs in a single transmission (e.g., instead of transmitting separate retransmissions of several PDSCHs, the first device may retransmit one PDSCH, where a bit (an i-th bit) of a set of bits of the PDSCH is the exclusive-or (XOR) of a bit (an i-th bit) of the one or more PDSCHs).

As such, when the downlink and uplink budget between a first device and second device is imbalanced, the second device may be configured to transmit a (limited, reduced, or otherwise adjusted) HARQ codebook. For example, as a result of transmitting a limited, reduced, or otherwise adjusted HARQ codebook, the second device may provide feedback to the first device with lower latency or with a lower uplink transmit power, which may enable more efficient feedback reporting by the second device. In accordance with the lower latency associated with the feedback, the first device and the second device may achieve higher data rates, greater spectral efficiency, and greater system capacity. In accordance with the lower uplink transmit power at the second device, the second device may achieve greater power savings. Accordingly, the described techniques may support increased communication reliability, increased throughout (e.g., downlink throughput), decreased latency, and longer battery life of the second device, each of which may improve a user experience or a performance of an application involving the first device and the second device. As such, supported techniques may include improved network operations and, in some examples, may promote network efficiencies.

Aspects of the disclosure are initially described in the context of wireless communications systems. Aspects are then described with reference to process flows. Aspects of the disclosure are further illustrated by and described with reference to apparatus diagrams, system diagrams, and flowcharts that relate to techniques for transmitting HARQ feedback.

FIG. 1 illustrates an example of a wireless communications system 100 that supports techniques for transmitting HARQ feedback in accordance with one or more aspects of the present disclosure. The wireless communications system 100 may include one or more base stations 105, such as one or more network devices 140, which may also be referred to as network entities, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105, the network devices 140, or both may be dispersed throughout a geographic area to form the wireless communications system 100 and may be devices in different forms or having different capabilities. The base stations 105 and the network devices 140, or both and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, the network devices 140, or network equipment (e.g., core network nodes, relay devices, integrated access and backhaul (IAB) nodes, or other network equipment), as shown in FIG. 1.

The base stations 105, the network devices 140, or both may communicate with the core network 130, or with one another, or both. For example, the base stations 105, the network devices 140, or both may interface with the core network 130 through one or more backhaul links 120 (e.g., via an S1, N2, N3, or other interface). The base stations 105, the network devices 140, or both may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

As described herein, a node, which may be referred to as a node, a network node, a network device 140, a network entity, or a wireless node, may be a base station 105 (e.g., any base station described herein), a UE 115 (e.g., any UE described herein), a network controller, an apparatus, a device, a computing system, one or more components, and/or another suitable processing entity configured to perform any of the techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different relative to these examples. Similarly, reference to a UE 115, base station 105, apparatus, device, computing system, or the like may include disclosure of the UE 115, base station 105, apparatus, device, computing system, or the like being a network node. For example, disclosure that a UE 115 is configured to receive information from a base station 105 also discloses that a first network node is configured to receive information from a second network node. Consistent with this disclosure, once a specific example is broadened in accordance with this disclosure (e.g., a UE 115 is configured to receive information from a base station 105 also discloses that a first network node is configured to receive information from a second network node), the broader example of the narrower example may be interpreted in the reverse, but in a broad open-ended way. In the example above where a UE 115 being configured to receive information from a base station 105 also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, a network device 140 may be implemented in a disaggregated architecture (e.g., a disaggregated base station architecture, a disaggregated radio access network (RAN) architecture), which may be configured to utilize a protocol stack that is physically or logically distributed among two or more network devices 140, such as an IAB network, an open RAN (O-RAN) (e.g., a network configuration sponsored by the O-RAN Alliance), or a virtualized RAN (vRAN) (e.g., a cloud RAN (C-RAN)). For example, a network device 140 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof An RU 170 may also be referred to as a radio head, a smart radio head, a remote radio head (RRH), a remote radio unit (RRU), or a transmission reception point (TRP). One or more components of the network devices 140 in a disaggregated RAN architecture may be co-located, or one or more components of the network devices 140 may be located in distributed locations (e.g., separate physical locations). In some examples, one or more network devices 140 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, radio frequency (RF) functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network devices 140 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network devices 140 (e.g., IAB nodes) may be partially controlled by each other. One or more IAB nodes may be referred to as a donor entity or an IAB donor. One or more DUs 165 or one or more RUs 170 may be partially controlled by one or more CUs 160 associated with a donor network device 140 (e.g., a donor base station 105). The one or more donor network devices 140 (e.g., IAB donors) may be in communication with one or more additional network devices 140 (e.g., IAB nodes) via supported access and backhaul links (e.g., backhaul links 120). IAB nodes may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node used for access via the DU 165 of the IAB node (e.g., referred to as virtual IAB-MT (vIAB-MT)). In some examples, the IAB nodes may include DUs 165 that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

For instance, an access network (AN) or RAN may include communications between access nodes (e.g., an IAB donor), IAB nodes, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node may refer to a RAN node that provides IAB functionality (e.g., access for UEs 115, wireless self-backhauling capabilities). A DU 165 may act as a distributed scheduling node towards child nodes associated with the IAB node, and the IAB-MT may act as a scheduled node towards parent nodes associated with the IAB node. That is, an IAB donor may be referred to as a parent node in communication with one or more child nodes (e.g., an IAB donor may relay transmissions for UEs through one or more other IAB nodes). Additionally, or alternatively, an IAB node may also be referred to as a parent node or a child node to other IAB nodes, depending on the relay chain or configuration of the AN. Therefore, the IAB-MT entity of IAB nodes may provide a Uu interface for a child IAB node to receive signaling from a parent IAB node, and the DU interface (e.g., DUs 165) may provide a Uu interface for a parent IAB node to signal to a child IAB node or UE 115.

For example, IAB node may be referred to as a parent node that supports communications for a child IAB node, and referred to as a child IAB node associated with an IAB donor. The IAB donor may include a CU 160 with a wired or wireless connection (e.g., a backhaul link 120) to the core network 130 and may act as parent node to IAB nodes. For example, the DU 165 of IAB donor may relay transmissions to UEs 115 through IAB nodes, and may directly signal transmissions to a UE 115. The CU 160 of IAB donor may signal communication link establishment via an F1 interface to IAB nodes, and the IAB nodes may schedule transmissions (e.g., transmissions to the UEs 115 relayed from the IAB donor) through the DUs 165. That is, data may be relayed to and from IAB nodes via signaling over an NR Uu interface to MT of the IAB node. Communications with IAB node may be scheduled by a DU 165 of IAB donor and communications with IAB node may be scheduled by DU 165 of IAB node.

In the case of the techniques described herein applied in the context of a disaggregated RAN architecture, one or more components of the disaggregated RAN architecture may be configured to support active interference cancellation for sidelink transmissions as described herein. For example, some operations described as being performed by a UE 115 or a network device 140 (e.g., a base station 105) may additionally, or alternatively, be performed by one or more components of the disaggregated RAN architecture (e.g., IAB nodes, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105, the network devices 140, or both and the network equipment including macro eNBs or gNBs, small cell eNBs or gNBs, or relay base stations, among other examples, as shown in FIG. 1.

The UEs 115 and the base stations 105, the network devices 140, or both may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105, a network device 140, or both may be movable and therefore provide communication coverage for a moving geographic coverage area 110. In some examples, different geographic coverage areas 110 associated with different technologies may overlap, but the different geographic coverage areas 110 may be supported by the same base station 105 or the same network device 140. In other examples, the overlapping geographic coverage areas 110 associated with different technologies may be supported by different base stations 105 or different network devices 140. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as a network device 140, which may be an example of an access node controller (ANC). Each network device 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each network device 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105, a network device 140, or a UE 115 may be equipped with multiple antennas, which may be used to employ techniques such as transmit diversity, receive diversity, multiple-input multiple-output (MIMO) communications, or beamforming. The antennas of a base station 105, a network device 140, or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 or a network device 140 may be located in diverse geographic locations. A base station 105 or a network device 140 may have an antenna array with a number of rows and columns of antenna ports that the base station 105 or the network device 140 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105, a network device 140, or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a network device 140, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 or the network device 140 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some wireless communications systems, such as wireless communications system 100, a device may implement techniques for transmitting HARQ feedback. In various examples, a communication manager 101 may be included in a device to support such techniques. For example, a UE 115 may include a communications manager 101-a, or a base station 105 (such as a network device 140 or a satellite) may include a communications manager 101-b.

In some cases, a UE 115 may communicate with another device (e.g., a satellite, a base station 105, or a network device 140) and communications manager 101-a may receive an indication, from communications manager 101-b, of a codebook type for transmitting HARQ feedback by the UE 115 to the device. The indication of the codebook type may indicate a HARQ feedback transmission configuration, such as a static HARQ feedback transmission configuration (e.g., for semi-static reporting, or dynamic reporting). The HARQ transmission configuration may be associated with a one bit or two bit HARQ codebook. Communications manager 101-a may receive a downlink shared channel transmission (e.g., PDSCH), and attempt to decode the received downlink shared channel transmission. Communications manager 101-a may transmit (or refrain from transmitting) the HARQ feedback based on the decoding of the downlink shared channel transmission and in accordance with the feedback mode. Communications manager 101-b may receive the HARQ feedback (e.g., semi-static HARQ feedback, or dynamic HARQ feedback) from communications manager 101-a and determine whether to re-transmit one or more PDSCHs based on the HARQ feedback and in accordance with the codebook type. In some cases, communications manager 101-b may re-transmit one or more PDSCHs in separate downlink transmissions. In some cases, communications manager 101-b may apply network coding to one or more retransmission, such as when the UE unsuccessfully decodes more than one PDSCH.

Figure 2A:
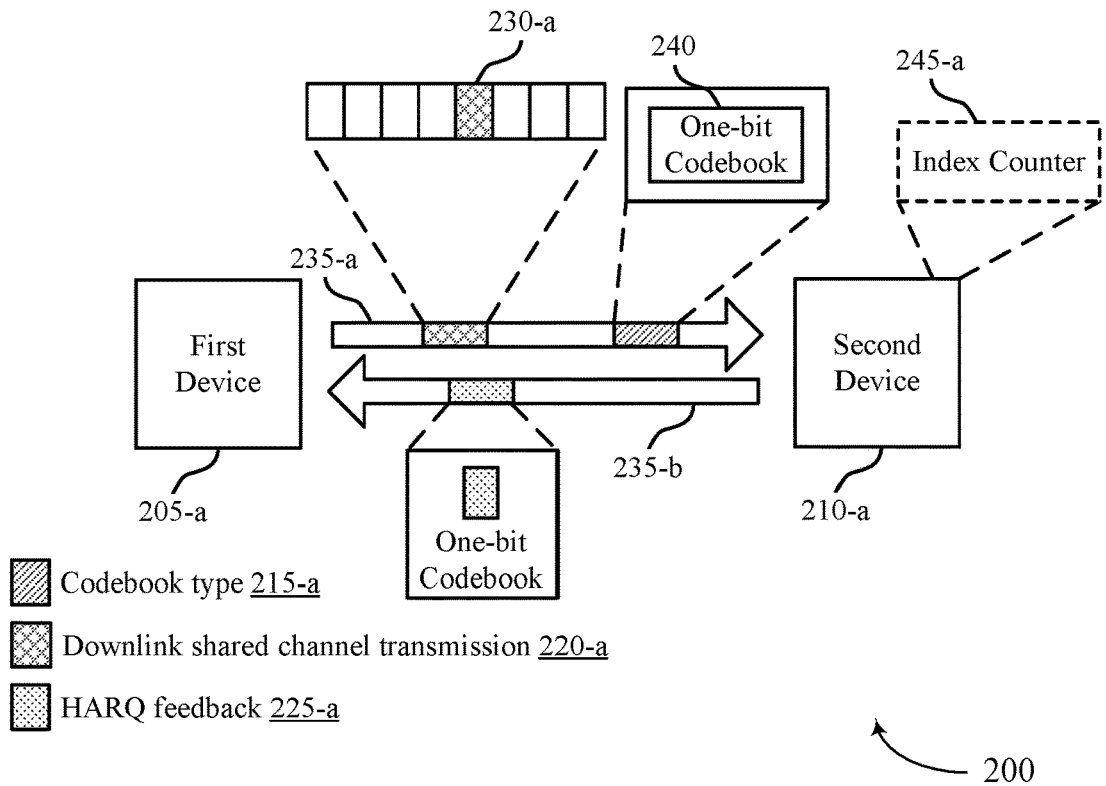
FIGS. 2A and 2B each show an example of a wireless communications system that supports techniques for transmitting HARQ feedback in accordance with one or more aspects of the present disclosure.
Figure 2B:
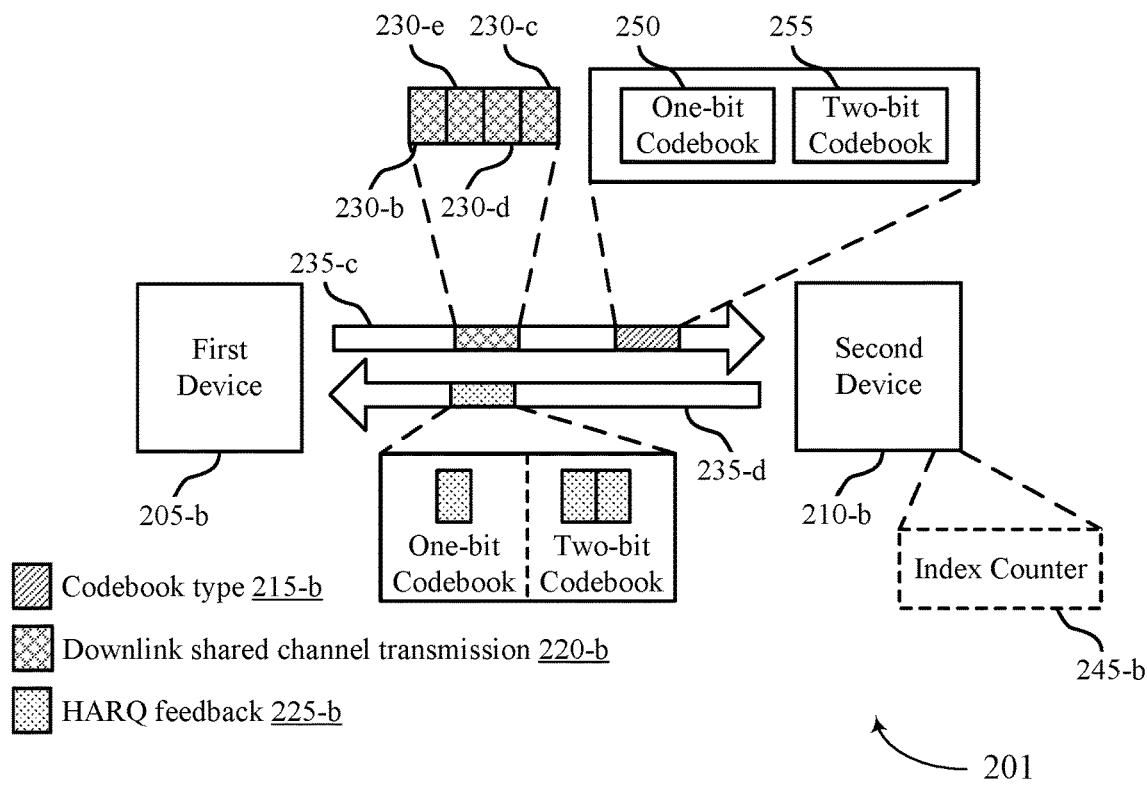

FIGS. 2A and 2B illustrate examples of wireless communications systems 200 and 201, respectively, that support techniques for transmitting HARQ feedback in accordance with one or more aspects of the present disclosure. The wireless communications systems 200 and 201 may include a first device 205 (e.g., first device 205-a, and first device 205-b, respectively) and a second device 210 (e.g., second device 210-a, and second device 210-b, respectively). A first device 205 may refer to a base station, satellite, or some other high power device, which may be examples of a base station 105 and satellite as described with reference to FIG. 1. A second device 210 may refer to a UE, or some other low power device, and may be an example of a UE as described with reference to FIG. 1.

In some wireless communications systems (e.g., LTE, NR, NTN), a first device 205 (e.g., base station, satellite) may transmit one or more downlink signals to a second device 210 (e.g., a UE) via a communication link 235 (e.g., a downlink communications link) and the second device 210 may transmit one or more uplink signals to the first device 205 via a communication link 235 (e.g., an uplink communications link). For example, a first device 205 may transmit a control channel (e.g., a PDCCH) transmission indicating information associated with a corresponding shared channel (e.g., a downlink shared channel transmission 220, such as a PDSCH) transmission. A second device 210 may receive the PDCCH and attempt to receive and decode the corresponding PDSCH based on the information included in the PDCCH. In some cases, the second device 210 may be configured to transmit HARQ feedback to the first device 205 to indicate a decoding result of the PDSCH (e.g., to indicate whether the second device 210 successfully decoded the PDSCH). If the second device 210 successfully decoded the PDSCH, the second device 210 may transmit an ACK as HARQ feedback. Upon receiving an ACK feedback message, the first device 205 may continue transmitting downlink signals to the second device 210. If however, the second device 210 unsuccessfully received and/or decoded the PDSCH, the second device 210 may transmit a NACK as HARQ feedback. Upon receiving a NACK, the first device 205 may re-transmit the PDSCH to the second device.

In some cases, link budget may impact communications between the first device 205 and the second device 210. Link budget may refer to the achievable SNR of a device and may be based on transmit power of the device. For example, in some cases, uplink and downlink budgets may be unequal and when this imbalance occurs, downlink throughput may be limited by uplink HARQ feedback. In some case, such imbalances may occur due to limited transmit power at the second device 210 (e.g., a UE). As a result, a first device 205 (e.g., a satellite, a base station) may transmit a downlink message to a second device 210 (e.g., a UE) during a first time period, and the second device 210 by transmit HARQ feedback to the first device 205 during a second time period. The second time period may be longer than the first time period due to the difference in transmit powers between the first device 205 and the second device 210. Transmitting a second downlink message and/or retransmitting the downlink message in response to the HARQ feedback may be limited by the ability of the second device 210 to transmit HARQ feedback 225 (e.g., how quickly the second device may transmit HARQ feedback).

For example, such link budget imbalances may occur in an NTN, where a satellite may transmit with a large transmit power compared to a UE (e.g., the achievable uplink SNR may be 20 dB below that of the achievable downlink SNR due to limited UE transmit power). Therefore, to transmit with satisfactory performance, the UE may use more resources (e.g., time resources) to transmit an uplink transmission compared to a downlink transmission of equivalent size transmitted by the satellite. Uplink SNR may be less than −10 dB for a UE (e.g., smart phone with 23 dBm transmit power), in some cases, with one physical resource block (PRB). As such, the UE may use two slots to transmit a 1 bit HARQ-ACK with satisfactory performance. Accordingly, downlink transmissions from the satellite to the UE may be limited by the ability of the UE to transmit HARQ feedback because the UE may use more resources (e.g., time resources) to transmit a HARQ feedback transmission than a downlink transmission of an equivalent size, and as a subsequent downlink transmission or retransmission is based on the HARQ feedback, the limiting factor of the downlink throughput may be the HARQ transmission.

Communication networks with imbalances between downlink and uplink link budgets (e.g., large imbalances, imbalances above a threshold) may employ techniques to adjust HARQ codebook design to enable efficient HARQ reporting. For example, a UE may be configured to transmit a HARQ codebook with a limited number of bits (e.g., one bit, or two bits) to decrease the number of resources per scheduled PDSCH the UE may use to transmit the HARQ feedback transmission, where the HARQ codebook may be a first HARQ codebook type, or a second HARQ codebook type. In some cases, downlink block error rate (BLER) target may be reduced to implement such efficient HARQ reporting. To lower BLER target in the downlink, the first device 205 and/or the second device 210 may be configured with one or more channel quality indicator (CQI) tables, where the CQI tables may be for use when downlink and uplink link budgets are imbalanced.

With reference to FIG. 2A, second device 210-a may be configured to transmit a semi-static HARQ codebook to first device 205-a. In the case of a semi-static HARQ codebook (e.g., when link budgets are balanced), the feedback codebook size may be determined by semi-static information and based on candidate PDSCH occasions, such as all possible or potential occasions where a PDSCH could occur in the time window (e.g., maximum potential PDSCH candidates) that the HARQ codebook is responsible. The time window may include any number of TTIs, slots, symbols, seconds, etc. and may be preconfigured or indicated (e.g., dynamically) to the second device 210. For example, the time window may include 8 slots 230 and as such, second device 210-a may monitor for PDSCHs (e.g., downlink shared channel transmissions 220) in the time window. Second device 210-a may successfully receive and decode one PDSCH in slot 230-a but may fail to successfully receive and decode PDSCH in any of the other 7 slots. Therefore, even though second device 210-a only received one PDSCH, second device 210-a may transmit a semi-static HARQ codebook including eight bits to indicate in which slot 230 second device 210-a received a PDSCH (e.g., the HARQ codebook may include 00001000). The second device 210-a may maintain an index counter 245-a associated with a DAI counter. In some aspects, the second device 210-a may increment the index counter 245-a each time the second device 210-a receives a DAI or a DAI counter from the first device 205-a. In some aspects, the second device 210-a may store a value indicated by a received DAI counter in the index counter 245-a of the second device 210-a.

In cases where the downlink and uplink link budget is imbalanced, second device 210-a may be configured, such as by first device 205-a, or some other network device, to transmit feedback according to a codebook type 215 (e.g., a non-codebook based feedback mode, a semi-static HARQ feedback mode, the first HARQ codebook type). For example, first device 205-a may transmit, to second device 210-a, an indication of codebook type 215-a via communications link 235-a. Codebook type 215-a may indicate a static HARQ feedback transmission configuration for second device 210-a to use to transmit HARQ feedback 225-a to first device 205-a and/or one or more other devices (e.g., other UEs, other base station stations, other satellites). In some cases, first device 205-a may transmit an indication of codebook type 215-a based on determining that the uplink and downlink link budget between first device 205-a and second device 210-a is large, or above a threshold (e.g., a predefined threshold). In some cases, first device 205-a may configure second device 210-a to operate according to codebook type 215-a for a duration (e.g., a predefined duration, an indicated duration) and then to switch back to codebook based HARQ feedback. In some cases, first device 205-a may configure second device 210-a to operate according to codebook type 215-a until first device 205-a transmits an indication for second device 210-a to stop using codebook type 215-a, and/or to switch to a different codebook type. First device 205-a may transmit the indication of codebook type 215-a in RRC signaling, MAC control element (MAC-CE) signaling, or DCI signaling.

Codebook type 215-a may indicate (or otherwise be associated with) a one-bit codebook 240 (e.g., a HARQ codebook size equal to one bit), such that second device 210-a may transmit one feedback bit per scheduled PDSCH. Second device 210-a may transmit the feedback bit in a scheduled physical uplink control channel (PUCCH) corresponding to the PDSCH. As such, first device 205-a may schedule PDSCHs and/or corresponding PUCCHs such that there are no two PDSCHs whose corresponding PUCCHs overlap in time so as to enable first device 205-a and second device 210-a to be able to map each feedback bit to the appropriate PDSCH. For example, the second device 210 may receive a first message indicating a first set of resources (e.g., time resources) for transmitting HARQ feedback associated with a first PDSCH and a second message indicating a second set of resources for transmitting HARQ feedback associated with a second PDSCH, where the first set of resources and the second set of resources are associated with unique time resources (e.g., avoid overlapping). If however, the first set of resources and the second set of resources do overlap, the second device 210 may determine that an error occurred, and may refrain from transmitting HARQ feedback for the first PDSCH and/or the second PDSCH. In some cases, the second device 210 may transmit an indication to the first device 205 that an error occurred.

In some implementations, codebook type 215-a may prompt second device 210-a to transmit a positive feedback bit (e.g., 1) if second device 210-a successfully decodes a PDSCH. Otherwise, second device 210-a may refrain from transmitting feedback (e.g., a feedback bit). In some implementations, codebook type 215-a may prompt second device 210-a to transmit a negative feedback bit (e.g., 0) if second device 210-a unsuccessfully decodes a PDSCH. In some implementations, codebook type 215-a may prompt second device 210-a to transmit a negative feedback bit (e.g., 0) if second device 210-a successfully decodes a PDCCH and unsuccessfully receives or decodes the PDSCH corresponding to the PDCCH. In this case, first device 205-a may receive the negative feedback bit and identify that second device 210-a was able to receive and decode the PDCCH but unable to receive and decode the corresponding PDSCH which may allow first device 205-a (e.g., the network) to re-transmit the PDSCH with different transmission parameters (e.g., a different redundancy version) to improve decoding probability of the PDSCH retransmission.

Therefore, second device 210-a may receive an indication of codebook type 215-a via communication link 235-a, and second device 210-a may operate according to codebook type 215-a based on receiving the indication. Second device 210-a may monitor for a PDSCH transmission (e.g., downlink shared channel transmission 220-a), such as in a time window, based on one or more previous received corresponding PDCCHs. Second device 210-a may determine whether to transmit a one bit positive feedback bit, negative feedback bit, or no feedback bit for each received PDSCH (e.g., for which second device 210-a received a corresponding PUCCH) based on whether second device 210-a successfully decoded the PDCCH and/or the corresponding PDSCH. Based on the ability of second device 210-a to decode the PDSCH, second device 210-a may transmit HARQ feedback 225-a including one feedback bit (e.g., a 0 or 1) via communication link 235-b (e.g., in a PUCCH). For example, second device 210-a may or may refrain from transmitting (e.g., based on codebook type 215-a) a single HARQ feedback transmission (e.g., including one bit) to indicate the ability of second device 210-a to receive and decode the PDSCH in slot 230-a.

With reference to FIG. 2B, second device 210-b may be configured to transmit a dynamic HARQ codebook to first device 205-b. In the case of a dynamic HARQ codebook (e.g., when link budgets are balanced), the feedback codebook size may be equal to the number of PDSCHs transmitted by first device 205-*b*. To determine the number of transmitted PDSCHs, second device 210-*b* may use a counter downlink assignment index (cDAI) and/or a total downlink assignment index (tDAI) included in DCI of a PDCCH. For example, in some cases, a second device 210 may fail to decode one or more of the PDCCHs and may implement methods for detecting a missed downlink shared message and notifying the first device 205 of the missed downlink shared message. For example, a DCI may include a cDAI (e.g., a multi-bit field or some other indicator) to support identification of a missed downlink control and/or shared message. The cDAI may represent a number, such as a cumulative number, associated with at least some, if not each, respective downlink control message corresponding to a same feedback opportunity. In some cases, the feedback opportunity may also be indicated in the downlink control message. A second device 210 may use the cDAI to create a list of received cDAIs and to detect cDAI gaps in the list, for example, corresponding to one or more missed downlink control and/or shared messages. As described herein, a downlink control message may be equivalently referred to as a downlink control channel message or transmission and a downlink shared message may be equivalently referred to as a downlink shared channel message or transmission.

In some examples, the first device 205 may transmit downlink messages to the second device 210 over multiple component carriers (CCs) (e.g., as a part of carrier aggregation). The first device 205 may include a tDAI (e.g., a multi-bit field or some other indicator) in at least some of the downlink control messages, where the tDAI may represent a total number of downlink control messages that are transmitted in a same monitoring period (e.g., a same PDCCH monitoring period) across the multiple CCs. As each PDCCH may correspond to a PDSCH, the tDAI may represent a total number of downlink shared messages that are transmitted in a same monitoring period (e.g., a same PDSCH monitoring period) across the multiple CCs. Accordingly, the second device 210 may identify one or more missed downlink control and/or shared messages for a monitoring period if the second device 210 fails to receive a number of downlink control messages over the PDCCH monitoring period equal to the number indicated by the tDAI, or a number of downlink shared messages over the PDSCH monitoring period equal to the number indicated by the tDAI. In some examples, the second device 210 may use the cDAI field and the tDAI field to identify one or more missed downlink control and/or shared messages. As described herein, a downlink assignment index (DAI) may represent a tDAI, a cDAI, or both, and a DAI field may represent a tDAI field, a cDAI field, or both. In some examples, the DAI may be a field in DCI that indicates an index of a downlink resource assignment (e.g., a downlink channel assignment). The second device 210-*b* may maintain an index counter 245-*b* associated with a DAI counter. In some aspects, the second device 210-*b* may increment the index counter 245-*b* each time the second device 210-*b* receives a DAI or a DAI counter from the first device 205-*b*. In some aspects, the second device 210-*b* may store a value indicated by a received DAI counter in the index counter 245-*b* of the second device 210-*b*.

The second device 210 may transmit, to the first device 205, a message providing feedback for the one or more missed downlink data messages and/or the one or more successfully decoded downlink messages. The second device 210 may transmit the feedback message in a feedback opportunity scheduled for the multiple downlink data messages. For example, in accordance with a dynamic HARQ codebook configuration (e.g., when downlink and uplink budgets are balanced), second device 210-*b* may identify that first device 205-*b* transmitted PDSCHs (e.g., downlink shared channel transmissions 220-*b*) in slots 230-*b*, 230-*c*, 230-*d*, and 230-*e*. Second device 210-*b* may transmit a dynamic HARQ codebook that includes one bit for each transmitted PDSCH, such that second device 210-*b* may transmit HARQ feedback 225-*b* including four bits. For example, a first bit may be associated with the PDSCH transmitted in slot 230-*b* and may indicate whether second device 210-*b* successfully decoded the PDSCH in slot 230-*b* (e.g., via an ACK or NACK), a second bit may be associated with the PDSCH transmitted in slot 230-*c* and may indicate whether second device 210-*b* successfully decoded the PDSCH in slot 230-*c* (e.g., via an ACK or NACK), and so on.

In cases where the downlink and uplink link budget is imbalanced, second device 210-*b* may be configured, such as by first device 205-*b*, or some other network device, to transmit feedback according to a codebook type (e.g., a limited size codebook, the second HARQ codebook type). For example, first device 205-*b* may transmit, to second device 210-*b*, an indication of codebook type 215-*b* via communications link 235-*c*. Codebook type 215-*b* may indicate a HARQ feedback transmission configuration for second device 210-*b* to use to transmit HARQ feedback 225-*b* to first device 205-*b* and/or one or more other devices (e.g., other UEs, other base station stations, other satellites). In some cases, first device 205-*b* may transmit an indication of codebook type 215-*b* based on determining that the uplink and downlink link budget between first device 205-*b* and second device 210-*b* is large, or above a threshold (e.g., a predefined threshold). In some cases, codebook type 215-*b* may be used for limited tDAI and or cDAI bits, such as two bits. In some cases, first device 205-*b* may configure second device 210-*b* to operate according to codebook type 215-*b* for a duration (e.g., a predefined duration, an indicated duration) and then to switch back to codebook based HARQ feedback. In some cases, first device 205-*b* may configure second device 210-*b* to operate according to codebook type 215-*a* until first device 205-*b* transmits an indication for second device 210-*a* to stop using codebook type 215-*b*, and/or to switch to a different feedback mode. First device 205-*b* may transmit the indication of codebook type 215-*b* in RRC signaling, MAC-CE signaling, or DCI signaling.

In some cases, codebook type 215-*b* may indicate (or otherwise be associated with) a one-bit codebook 250 (e.g., a HARQ codebook size equal to one bit), such that second device 210-*b* may transmit one feedback bit per one or more scheduled PDSCHs in a set. Second device 210-*b* may transmit the feedback bit in a scheduled PUCCH (e.g., scheduled feedback opportunity). In some implementations, codebook type 215-*b* may indicate to second device 210-*b* to transmit a positive feedback bit (e.g., 1) if second device 210-*b* successfully received and decoded each PDSCH in the set. In some cases, codebook type 215-*b* may prompt second device 210-*b* to transmit a negative feedback bit (e.g., 0), or no feedback bit if second device 210-*b* unsuccessfully decoded at least one PDSCH in the set. In some cases, codebook type 215-*b* may prompt second device 210-*b* to refrain from transmitting a feedback bit if second device 210-*b* unsuccessfully decoded all PDSCHs in the set.

In some cases, codebook type 215-*b* may indicate (or otherwise be associated with) a two-bit codebook 255 (e.g., a HARQ codebook size equal to two bits), such that second device 210-*a* may transmit two feedback bits per one or more scheduled PDSCHs in a set. Second device 210-*b* may transmit the feedback bits in a scheduled PUCCH (e.g., scheduled feedback opportunity). In some implementations, codebook type 215-*b* may prompt second device 210-*b* to use the two bits to indicate the ability of second device 210-*a* to receive and decode PDSCHs in the set. For example, second device 210-*b* may use a two bit combination to indicate that second device 210-*b* decoded all PDSCHs in the set, unsuccessfully decoded one PDSCH in the set, successfully decoded one PDSCH in the set, unsuccessfully decoded two PDSCHs in the set, successfully decoded two PDSCHs in the set, unsuccessfully decoded more than two PDSCHs in the set, successfully decoded more than two PDSCHs in the set, etc. The listed decoding scenarios are examples, as such, the second device 210 may not be limited by the listed examples. In some cases, first device 205-*b* and second device 210-*b* may be configured with a table that maps decoding scenarios to a two bit index. In some cases, first device 205-*b* may configure the table and signal the table to second device 210-*b*. For example, the table may include all PDSCHs in the set successfully decoded mapped to a 11 index, unsuccessfully decoding one PDSCH in the set mapped to a 01 index, unsuccessfully decoding two PDSCHs in the set mapped to a 10 index, and unsuccessfully decoding more than two PDSCHs in the set mapped to a 11 index. As such, second device 210-*b* may determine a number of PDSCHs in the set that second device 210-*b* successfully decoded and determine a two bit feedback combination based on the table.

In some implementations, first device 205-*a* and second device 210-*b* may be preconfigured with the feedback transmission parameters associated with codebook type 215-*b* (e.g., a number of feedback bits, when to transmit a 1, when to transmit a 0, when to refrain from transmitting a feedback transmission). For example, second device 210-*b* may be preconfigured to associate codebook type 215-*b* with a one bit feedback transmission. In another example, second device 210-*b* may be preconfigured to associate codebook type 215-*b* with a two bit feedback transmission. In some implementations, first device 205-*a* (or some other network device) may determine the feedback transmission parameters associated with codebook type 215-*b* and first device 205-*b* may indicate the feedback transmission parameters to second device 210-*b* in RRC signaling, MAC-CE signaling, or DCI signaling.

Therefore, second device 210-*b* may receive an indication of codebook type 215-*b* via communication link 235-*c*, and second device 210-*b* may operate according to codebook type 215-*b* based on receiving the indication. Second device 210-*b* may monitor for PDSCH transmissions (e.g., downlink shared channel transmission 220-*b*), such as in a time window (e.g., slots 230-*b*, 230-*c*, 230-*d*, and 230-*e*). For example, first device 205-*b* may transmit a PDSCH in slot 230-*b*, a PDSCH in slot 230-*c*, a PDSCH in slot 230-*d*, and a PDSCH in slot 230-*e*. Second device 210-*b* may attempt to receive and decode each of the PDSCHs (e.g., based on previously received corresponding PUCCHs) in slots 230-*b*, 230-*c*, 230-*d*, and 230-*e* and determine the appropriate feedback transmission configuration (e.g., a one bit or two bit feedback transmission) based on the ability of second device 210-*b* to decode the PDSCHs and based on codebook type 215-*b*. For example, second device 210-*b* may transmit a single HARQ feedback transmission (e.g., including one bit or two bits) to indicate the ability of second device 210-*b* to receive and decode the PDSCHs in slots 230-*b*, 230-*c*, 230-*d*, and 230-*e*. Accordingly, second device 210-*b* may transmit HARQ feedback 225-*b* via communication link 235-*d* (e.g., in a PUCCH).

Upon receiving HARQ feedback 225, the first device 205 (e.g., first device 205-*a*, first device 205-*b*) may determine whether to transmit a re-transmission of one or more PDSCHs or to continue transmitting scheduled PDSCHs. In some implementations, the first device 205 may re-transmit PDSCHs in individual transmissions (e.g., separate transmissions). In some implementations, the first device 205 may encode multiple PDSCHs and transmit the encoded PDSCHs in a single transmission. First device 205 may encode multiple PDSCHs via an XOR (e.g., bit-wise XOR) encoding procedure. In some cases, the first device 205 and second device 210 may each be configured with the retransmission and network encoding scheme that the first device 205 may use, or the first device 205 may determine the retransmission and network encoding scheme and signal the scheme to the second device 210 to allow the second device 210 to determine how to decode one or more retransmissions. The first device 205 may determine to apply a network encoding (e.g., network coding) scheme to multiple PDSCHs and/or determine which encoding scheme to apply based on a number of transmitted PDSCHs (e.g., determined by DAI counters), the number of PDSCHs the second device failed to decode, or a combination thereof. The retransmission and networking encoding schemes may be based on a number of unsuccessfully decoded PDSCHs, where the first device 205 may configure and signal the number of transmitted PDSCHs to the second device 210.

In some cases, the first device 205 may determine whether to encode multiple PDSCHs based on the HARQ feedback 225. For example, in the case of dynamic HARQ feedback (as described with reference to FIG. 2B), if second device 210-*b* reported that second device 210-*b* failed to decode one PDSCH in a set, first device 205-*b* may determine to encode each of the PDSCHs in the set and retransmit the encoded PDSCHs. For example, PDSCH in slot 230-*b* may correspond to D1, PDSCH in slot 230-*c* may correspond to D2, PDSCH in slot 230-*d* may correspond to D3, and PDSCH in slot 230-*e* may correspond to D4, and first device 205-*b* may encode D1, D2, and D3, and D4 via an XOR function (e.g., Dn=D1 XOR D2 XOR D3 XOR D4). In some cases, first device 205-*b* may pad D1, D2, D3, and D4 to the same length (e.g., by adding bits). First device 205-*b* may transmit the encoded PDSCHs (e.g., Dn) to second device 210-*b* and second device 210-*b* may use the encoded transmission to determine which original PDSCHs the second device 210-*b* already successfully decoded and to attempt to decode the PDSCH second device previously failed to decode. In another example, if second device 210-*b* reported that second device 210-*b* failed to decode more than one PDSCH in the set, first device 205-*b* may determine to retransmit each PDSCH in the set in a separate transmission (e.g., in separate slots without encoding).

In some cases, the codebook size of a codebook type 215-*b* may be based on the number of scheduled PDSCHs. For example, if more than two PDSCHs are scheduled, the codebook size may equal two bits. Otherwise the codebook size may equal one bit. In some cases, the first device 205-*a* may indicate the codebook size in DCI.

Figure 3:
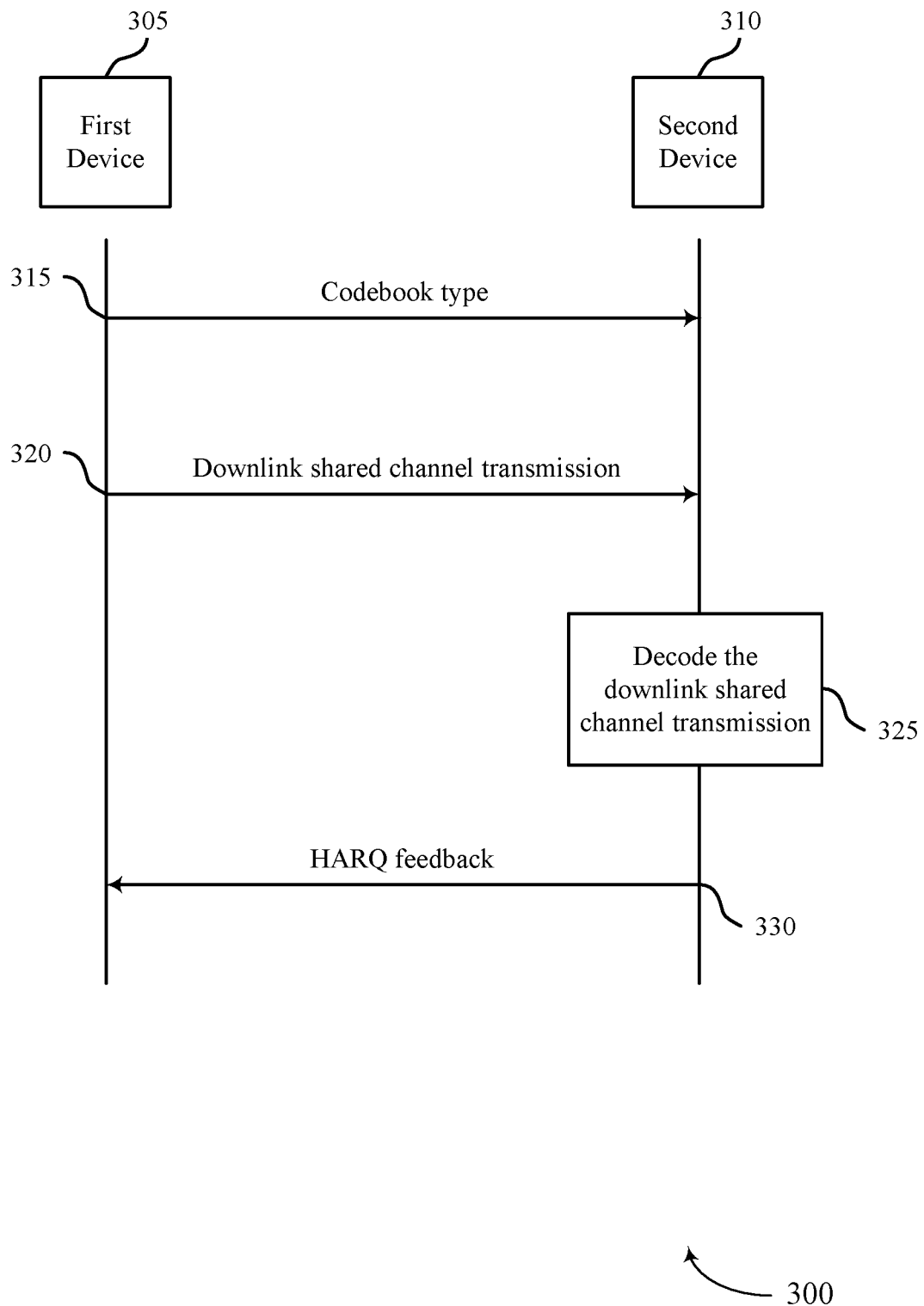
FIG. 3 shows an example of a process flow that supports techniques for transmitting HARQ feedback in accordance with one or more aspects of the present disclosure.

FIG. 3 illustrates an example of a process flow 300 that supports techniques for transmitting HARQ feedback in accordance with one or more aspects of the present disclosure. The process flow 300 may illustrate an example HARQ feedback transmission procedure. For example, a second device 310 (e.g., a UE) may determine HARQ feedback to transmit to a first device 305 (e.g., base station, satellite) based on the ability of the second device 310 to receive and decode one or more downlink shared channel transmissions and based on a feedback mode. The first device 305 and the second device 310 may be examples of the corresponding devices described with reference to FIGS. 1 through 2B. In some cases, instead of the second device 310 implementing the HARQ feedback procedure, a different type of wireless device (e.g., a first device 305) may perform the same or similar procedure. Alternative examples of the following may be implemented, where some steps are performed in a different order than described or are not performed at all. In some cases, steps may include additional features not mentioned below, or further steps may be added.

At 315, second device 310 may receive an indication of a codebook type to transmit HARQ feedback by the first device. The indication of the codebook type may indicate a static HARQ feedback codebook, and the indicated static HARQ feedback codebook may be associated with a fixed codebook size. The codebook type may be associated with a one bit HARQ feedback size for transmitting the HARQ feedback by the second device 310. The second device 310 may receive an RRC message including the indication of the codebook type.

In some cases, the second device 310 may receive a first message indicating a first set of resources for transmitting the HARQ feedback associated with the downlink shared channel transmission and a second message indicating a second set of resources for transmitting second HARQ feedback associated with a second downlink shared channel transmission. The first set of resources and the second set of resources associated with unique time resources (e.g., non-overlapping time resources).

In some cases, the second device 310 may receive a first message indicating a first set of resources for transmitting the HARQ feedback associated with the downlink shared channel transmission and a second message indicating a second set of resources for transmitting second HARQ feedback associated with a second downlink shared channel transmission. The first set of resources and the second set of resources may overlap in time (e.g., partially or fully). The second device 310 (and/or the first device 305) may determine an error associated with the first set of resources and the second set of resources based on the first set of resources and the second set of resources overlapping in time.

At 320, second device 310 may receive a downlink shared channel transmission (e.g., PDSCH).

At 325, second device 310 may decode the received downlink shared channel transmission.

At 330, second device 310 may transmit the HARQ feedback based on a decoding result of the received downlink shared channel transmission and in accordance with the codebook type, where the decoding result is associated with one of a successful decoding or an unsuccessful decoding. In some cases, the second device 310 may transmit an ACK that the second device 310 successfully decoded the received downlink shared channel transmission. In some cases, the second device 310 may transmit an uplink control channel transmission (e.g., PUCCH) including the HARQ feedback.

In some implementations, the second device 310 may determine that the second device 310 unsuccessfully decoded a second downlink shared channel transmission, and may determine to refrain from transmitting a second HARQ feedback transmission based on the decoding of the second downlink shared channel transmission being unsuccessful.

In some implementations, the second device 310 may receive a downlink control channel transmission (e.g., PDCCH), where the downlink control channel transmission may be associated with the received downlink shared channel transmission, and the second device 310 may decode the received downlink control channel transmission. Transmitting the HARQ feedback may be based on the decoding of the received downlink control channel transmission and the received downlink shared channel transmission being successful.

In some implementations, the second device 310 may decode a received downlink control channel transmission, where the received downlink control channel transmission may be associated with a second downlink shared channel transmission. The second device 310 may determine that the second device 310 unsuccessfully decoded the second downlink shared channel transmission, and transmit second HARQ feedback based on the decoding of the second downlink shared channel transmission being unsuccessful and the decoding of the received downlink control channel transmission being successful. The second HARQ feedback may include a NACK.

Figure 4:
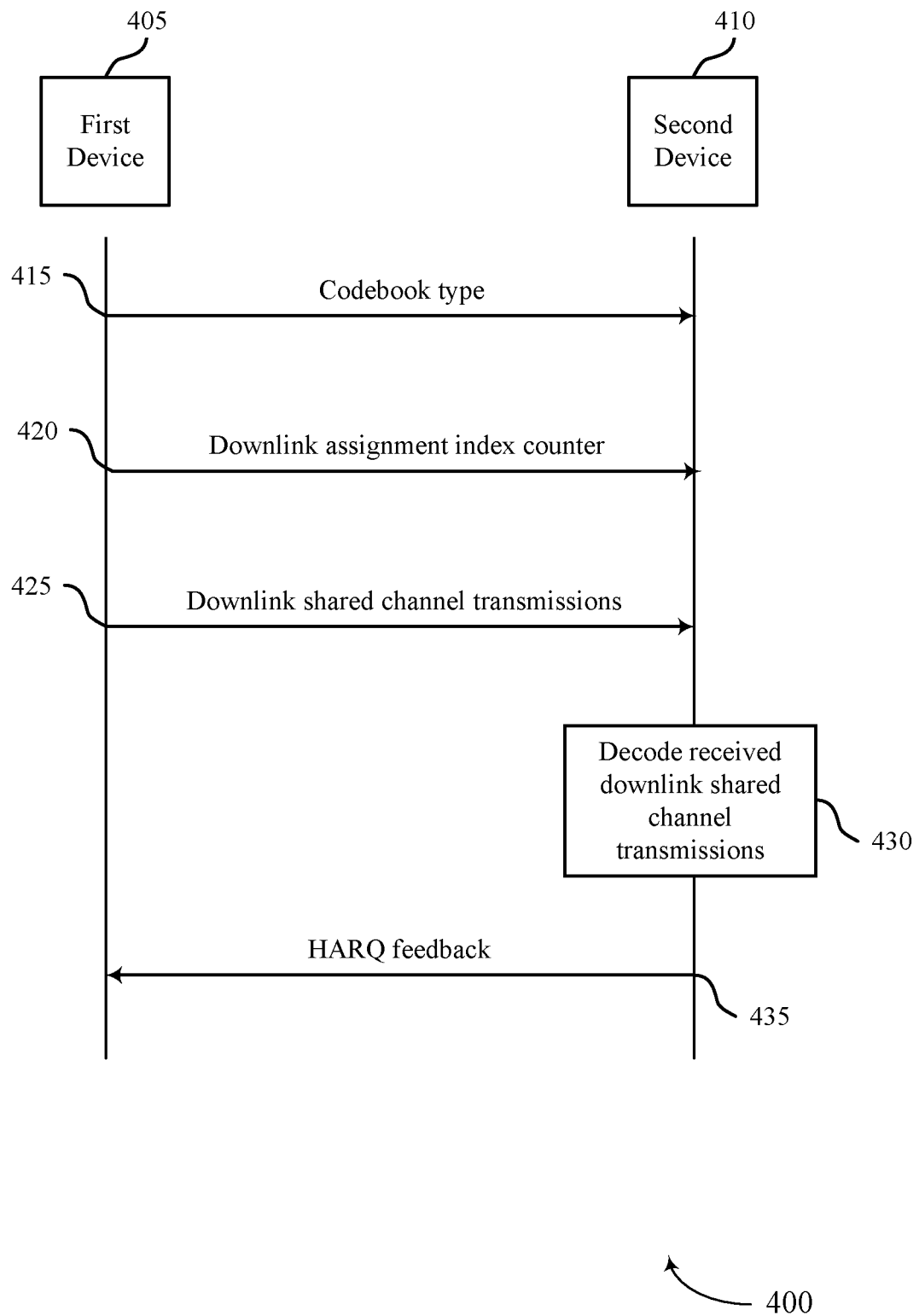
FIG. 4 shows an example of a process flow that supports techniques for transmitting HARQ feedback in accordance with one or more aspects of the present disclosure.

FIG. 4 illustrates an example of a process flow 400 that supports techniques for transmitting HARQ feedback in accordance with one or more aspects of the present disclosure. The process flow 400 may illustrate an example HARQ feedback transmission procedure. For example, a second device 410 (e.g., a UE) may determine HARQ feedback to transmit to a first device 405 (e.g., a network device, a base station, or a satellite) based on the ability of the second device 410 to receive and decode one or more downlink shared channel transmissions and based on a feedback mode. The first device 405 and the second device 410 may be examples of the corresponding devices described with reference to FIGS. 1 through 2B. In some cases, instead of the second device 410 implementing the HARQ feedback procedure, a different type of wireless device (e.g., a first device 405) may perform the same or similar procedure. Alternative examples of the following may be implemented, where some steps are performed in a different order than described or are not performed at all. In some cases, steps may include additional features not mentioned below, or further steps may be added.

At 415, the second device 410 may receive an indication of a codebook type to transmit HARQ feedback by the second device 410. The codebook type may indicate a HARQ codebook size and usage of downlink assignment index counters included in DCI. Such an indicated usage of the downlink assignment index counters may refer to an indication of how the second device 410 is to use the downlink assignment index counters in the DCI to count a total number of scheduled downlink shared channel transmissions. In some cases, the HARQ codebook size and a HARQ codebook configuration are predefined, where a bit combination included in a HARQ codebook is based on a number of downlink shared channel transmissions successfully decoded by the second device 410. In some cases, the second device 410 may receive a message (e.g., a DCI message) indicating the HARQ codebook size. In some cases, the fixed HARQ codebook size may be predefined. In some cases, the second device 410 may receive a message indicating a CQI table, where the CQI table is associated with the codebook type. In some cases, the second device 410 may receive an RRC message including the indication of the codebook type.

At 420, the second device 410 may receive one or more downlink assignment index counters indicating a total number of scheduled downlink shared channel transmissions. In some cases, the second device 410 may receive one or more counter downlink assignment indices indicating a number of scheduled downlink shared channel transmissions. In some cases, the second device 410 may receive one or more total downlink assignment indices indicating a number of scheduled downlink shared channel transmissions across multiple component carriers. The second device 410 may determine a number of downlink shared channel transmissions the second device 410 unsuccessfully decoded based on the one or more counter downlink assignment indices and the one or more total downlink assignment indices.

At 425, the second device 410 may receive the scheduled downlink shared channel transmissions (e.g., PDSCH).

At 430, the second device 410 may decode the received scheduled downlink shared channel transmissions.

At 435, the second device 410 may transmit the HARQ feedback based on the decoding of the received scheduled downlink shared channel transmissions, the received downlink assignment index counter, and in accordance with the codebook type.

In some implementations, the HARQ codebook size is equal to one bit. In such cases, the second device 410 may transmit an ACK based on the decoding of the scheduled downlink shared channel transmissions being successful, where the ACK includes the one bit. In some cases, the second device 410 may determine that the second device 410 unsuccessfully decoded at least one downlink shared channel transmission of a second set of scheduled downlink shared channel transmissions, and transmit a NACK based on the decoding of the at least one downlink shared channel transmission being unsuccessful. The NACK may include the one bit.

In some cases, the second device 410 may determine that the second device 410 unsuccessfully decoded each downlink shared channel transmission included in a second set of scheduled downlink shared channel transmissions, and determine to refrain from transmitting second HARQ feedback based on the decoding of each downlink shared channel transmission included in the second set of scheduled downlink shared channel transmissions being unsuccessful.

In some implementations, the HARQ codebook size may equal to two bits. In such cases, the second device 410 may transmit a two-bit HARQ feedback transmission indicating that the UE successfully decoded the received scheduled downlink shared channel transmissions. In some cases, the second device 410 may determine that the second device 410 unsuccessfully decoded one downlink shared channel transmission of a second set of scheduled downlink shared channel transmissions, and transmit a two-bit HARQ feedback transmission indicating that the second device 410 unsuccessfully decoded one downlink shared channel transmission of the second set of scheduled downlink shared channel transmissions.

In some implementations, the second device 410 may determine that the second device 410 unsuccessfully decoded two downlink shared channel transmissions of a second set of scheduled downlink shared channel transmissions, and transmit a two-bit HARQ feedback transmission indicating that the second device 410 unsuccessfully decoded two downlink shared channel transmissions of the second set of scheduled downlink shared channel transmissions.

In some implementations, the second device 410 may determine that the second device 410 unsuccessfully decoded more than two downlink shared channel transmissions of a second set of scheduled downlink shared channel transmissions, and transmit a two-bit HARQ feedback transmission indicating that the second device unsuccessfully decoded more than two downlink shared channel transmissions of the second set of scheduled downlink shared channel transmissions.

In some implementations, the second device 410 may transmit a second HARQ feedback transmission indicating that the second device 410 unsuccessfully decoded more than one downlink shared channel transmissions of a second set of scheduled downlink shared channel transmissions, and receive a re-transmitted downlink shared channel transmission for each downlink shared channel transmission included in the second set of scheduled downlink shared channel transmissions.

In some implementations, the second device 410 may transmit a second HARQ feedback transmission indicating that the second device 410 unsuccessfully decoded one downlink shared channel transmissions of a second set of scheduled downlink shared channel transmissions. In some cases, the first device 405 may encode each of the scheduled downlink shared channel transmissions via a bitwise XOR network encoding procedure, and re-transmit the network encoded scheduled downlink shared channel transmissions in a single downlink transmission. As such, the second device 410 may receive a re-transmitted downlink shared channel transmission that is a bit-wise XOR of each downlink shared channel transmission included in the second set of scheduled downlink shared channel transmissions.

In some implementations, the second device 410 may compare a number of scheduled downlink shared channel transmissions to a threshold (e.g., a preconfigured threshold, an indicated threshold), and the second device 410 may determine the HARQ codebook size based at least in part on the comparison. In some cases, second device 410 may receive a message indicating a downlink shared channel re-transmission configuration. The downlink shared channel re-transmission configuration based on a network encoding scheme, the HARQ codebook size, a number of scheduled downlink shared channel transmissions, or a combination thereof.

In some implementations, the second device 410 may receive a re-transmitted downlink shared channel transmission, a configuration of the re-transmission based on the HARQ feedback. The configuration may include a number of retransmissions, an encoding scheme, or a combination thereof.

Figure 5:
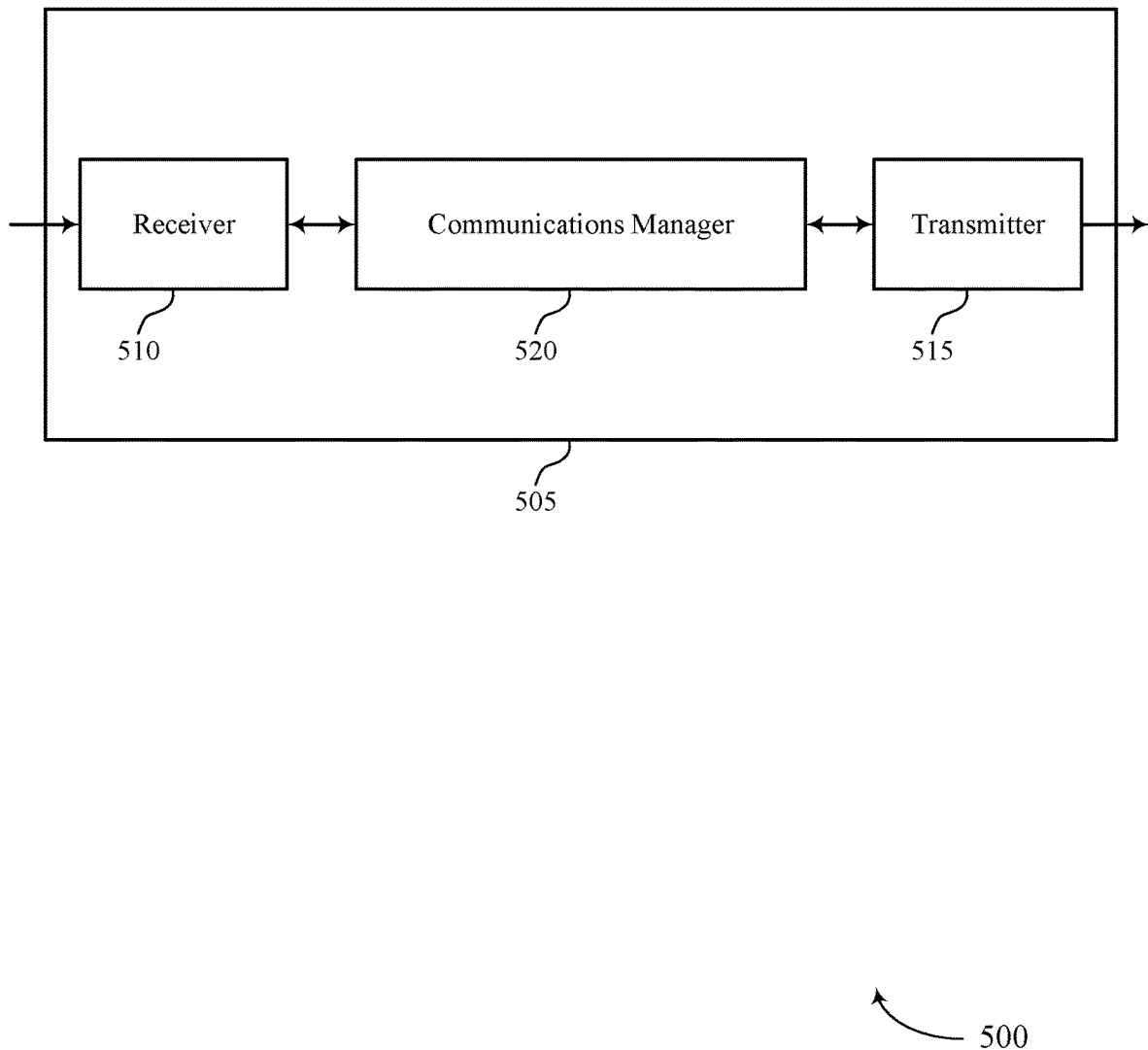
FIGS. 5 and 6 show block diagrams of devices that support techniques for transmitting HARQ feedback in accordance with one or more aspects of the present disclosure.

FIG. 5 shows a block diagram 500 of a device 505 that supports techniques for transmitting HARQ feedback in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for transmitting HARQ feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for transmitting HARQ feedback). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for transmitting HARQ feedback as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving an indication of a codebook type for transmitting HARQ feedback, the indication of the codebook type indicating a static HARQ feedback codebook, where the indicated static HARQ feedback codebook is associated with a fixed codebook size. The communications manager 520 may be configured as or otherwise support a means for receiving a downlink shared channel transmission. The communications manager 520 may be configured as or otherwise support a means for decoding the received downlink shared channel transmission. The communications manager 520 may be configured as or otherwise support a means for transmitting the HARQ feedback based on the decoding of the received downlink shared channel transmission and in accordance with the codebook type.

Additionally or alternatively, the communications manager 520 may support wireless communications at a UE in accordance with examples as disclosed herein. For example, the communications manager 520 may be configured as or otherwise support a means for receiving an indication of a codebook type for transmitting HARQ feedback, the codebook type indicating a HARQ codebook size and usage of downlink assignment index counters included in DCI. The communications manager 520 may be configured as or otherwise support a means for receiving one or more downlink assignment index counters indicating a total number of scheduled downlink shared channel transmissions. The communications manager 520 may be configured as or otherwise support a means for receiving the scheduled downlink shared channel transmissions. The communications manager 520 may be configured as or otherwise support a means for decoding the received scheduled downlink shared channel transmissions. The communications manager 520 may be configured as or otherwise support a means for transmitting the HARQ feedback based on the decoding of the received scheduled downlink shared channel transmissions, the received downlink assignment index counter, and in accordance with the codebook type.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
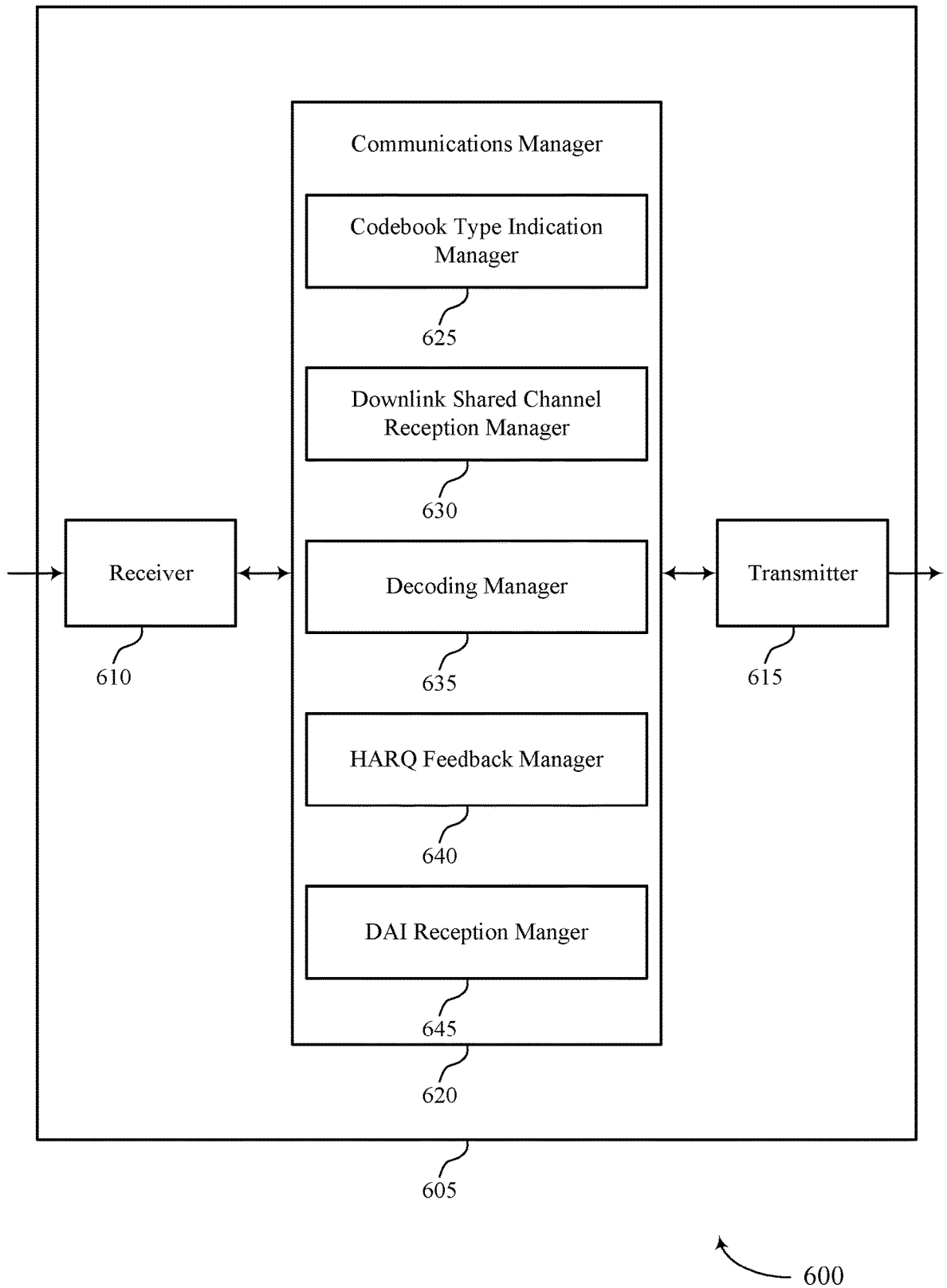

FIG. 6 shows a block diagram 600 of a device 605 that supports techniques for transmitting HARQ feedback in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for transmitting HARQ feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for transmitting HARQ feedback). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for transmitting HARQ feedback as described herein. For example, the communications manager 620 may include a codebook type indication manager 625, a downlink shared channel reception manager 630, a decoding manager 635, an HARQ feedback manager 640, a DAI reception manager 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The codebook type indication manager 625 may be configured as or otherwise support a means for receiving an indication of a codebook type for transmitting HARQ feedback, the indication of the codebook type indicating a static HARQ feedback codebook, where the indicated static HARQ feedback codebook is associated with a fixed codebook size. The downlink shared channel reception manager 630 may be configured as or otherwise support a means for receiving a downlink shared channel transmission. The decoding manager 635 may be configured as or otherwise support a means for decoding the received downlink shared channel transmission. The HARQ feedback manager 640 may be configured as or otherwise support a means for transmitting the HARQ feedback based on the decoding of the received downlink shared channel transmission and in accordance with the codebook type.

Additionally or alternatively, the communications manager 620 may support wireless communications at a UE in accordance with examples as disclosed herein. The codebook type indication manager 625 may be configured as or otherwise support a means for receiving an indication of a codebook type for transmitting HARQ feedback the codebook type indicating a HARQ codebook size and usage of downlink assignment index counters included in DCI. The DAI reception manager 645 may be configured as or otherwise support a means for receiving one or more downlink assignment index counters indicating a total number of scheduled downlink shared channel transmissions. The downlink shared channel reception manager 630 may be configured as or otherwise support a means for receiving the scheduled downlink shared channel transmissions. The decoding manager 635 may be configured as or otherwise support a means for decoding the received scheduled downlink shared channel transmissions. The HARQ feedback manager 640 may be configured as or otherwise support a means for transmitting the HARQ feedback based on the decoding of the received scheduled downlink shared channel transmissions, the received downlink assignment index counter, and in accordance with the codebook type.

Figure 7:
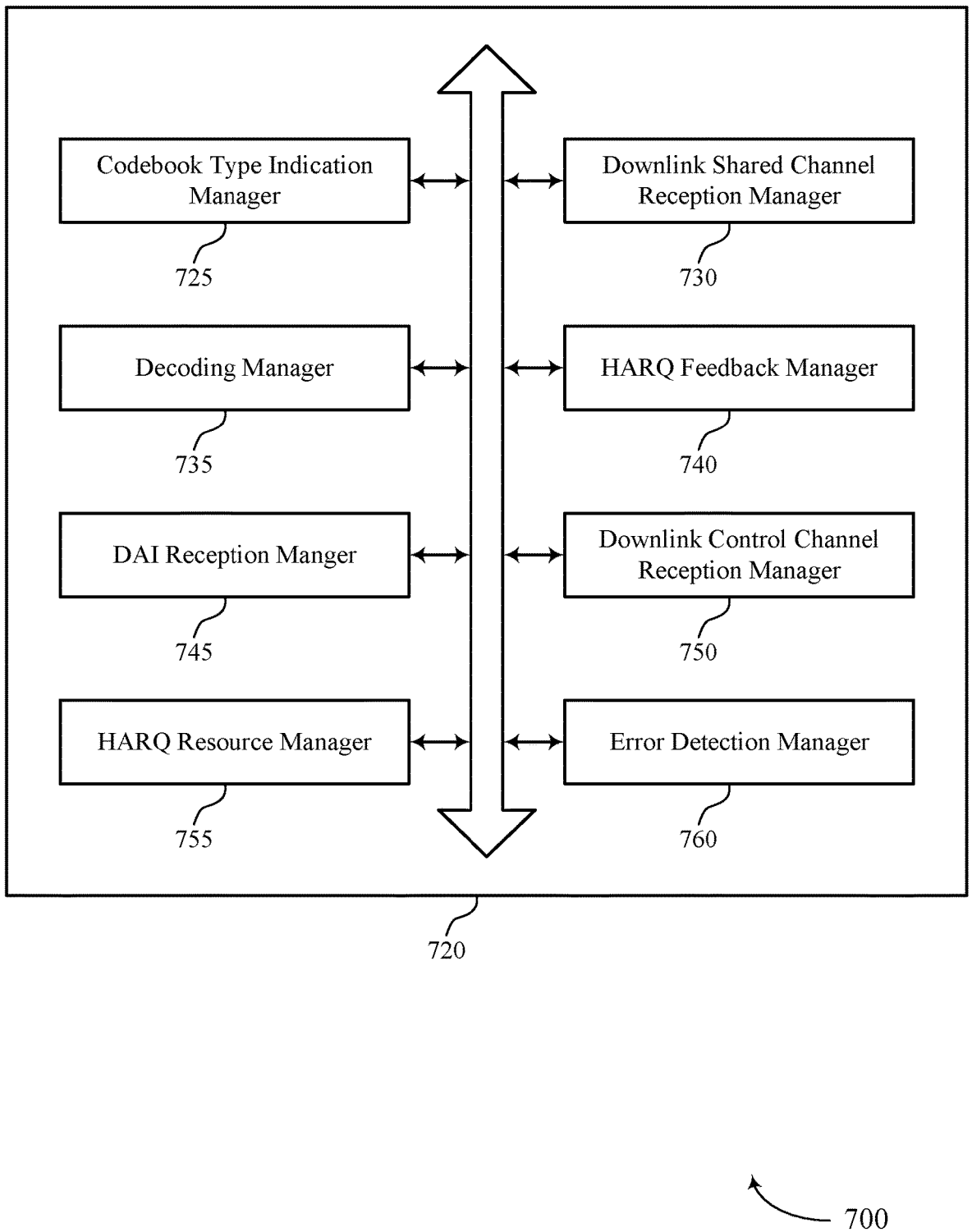
FIG. 7 shows a block diagram of a communications manager that supports techniques for transmitting HARQ feedback in accordance with one or more aspects of the present disclosure.

FIG. 7 shows a block diagram 700 of a communications manager 720 that supports techniques for transmitting HARQ feedback in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for transmitting HARQ feedback as described herein. For example, the communications manager 720 may include a codebook type indication manager 725, a downlink shared channel reception manager 730, a decoding manager 735, an HARQ feedback manager 740, a DAI reception manager 745, a downlink control channel reception manager 750, an HARQ resource manager 755, an error detection manager 760, or any combination thereof. Each of these components may communicate, directly or indirectly, with one another (e.g., via one or more buses).

The communications manager 720 may support wireless communications at a UE in accordance with examples as disclosed herein. The codebook type indication manager 725 may be configured as or otherwise support a means for receiving an indication of a codebook type for transmitting HARQ feedback, the indication of the codebook type indicating a static HARQ feedback codebook, where the indicated static HARQ feedback codebook is associated with a fixed codebook size. The downlink shared channel reception manager 730 may be configured as or otherwise support a means for receiving a downlink shared channel transmission. The decoding manager 735 may be configured as or otherwise support a means for decoding the received downlink shared channel transmission. The HARQ feedback manager 740 may be configured as or otherwise support a means for transmitting the HARQ feedback based on the decoding of the received downlink shared channel transmission and in accordance with the codebook type.

In some examples, to support transmitting the HARQ feedback, the HARQ feedback manager 740 may be configured as or otherwise support a means for transmitting a ACK that the UE successfully decoded the received downlink shared channel transmission.

In some examples, the decoding manager 735 may be configured as or otherwise support a means for determining that the UE unsuccessfully decoded a second downlink shared channel transmission. In some examples, the HARQ feedback manager 740 may be configured as or otherwise support a means for determining to refrain from transmitting a second HARQ feedback transmission based on the decoding of the second downlink shared channel transmission being unsuccessful.

In some examples, the downlink control channel reception manager 750 may be configured as or otherwise support a means for receiving a downlink control channel transmission, the downlink control channel transmission associated with the received downlink shared channel transmission. In some examples, the decoding manager 735 may be configured as or otherwise support a means for decoding the received downlink control channel transmission, where transmitting the HARQ feedback is based on the decoding of the received downlink control channel transmission and the received downlink shared channel transmission being successful.

In some examples, the decoding manager 735 may be configured as or otherwise support a means for decoding a received downlink control channel transmission, the received downlink control channel transmission associated with a second downlink shared channel transmission. In some examples, the decoding manager 735 may be configured as or otherwise support a means for determining that the UE unsuccessfully decoded the second downlink shared channel transmission. In some examples, the HARQ feedback manager 740 may be configured as or otherwise support a means for transmitting a second HARQ feedback based on the decoding of the second downlink shared channel transmission being unsuccessful and the decoding of the received downlink control channel transmission being successful, the second HARQ feedback including a NACK.

In some examples, the codebook type is associated with a one bit HARQ feedback size for transmitting the HARQ feedback by the UE.

In some examples, the HARQ resource manager 755 may be configured as or otherwise support a means for receiving a first message indicating a first set of resources for transmitting the HARQ feedback associated with the downlink shared channel transmission and a second message indicating a second set of resources for transmitting a second HARQ feedback associated with a second downlink shared channel transmission, the first set of resources and the second set of resources associated with unique time resources.

In some examples, the HARQ resource manager 755 may be configured as or otherwise support a means for receiving a first message indicating a first set of resources for transmitting the HARQ feedback associated with the downlink shared channel transmission and a second message indicating a second set of resources for transmitting a second HARQ feedback associated with a second downlink shared channel transmission, the first set of resources and the second set of resources overlapping in time. In some examples, the error detection manager 760 may be configured as or otherwise support a means for determining an error associated with the first set of resources and the second set of resources based on the first set of resources and the second set of resources overlapping in time.

In some examples, to support transmitting the HARQ feedback, the HARQ feedback manager 740 may be configured as or otherwise support a means for transmitting an uplink control channel transmission including the HARQ feedback.

In some examples, to support receiving the indication of the codebook type, the codebook type indication manager 725 may be configured as or otherwise support a means for receiving an RRC message including the indication of the codebook type.

Additionally or alternatively, the communications manager 720 may support wireless communications at a UE in accordance with examples as disclosed herein. In some examples, the codebook type indication manager 725 may be configured as or otherwise support a means for receiving an indication of a codebook type for transmitting HARQ feedback, the codebook type indicating a HARQ codebook size and usage of downlink assignment index counters included in DCI. The DAI reception manager 745 may be configured as or otherwise support a means for receiving one or more downlink assignment index counters indicating a total number of scheduled downlink shared channel transmissions. In some examples, the downlink shared channel reception manager 730 may be configured as or otherwise support a means for receiving the scheduled downlink shared channel transmissions. In some examples, the decoding manager 735 may be configured as or otherwise support a means for decoding the received scheduled downlink shared channel transmissions. In some examples, the HARQ feedback manager 740 may be configured as or otherwise support a means for transmitting the HARQ feedback based on the decoding of the received scheduled downlink shared channel transmissions, the received downlink assignment index counter, and in accordance with the codebook type.

In some examples, the HARQ codebook size is equal to one bit.

In some examples, to support transmitting the HARQ feedback, the HARQ feedback manager 740 may be configured as or otherwise support a means for transmitting a ACK based on the decoding of the scheduled downlink shared channel transmissions being successful, where the ACK includes the one bit.

In some examples, the decoding manager 735 may be configured as or otherwise support a means for determining that the UE unsuccessfully decoded at least one downlink shared channel transmission of a second set of scheduled downlink shared channel transmissions. In some examples, the HARQ feedback manager 740 may be configured as or otherwise support a means for transmitting a NACK based on the decoding of the at least one downlink shared channel transmission being unsuccessful, where the NACK includes the one bit.

In some examples, the decoding manager 735 may be configured as or otherwise support a means for determining that the UE unsuccessfully decoded each downlink shared channel transmission included in a second set of scheduled downlink shared channel transmissions. In some examples, the HARQ feedback manager 740 may be configured as or otherwise support a means for determining to refrain from transmitting a second HARQ feedback based on the decoding of each downlink shared channel transmission included in the second set of scheduled downlink shared channel transmissions being unsuccessful.

In some examples, the HARQ codebook size is equal to two bits.

In some examples, to support transmitting the HARQ feedback, the HARQ feedback manager 740 may be configured as or otherwise support a means for transmitting a two-bit HARQ feedback transmission indicating that the UE successfully decoded the received scheduled downlink shared channel transmissions.

In some examples, the decoding manager 735 may be configured as or otherwise support a means for determining that the UE unsuccessfully decoded one downlink shared channel transmission of a second set of scheduled downlink shared channel transmissions. In some examples, the HARQ feedback manager 740 may be configured as or otherwise support a means for transmitting a two-bit HARQ feedback transmission indicating that the UE unsuccessfully decoded one downlink shared channel transmission of the second set of scheduled downlink shared channel transmissions.

In some examples, the decoding manager 735 may be configured as or otherwise support a means for determining that the UE unsuccessfully decoded two downlink shared channel transmissions of a second set of scheduled downlink shared channel transmissions. In some examples, the HARQ feedback manager 740 may be configured as or otherwise support a means for transmitting a two-bit HARQ feedback transmission indicating that the UE unsuccessfully decoded two downlink shared channel transmissions of the second set of scheduled downlink shared channel transmissions.

In some examples, the decoding manager 735 may be configured as or otherwise support a means for determining that the UE unsuccessfully decoded more than two downlink shared channel transmissions of a second set of scheduled downlink shared channel transmissions. In some examples, the HARQ feedback manager 740 may be configured as or otherwise support a means for transmitting a two-bit HARQ feedback transmission indicating that the UE unsuccessfully decoded more than two downlink shared channel transmissions of the second set of scheduled downlink shared channel transmissions.

In some examples, the HARQ codebook size and a HARQ codebook configuration are predefined, where a bit combination included in a HARQ codebook is based on a number of downlink shared channel transmissions successfully decoded by the UE.

In some examples, the HARQ feedback manager 740 may be configured as or otherwise support a means for transmitting a second HARQ feedback transmission indicating that the UE unsuccessfully decoded more than one downlink shared channel transmissions of a second set of scheduled downlink shared channel transmissions. In some examples, the downlink shared channel reception manager 730 may be configured as or otherwise support a means for receiving a re-transmitted downlink shared channel transmission for each downlink shared channel transmission included in the second set of scheduled downlink shared channel transmissions.

In some examples, the HARQ feedback manager 740 may be configured as or otherwise support a means for transmitting a second HARQ feedback transmission indicating that the UE unsuccessfully decoded one downlink shared channel transmissions of a second set of scheduled downlink shared channel transmissions. In some examples, the downlink shared channel reception manager 730 may be configured as or otherwise support a means for receiving a re-transmitted downlink shared channel transmission that is a bit-wise Exclusive OR of each downlink shared channel transmission included in the second set of scheduled downlink shared channel transmissions.

In some examples, the downlink shared channel reception manager 730 may be configured as or otherwise support a means for receiving a re-transmitted downlink shared channel transmission, a configuration of the re-transmission based on the HARQ feedback, where the configuration includes a number of retransmissions, a network encoding scheme, or a combination thereof.

In some examples, the codebook type indication manager 725 may be configured as or otherwise support a means for receiving a DCI message indicating the HARQ codebook size.

In some examples, the HARQ codebook size is predefined. In some examples, the codebook type indication manager 725 may be configured as or otherwise support a means for comparing a number of scheduled downlink shared channel transmissions to a threshold, and determining the HARQ codebook size based at least in part on the comparison. In some examples, the codebook type indication manager 725 may be configured as or otherwise support a means for receiving a message indicating a downlink shared channel re-transmission configuration, the downlink shared channel re-transmission configuration based at least in part on a network encoding scheme, the HARQ codebook size, a number of scheduled downlink shared channel transmissions, or a combination thereof.

In some examples, the codebook type indication manager 725 may be configured as or otherwise support a means for receiving a message indicating a channel quality indicator table, the channel quality indicator table being associated with the codebook type.

In some examples, to support receiving the one or more downlink assignment index counters, the DAI reception manager 745 may be configured as or otherwise support a means for receiving one or more counter downlink assignment indices indicating a number of scheduled downlink shared channel transmissions. In some examples, to support receiving the one or more downlink assignment index counters, the DAI reception manager 745 may be configured as or otherwise support a means for receiving one or more total downlink assignment indices indicating a number of scheduled downlink shared channel transmissions across multiple component carriers. In some examples, to support receiving the one or more downlink assignment index counters, the decoding manager 735 may be configured as or otherwise support a means for determining a number of downlink shared channel transmissions the UE unsuccessfully decoded based on the one or more counter downlink assignment indices and the one or more total downlink assignment indices.

In some examples, to support receiving the indication of the codebook type, the codebook type indication manager 725 may be configured as or otherwise support a means for receiving an RRC signaling message including the indication of the codebook type.

Figure 8:
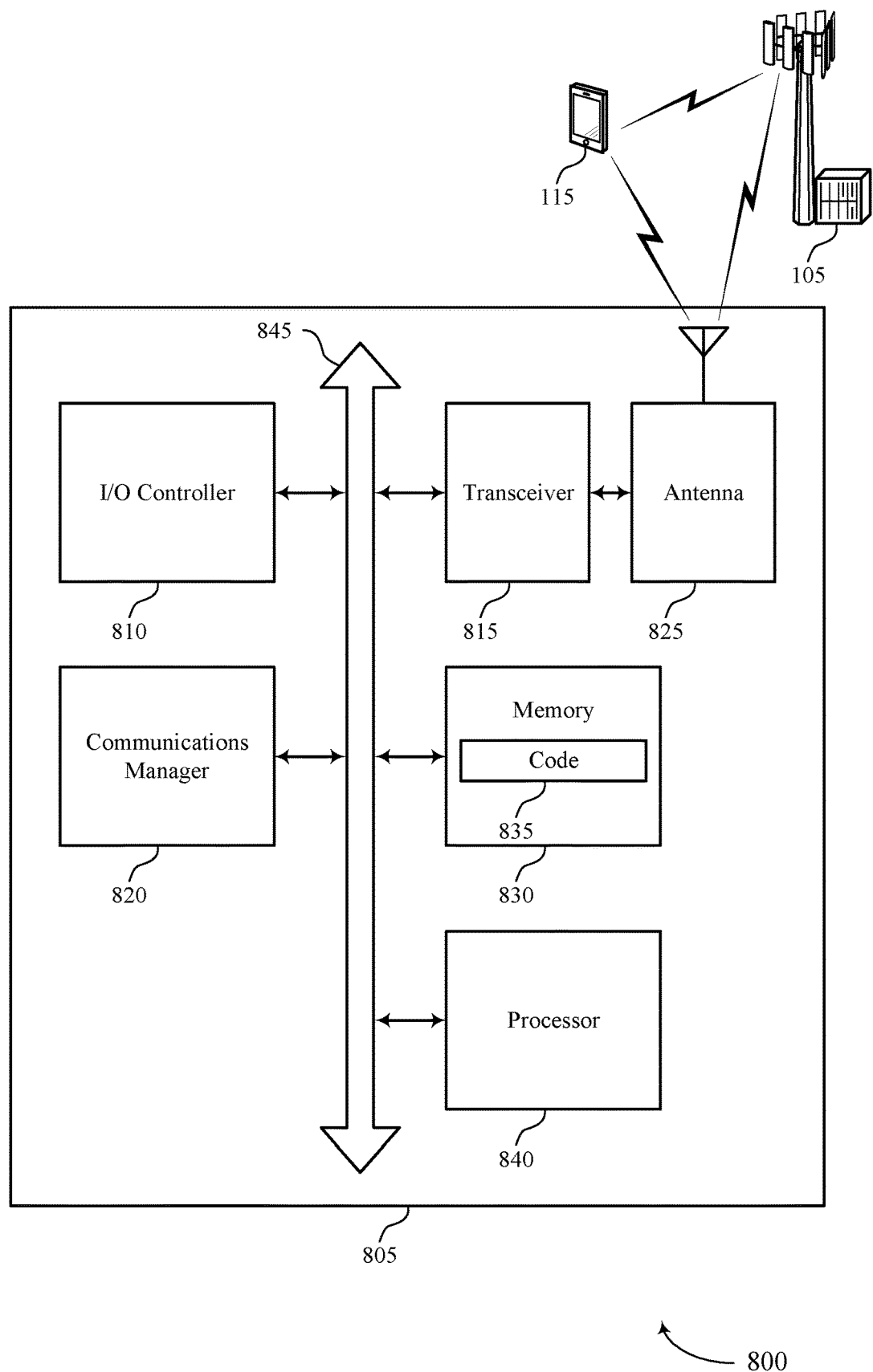
FIG. 8 shows a diagram of a system including a device that supports techniques for transmitting HARQ feedback in accordance with one or more aspects of the present disclosure.

FIG. 8 shows a diagram of a system 800 including a device 805 that supports techniques for transmitting HARQ feedback in accordance with one or more aspects of the present disclosure. The device 805 may be an example of or include the components of a device 505, a device 605, or a UE 115 as described herein. The device 805 may communicate wirelessly with one or more base stations 105, one or more network devices 140, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for transmitting HARQ feedback). For example, the device 805 or a component of the device 805 may include a processor 840 and memory 830 coupled with the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving an indication of a codebook type for transmitting HARQ feedback by the UE, the indication of the codebook type indicating a static HARQ feedback codebook, where the indicated static HARQ feedback codebook is associated with a fixed codebook size. The communications manager 820 may be configured as or otherwise support a means for receiving a downlink shared channel transmission. The communications manager 820 may be configured as or otherwise support a means for decoding the received downlink shared channel transmission. The communications manager 820 may be configured as or otherwise support a means for transmitting the HARQ feedback based on the decoding of the received downlink shared channel transmission and in accordance with the codebook type.

Additionally or alternatively, the communications manager 820 may support wireless communications at a UE in accordance with examples as disclosed herein. For example, the communications manager 820 may be configured as or otherwise support a means for receiving an indication of a codebook type for transmitting HARQ feedback, the codebook type indicating a HARQ codebook size and usage of downlink assignment index counters included in DCI. The communications manager 820 may be configured as or otherwise support a means for receiving one or more downlink assignment index counters indicating a total number of scheduled downlink shared channel transmissions. The communications manager 820 may be configured as or otherwise support a means for receiving the scheduled downlink shared channel transmissions. The communications manager 820 may be configured as or otherwise support a means for decoding the received scheduled downlink shared channel transmissions. The communications manager 820 may be configured as or otherwise support a means for transmitting the HARQ feedback based on the decoding of the received scheduled downlink shared channel transmissions, the received downlink assignment index counter, and in accordance with the codebook type.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for transmitting HARQ feedback as described herein, or the processor 840 and the memory 830 may be otherwise configured to perform or support such operations.

Figure 9:
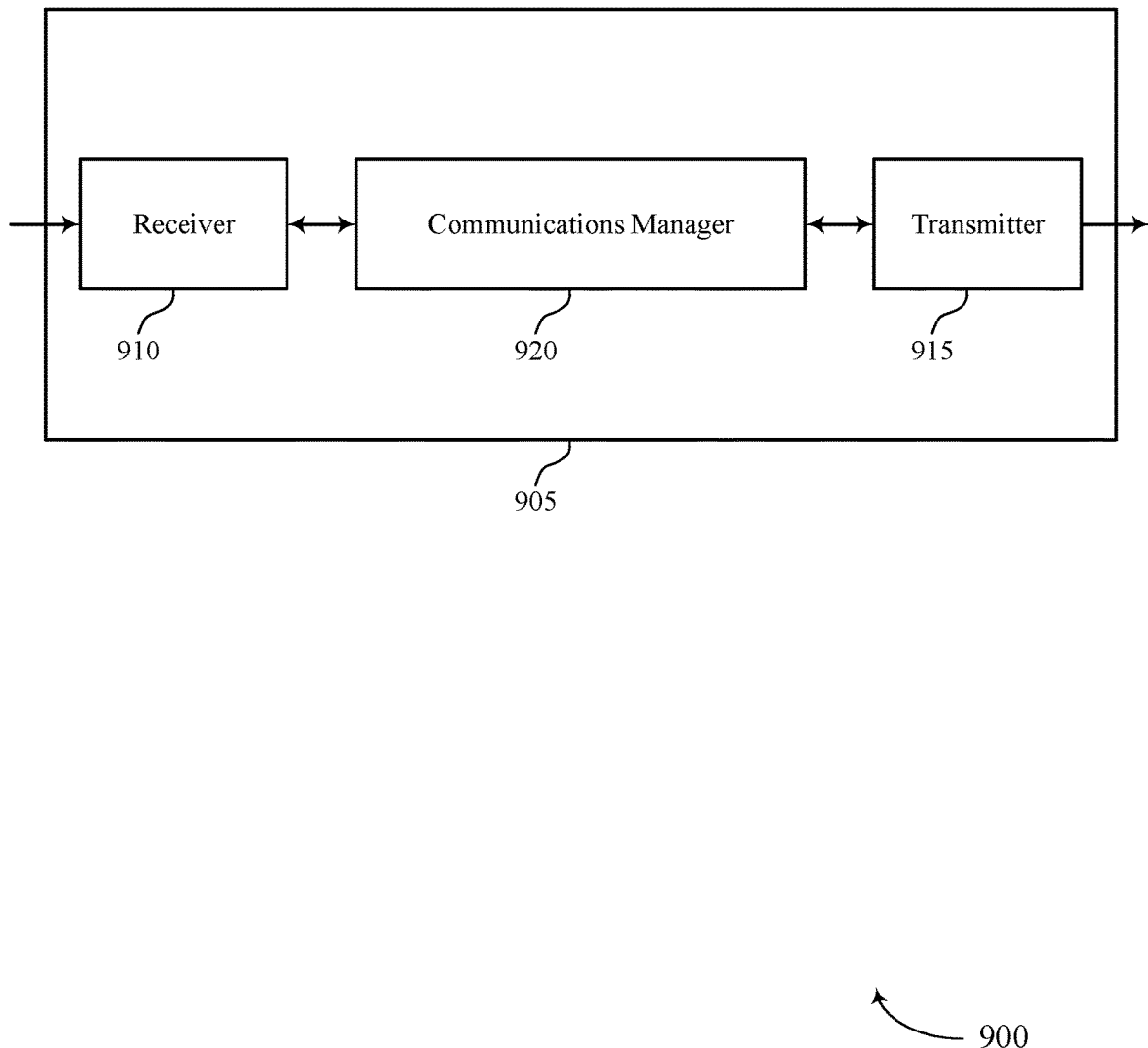
FIGS. 9 and 10 show block diagrams of devices that support techniques for transmitting HARQ feedback in accordance with one or more aspects of the present disclosure.

FIG. 9 shows a block diagram 900 of a device 905 that supports techniques for transmitting HARQ feedback in accordance with one or more aspects of the present disclosure. The device 905 may be an example of aspects of a base station 105 or a network device 140 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for transmitting HARQ feedback). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for transmitting HARQ feedback). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for transmitting HARQ feedback as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network device in accordance with examples as disclosed herein. For example, the communications manager 920 may be configured as or otherwise support a means for transmitting an indication of a codebook type for transmitting HARQ feedback by the UE, the indication of the codebook type indicating a static HARQ feedback codebook, where the indicated static HARQ feedback codebook is associated with a fixed codebook size. The communications manager 920 may be configured as or otherwise support a means for transmitting a downlink shared channel transmission. The communications manager 920 may be configured as or otherwise support a means for receiving the HARQ feedback in accordance with the codebook type.

Additionally or alternatively, the communications manager 920 may support wireless communications at a network device in accordance with examples as disclosed herein. For example, the communications manager 920 may be configured as or otherwise support a means for transmitting an indication of a codebook type for transmitting HARQ feedback by the UE, the codebook type indicating a HARQ codebook size and usage of downlink assignment index counters included in DCI. The communications manager 920 may be configured as or otherwise support a means for transmitting one or more downlink assignment index counters indicating a total number of scheduled downlink shared channel transmissions. The communications manager 920 may be configured as or otherwise support a means for transmitting the scheduled downlink shared channel transmissions. The communications manager 920 may be configured as or otherwise support a means for receiving a HARQ feedback transmission in accordance with the codebook type.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
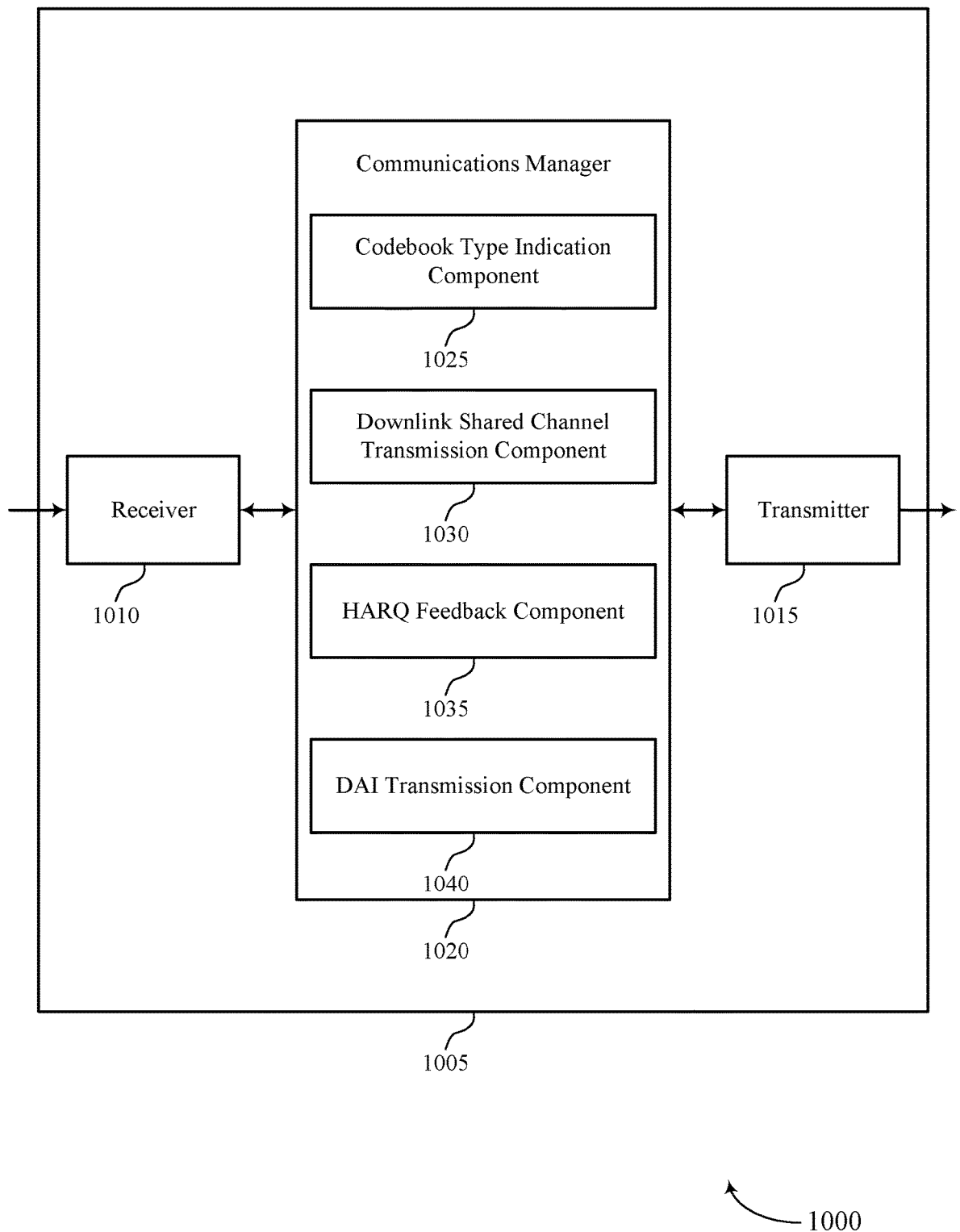

FIG. 10 shows a block diagram 1000 of a device 1005 that supports techniques for transmitting HARQ feedback in accordance with one or more aspects of the present disclosure. The device 1005 may be an example of aspects of a device 905, a base station 105, or a network device 140 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for transmitting HARQ feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for transmitting HARQ feedback). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for transmitting HARQ feedback as described herein. For example, the communications manager 1020 may include a codebook type indication component 1025, a downlink shared channel transmission component 1030, an HARQ feedback component 1035, a DAI transmission component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network device in accordance with examples as disclosed herein. The codebook type indication component 1025 may be configured as or otherwise support a means for transmitting an indication of a codebook type for transmitting HARQ feedback by the UE, the indication of the codebook type indicating a static HARQ feedback codebook, where the indicated static HARQ feedback codebook is associated with a fixed codebook size. The downlink shared channel transmission component 1030 may be configured as or otherwise support a means for transmitting a downlink shared channel transmission. The HARQ feedback component 1035 may be configured as or otherwise support a means for receiving the HARQ feedback in accordance with the codebook type.

Additionally or alternatively, the communications manager 1020 may support wireless communications at a network device in accordance with examples as disclosed herein. The codebook type indication component 1025 may be configured as or otherwise support a means for transmitting an indication of a codebook type for transmitting HARQ feedback by the UE, the codebook type indicating a HARQ codebook size and usage of downlink assignment index counters included in DCI. The DAI transmission component 1040 may be configured as or otherwise support a means for transmitting one or more downlink assignment index counters indicating a total number of scheduled downlink shared channel transmissions. The downlink shared channel transmission component 1030 may be configured as or otherwise support a means for transmitting the scheduled downlink shared channel transmissions. The HARQ feedback component 1035 may be configured as or otherwise support a means for receiving a HARQ feedback transmission in accordance with the codebook type.

Figure 11:
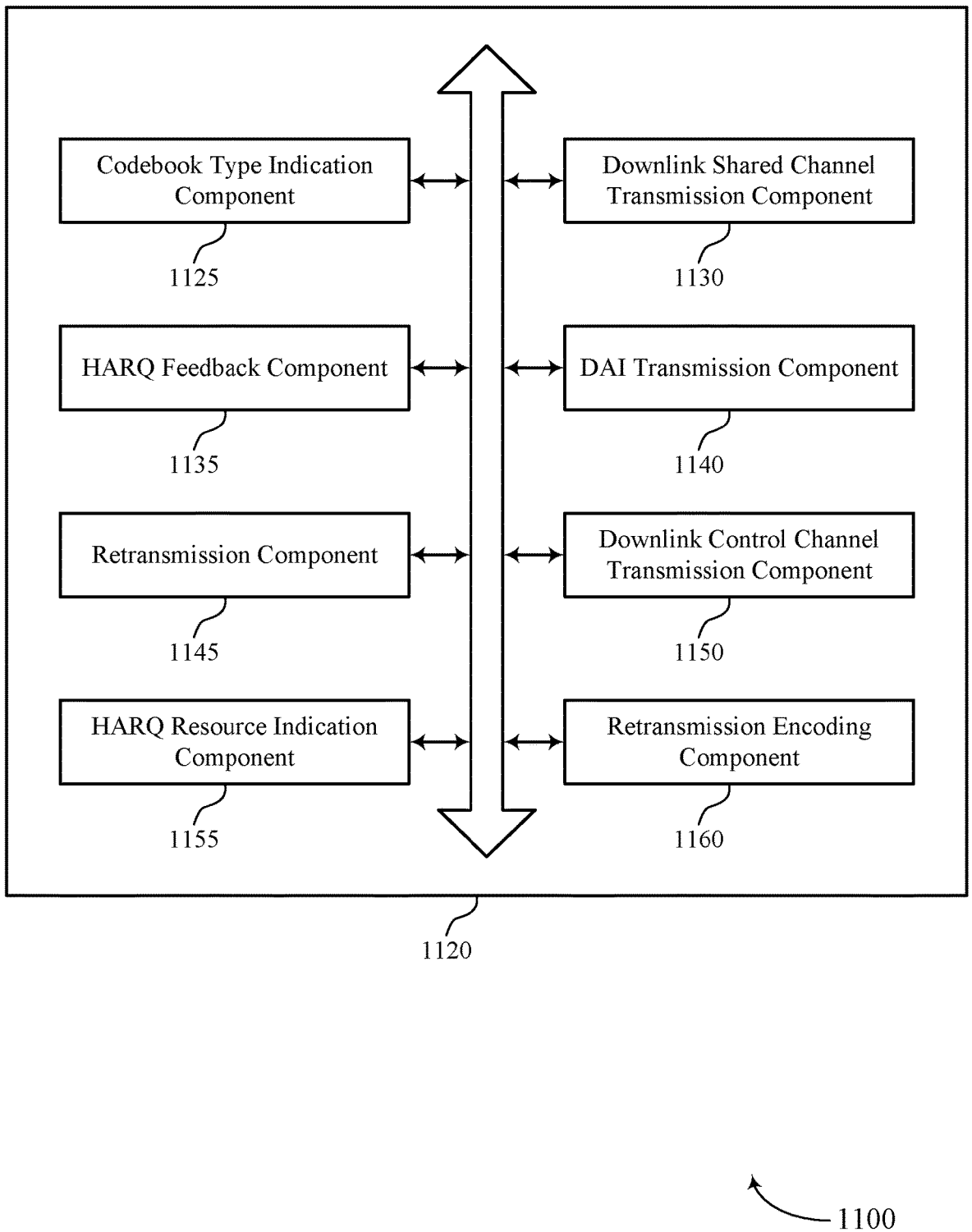
FIG. 11 shows a block diagram of a communications manager that supports techniques for transmitting HARQ feedback in accordance with one or more aspects of the present disclosure.

FIG. 11 shows a block diagram 1100 of a communications manager 1120 that supports techniques for transmitting HARQ feedback in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for transmitting HARQ feedback as described herein. For example, the communications manager 1120 may include a codebook type indication component 1125, a downlink shared channel transmission component 1130, an HARQ feedback component 1135, a DAI transmission component 1140, a retransmission component 1145, a downlink control channel transmission component 1150, an HARQ resource indication component 1155, a retransmission encoding component 1160, or any combination thereof. Each of these components may communicate, directly or indirectly, with one another (e.g., via one or more buses).

The communications manager 1120 may support wireless communications at a network device in accordance with examples as disclosed herein. The codebook type indication component 1125 may be configured as or otherwise support a means for transmitting an indication of a codebook type for transmitting HARQ feedback by the UE, the indication of the codebook type indicating a static HARQ feedback codebook, where the indicated static HARQ feedback codebook is associated with a fixed codebook size. The downlink shared channel transmission component 1130 may be configured as or otherwise support a means for transmitting a downlink shared channel transmission. The HARQ feedback component 1135 may be configured as or otherwise support a means for receiving the HARQ feedback in accordance with the codebook type.

In some examples, to support receiving the HARQ feedback, the HARQ feedback component 1135 may be configured as or otherwise support a means for receiving a ACK that the UE successfully decoded the downlink shared channel transmission.

In some examples, the HARQ feedback component 1135 may be configured as or otherwise support a means for determining a failure by the network device to receive a second a second HARQ feedback transmission associated with a second downlink shared channel transmission. In some examples, the retransmission component 1145 may be configured as or otherwise support a means for retransmitting the second downlink shared channel transmission based on the failure by the network device to receive the second HARQ feedback transmission.

In some examples, the downlink control channel transmission component 1150 may be configured as or otherwise support a means for transmitting a downlink control channel transmission, the downlink control channel transmission associated with the downlink shared channel transmission, where receiving the HARQ feedback is based on decoding of the downlink control channel transmission and the downlink shared channel transmission by the UE being successful.

In some examples, the downlink control channel transmission component 1150 may be configured as or otherwise support a means for transmitting a downlink control channel transmission, where receiving the HARQ feedback is based on decoding of the downlink shared channel transmission by the UE being unsuccessful and decoding of the downlink control channel transmission by the UE being successful, the HARQ feedback including a NACK.

In some examples, the codebook type is associated with a one bit HARQ feedback size.

In some examples, the HARQ resource indication component 1155 may be configured as or otherwise support a means for transmitting a first message indicating a first set of resources for the HARQ feedback associated with the downlink shared channel transmission and a second message indicating a second set of resources for a second HARQ feedback associated with a second downlink shared channel transmission, the first set of resources and the second set of resources associated with unique time resources.

In some examples, to support receiving the HARQ feedback, the HARQ feedback component 1135 may be configured as or otherwise support a means for receiving an uplink control channel transmission including the HARQ feedback.

In some examples, to support transmitting the indication of the codebook type, the codebook type indication component 1125 may be configured as or otherwise support a means for transmitting an RRC message including the indication of the codebook type.

Additionally or alternatively, the communications manager 1120 may support wireless communications at a network device in accordance with examples as disclosed herein. In some examples, the codebook type indication component 1125 may be configured as or otherwise support a means for transmitting an indication of a codebook type for transmitting HARQ feedback by the UE, the codebook type indicating a HARQ codebook size and usage of downlink assignment index counters included in DCI. The DAI transmission component 1140 may be configured as or otherwise support a means for transmitting one or more downlink assignment index counters indicating a total number of scheduled downlink shared channel transmissions. In some examples, the downlink shared channel transmission component 1130 may be configured as or otherwise support a means for transmitting the scheduled downlink shared channel transmissions. In some examples, the HARQ feedback component 1135 may be configured as or otherwise support a means for receiving a HARQ feedback transmission in accordance with the codebook type.

In some examples, the HARQ codebook size is equal to one bit.

In some examples, to support receiving the HARQ feedback, the HARQ feedback component 1135 may be configured as or otherwise support a means for receiving a ACK, where the ACK includes the one bit. In some examples, to support receiving the HARQ feedback, the HARQ feedback component 1135 may be configured as or otherwise support a means for determining that the UE successfully decoded the scheduled downlink shared channel transmissions based on the ACK.

In some examples, to support receiving the HARQ feedback, the HARQ feedback component 1135 may be configured as or otherwise support a means for receiving a NACK, where the NACK includes the one bit. In some examples, to support receiving the HARQ feedback, the HARQ feedback component 1135 may be configured as or otherwise support a means for determining that the UE unsuccessfully decoded at least one downlink shared channel transmission of the scheduled downlink shared channel transmissions based on the NACK.

In some examples, the HARQ feedback component 1135 may be configured as or otherwise support a means for determining a failure by the network device to receive a second HARQ feedback. In some examples, the HARQ feedback component 1135 may be configured as or otherwise support a means for determining that the UE unsuccessfully decoded each downlink shared channel transmission included in a second set of scheduled downlink shared channel transmissions based on the failure.

In some examples, the HARQ codebook size is equal to two bits.

In some examples, to support receiving the HARQ feedback, the HARQ feedback component 1135 may be configured as or otherwise support a means for receiving a two-bit HARQ feedback transmission indicating that the UE successfully decoded the scheduled downlink shared channel transmissions.

In some examples, the HARQ feedback component 1135 may be configured as or otherwise support a means for receiving a two-bit HARQ feedback transmission indicating that the UE unsuccessfully decoded one downlink shared channel transmission of the scheduled downlink shared channel transmissions.

In some examples, the HARQ feedback component 1135 may be configured as or otherwise support a means for receiving a two-bit HARQ feedback transmission indicating that the UE unsuccessfully decoded two downlink shared channel transmissions of the scheduled downlink shared channel transmissions.

In some examples, the HARQ feedback component 1135 may be configured as or otherwise support a means for receiving a two-bit HARQ feedback transmission indicating that the UE unsuccessfully decoded more than two downlink shared channel transmissions of the scheduled downlink shared channel transmissions.

In some examples, the HARQ codebook size and a HARQ codebook configuration are predefined, where a bit combination included in a HARQ codebook is based on a number of downlink shared channel transmissions successfully decoded by the UE.

In some examples, to support receiving the HARQ feedback transmission, the HARQ feedback component 1135 may be configured as or otherwise support a means for receiving the HARQ feedback transmission indicating that the UE unsuccessfully decoded more than one downlink shared channel transmission of a second set of scheduled downlink shared channel transmissions. In some examples, to support receiving the HARQ feedback transmission, the retransmission component 1145 may be configured as or otherwise support a means for transmitting a re-transmitted downlink shared channel transmission for each of the scheduled downlink shared channel transmissions.

In some examples, the retransmission encoding component 1160 may be configured as or otherwise support a means for encoding each of the scheduled downlink shared channel transmissions via a bit-wise Exclusive OR network encoding procedure. In some examples, the retransmission component 1145 may be configured as or otherwise support a means for re-transmitting the encoded scheduled downlink shared channel transmissions in a single downlink transmission.

In some examples, the codebook type indication component 1125 may be configured as or otherwise support a means for transmitting a DCI message indicating the HARQ codebook size.

In some examples, the HARQ codebook size is predefined.

In some examples, the codebook type indication component 1125 may be configured as or otherwise support a means for transmitting a message indicating a downlink shared channel re-transmission configuration, the downlink shared channel re-transmission configuration based at least in part on a network encoding scheme, the HARQ codebook size, a number of scheduled downlink shared channel transmissions, or a combination thereof.

In some examples, the codebook type indication component 1125 may be configured as or otherwise support a means for transmitting a message indicating a channel quality indicator table, the channel quality indicator table being associated with the codebook type.

In some examples, to support transmitting the one or more downlink assignment index counters, the DAI transmission component 1140 may be configured as or otherwise support a means for transmitting one or more counter downlink assignment indices indicating a number of scheduled downlink shared channel transmissions. In some examples, to support transmitting the one or more downlink assignment index counters, the DAI transmission component 1140 may be configured as or otherwise support a means for transmitting one or more total downlink assignment indices indicating a number of scheduled downlink shared channel transmissions across multiple component carriers, where the HARQ feedback is based at on the one or more counter downlink assignment indices and the one or more total downlink assignment indices.

In some examples, to support transmitting the indication of the codebook type, the codebook type indication component 1125 may be configured as or otherwise support a means for transmitting an RRC message including the indication of the codebook type.

Figure 12:
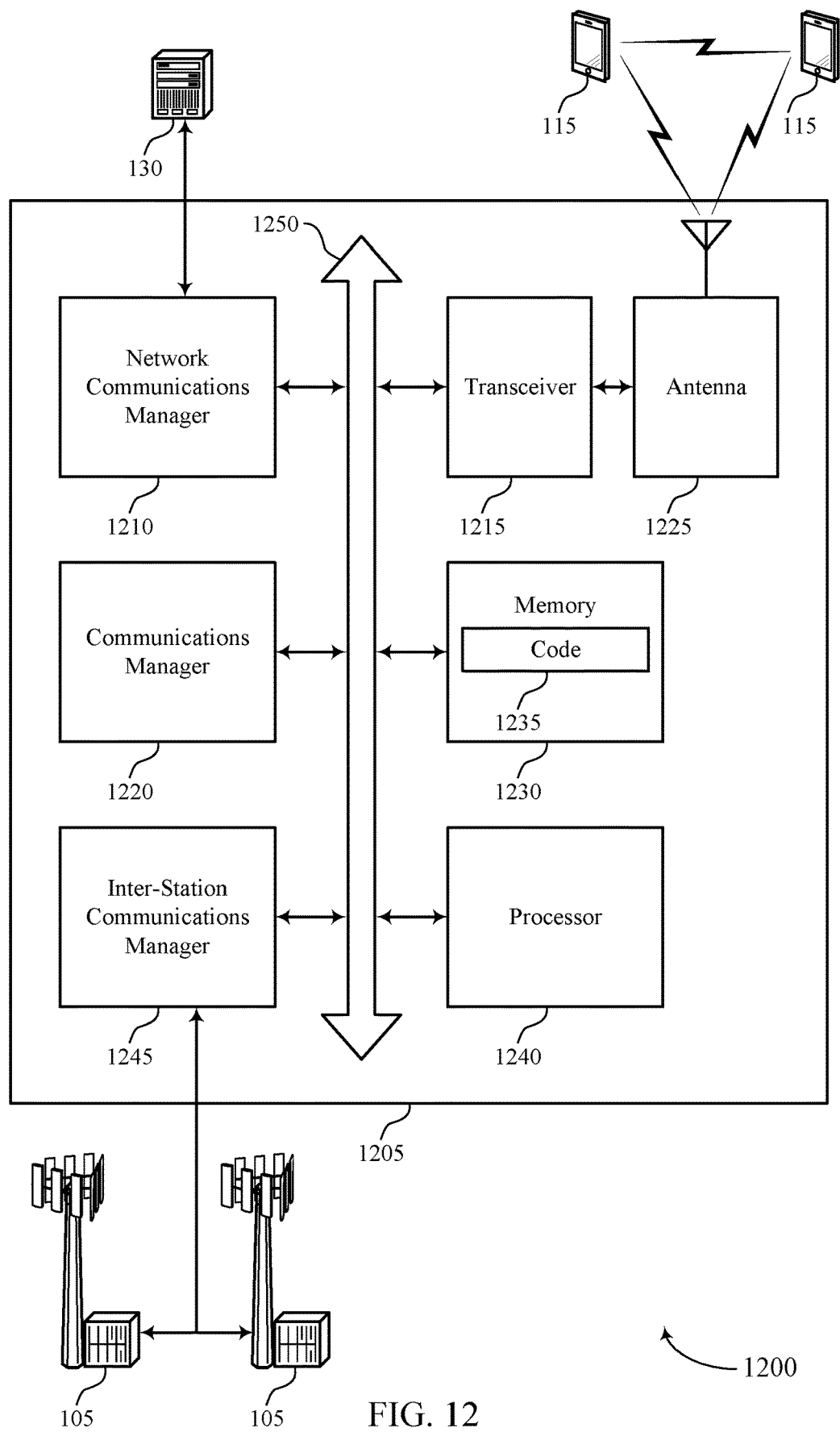
FIG. 12 shows a diagram of a system including a device that supports techniques for transmitting HARQ feedback in accordance with one or more aspects of the present disclosure.

FIG. 12 shows a diagram of a system 1200 including a device 1205 that supports techniques for transmitting HARQ feedback in accordance with one or more aspects of the present disclosure. The device 1205 may be an example of or include the components of a device 905, a device 1005, a base station 105, or a network device 140 as described herein. The device 1205 may communicate wirelessly with one or more base stations 105, network devices 140, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for transmitting HARQ feedback). For example, the device 1205 or a component of the device 1205 may include a processor 1240 and memory 1230 coupled with the processor 1240, the processor 1240 and memory 1230 configured to perform various functions described herein.

The inter-station communications manager 1245 may manage communications with other base stations 105 or other network devices, and may include a controller or scheduler for controlling communications with UEs 115 in cooperation with other base stations 105 or network devices 140. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105 or network devices 140.

The communications manager 1220 may support wireless communications at a network device in accordance with examples as disclosed herein. For example, the communications manager 1220 may be configured as or otherwise support a means for transmitting an indication of a codebook type for transmitting HARQ feedback by the UE, the indication of the codebook type indicating a static HARQ feedback codebook, where the indicated static HARQ feedback codebook is associated with a fixed codebook size. The communications manager 1220 may be configured as or otherwise support a means for transmitting a downlink shared channel transmission. The communications manager 1220 may be configured as or otherwise support a means for receiving the HARQ feedback in accordance with the codebook type.

Additionally or alternatively, the communications manager 1220 may support wireless communications at a network device in accordance with examples as disclosed herein. For example, the communications manager 1220 may be configured as or otherwise support a means for transmitting an indication of a codebook type for transmitting HARQ feedback by the UE, the codebook type indicating a HARQ codebook size and usage of downlink assignment index counters included in DCI. The communications manager 1220 may be configured as or otherwise support a means for transmitting one or more downlink assignment index counters indicating a total number of scheduled downlink shared channel transmissions. The communications manager 1220 may be configured as or otherwise support a means for transmitting the scheduled downlink shared channel transmissions. The communications manager 1220 may be configured as or otherwise support a means for receiving a HARQ feedback transmission in accordance with the codebook type.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for transmitting HARQ feedback as described herein, or the processor 1240 and the memory 1230 may be otherwise configured to perform or support such operations.

Figure 13:
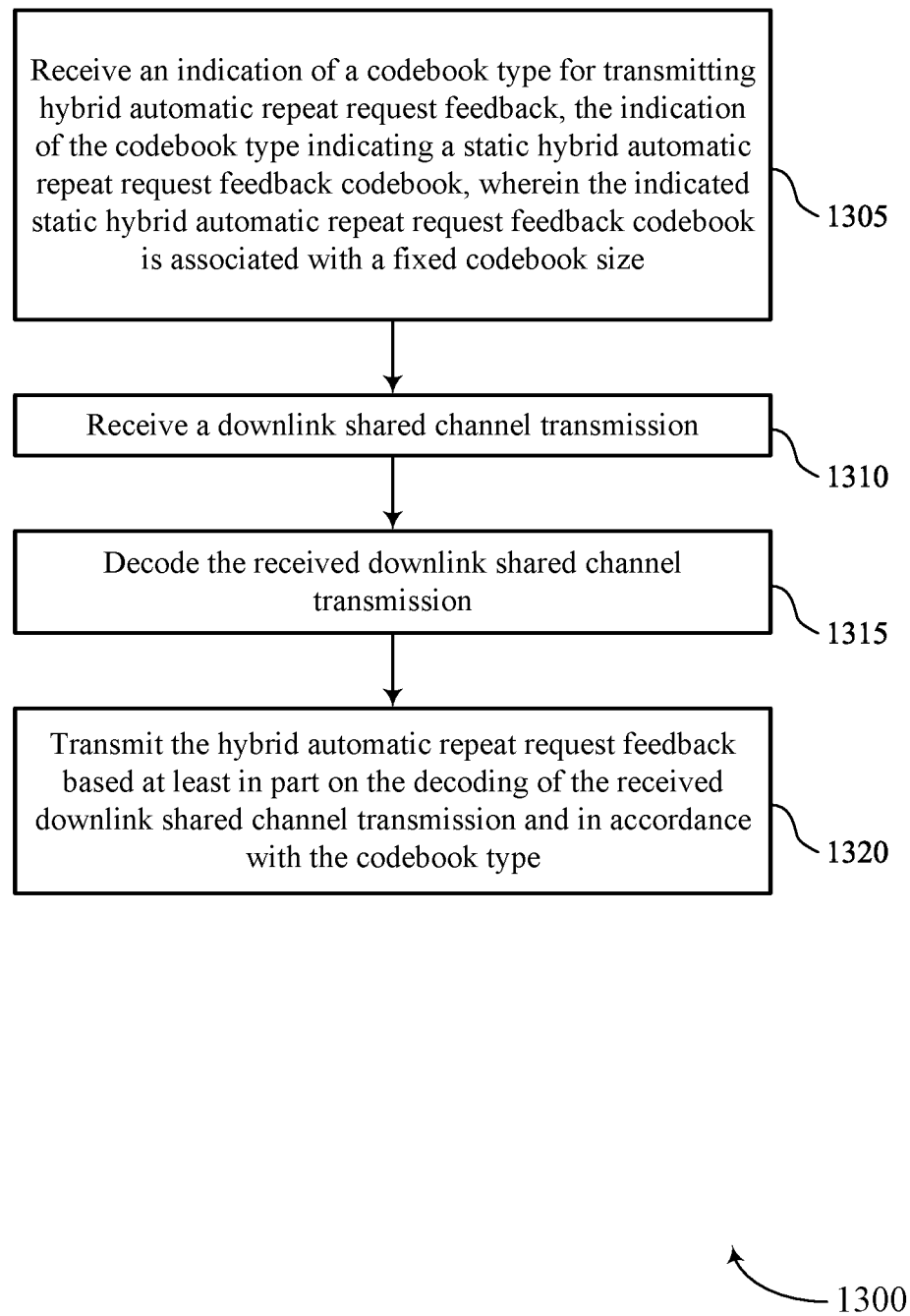
FIGS. 13 through 16 show flowcharts illustrating methods that support techniques for transmitting HARQ feedback in accordance with one or more aspects of the present disclosure.

FIG. 13 shows a flowchart illustrating a method 1300 that supports techniques for transmitting HARQ feedback in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving an indication of a codebook type for transmitting HARQ feedback, the indication of the codebook type indicating a static HARQ feedback codebook, where the indicated static HARQ feedback codebook is associated with a fixed codebook size. The operations of 1305 may be performed in accordance with examples as disclosed herein. In some examples, aspects of the operations of 1305 may be performed by a codebook type indication manager 725 as described with reference to FIG. 7.

At 1310, the method may include receiving a downlink shared channel transmission. The operations of 1310 may be performed in accordance with examples as disclosed herein. In some examples, aspects of the operations of 1310 may be performed by a downlink shared channel reception manager 730 as described with reference to FIG. 7.

At 1315, the method may include decoding the received downlink shared channel transmission. The operations of 1315 may be performed in accordance with examples as disclosed herein. In some examples, aspects of the operations of 1315 may be performed by a decoding manager 735 as described with reference to FIG. 7.

At 1320, the method may include transmitting the HARQ feedback based on the decoding of the received downlink shared channel transmission and in accordance with the codebook type. The operations of 1320 may be performed in accordance with examples as disclosed herein. In some examples, aspects of the operations of 1320 may be performed by an HARQ feedback manager 740 as described with reference to FIG. 7.

Figure 14:
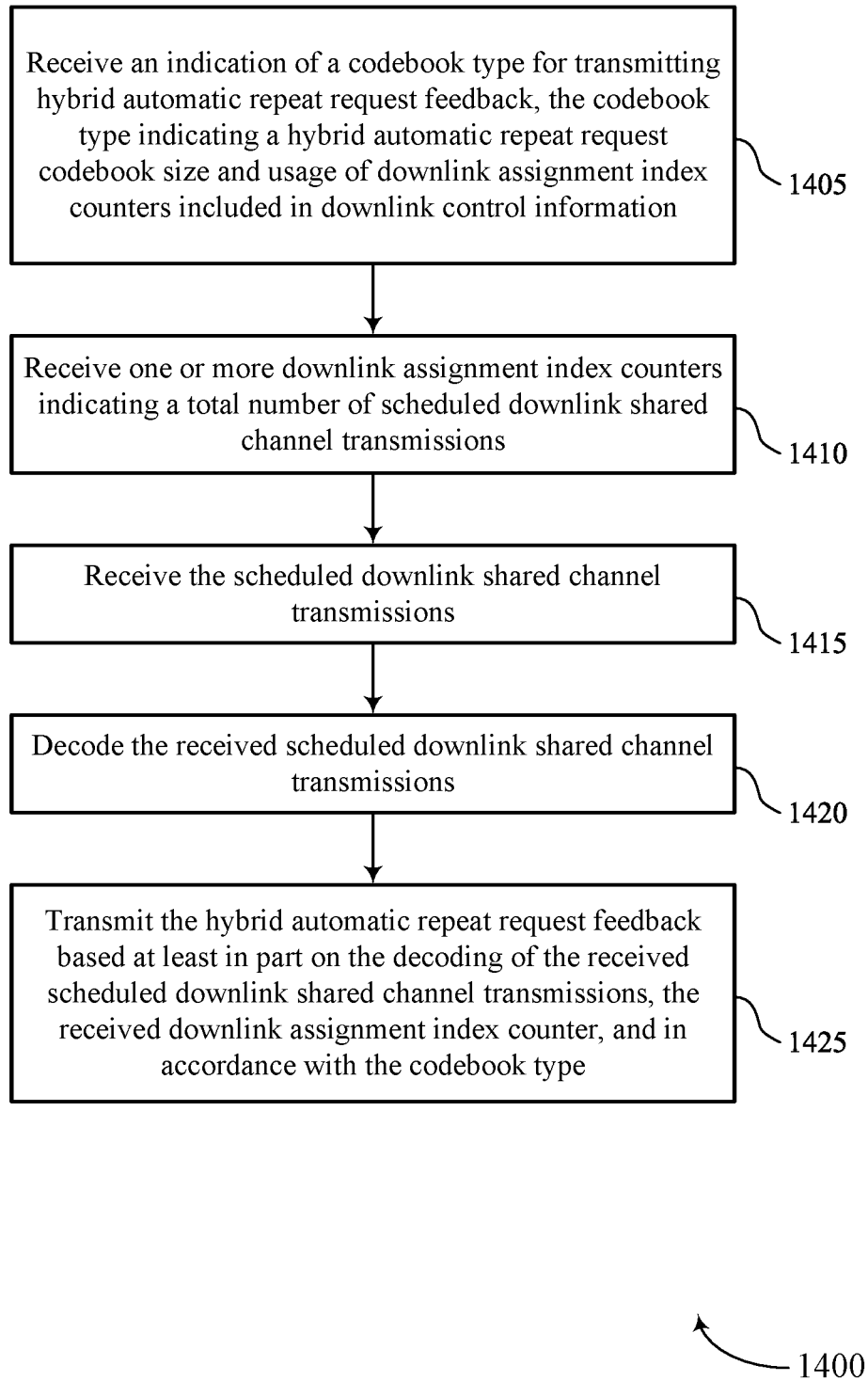

FIG. 14 shows a flowchart illustrating a method 1400 that supports techniques for transmitting HARQ feedback in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving an indication of a codebook type for transmitting HARQ feedback, the codebook type indicating a HARQ codebook size and usage of downlink assignment index counters included in DCI. The operations of 1405 may be performed in accordance with examples as disclosed herein. In some examples, aspects of the operations of 1405 may be performed by a codebook type indication manager 725 as described with reference to FIG. 7.

At 1410, the method may include receiving one or more downlink assignment index counters indicating a total number of scheduled downlink shared channel transmissions. The operations of 1410 may be performed in accordance with examples as disclosed herein. In some examples, aspects of the operations of 1410 may be performed by a DAI reception manager 745 as described with reference to FIG. 7.

At 1415, the method may include receiving the scheduled downlink shared channel transmissions. The operations of 1415 may be performed in accordance with examples as disclosed herein. In some examples, aspects of the operations of 1415 may be performed by a downlink shared channel reception manager 730 as described with reference to FIG. 7.

At 1420, the method may include decoding the received scheduled downlink shared channel transmissions. The operations of 1420 may be performed in accordance with examples as disclosed herein. In some examples, aspects of the operations of 1420 may be performed by a decoding manager 735 as described with reference to FIG. 7.

At 1425, the method may include transmitting the HARQ feedback based on the decoding of the received scheduled downlink shared channel transmissions, the received downlink assignment index counter, and in accordance with the codebook type. The operations of 1425 may be performed in accordance with examples as disclosed herein. In some examples, aspects of the operations of 1425 may be performed by an HARQ feedback manager 740 as described with reference to FIG. 7.

Figure 15:
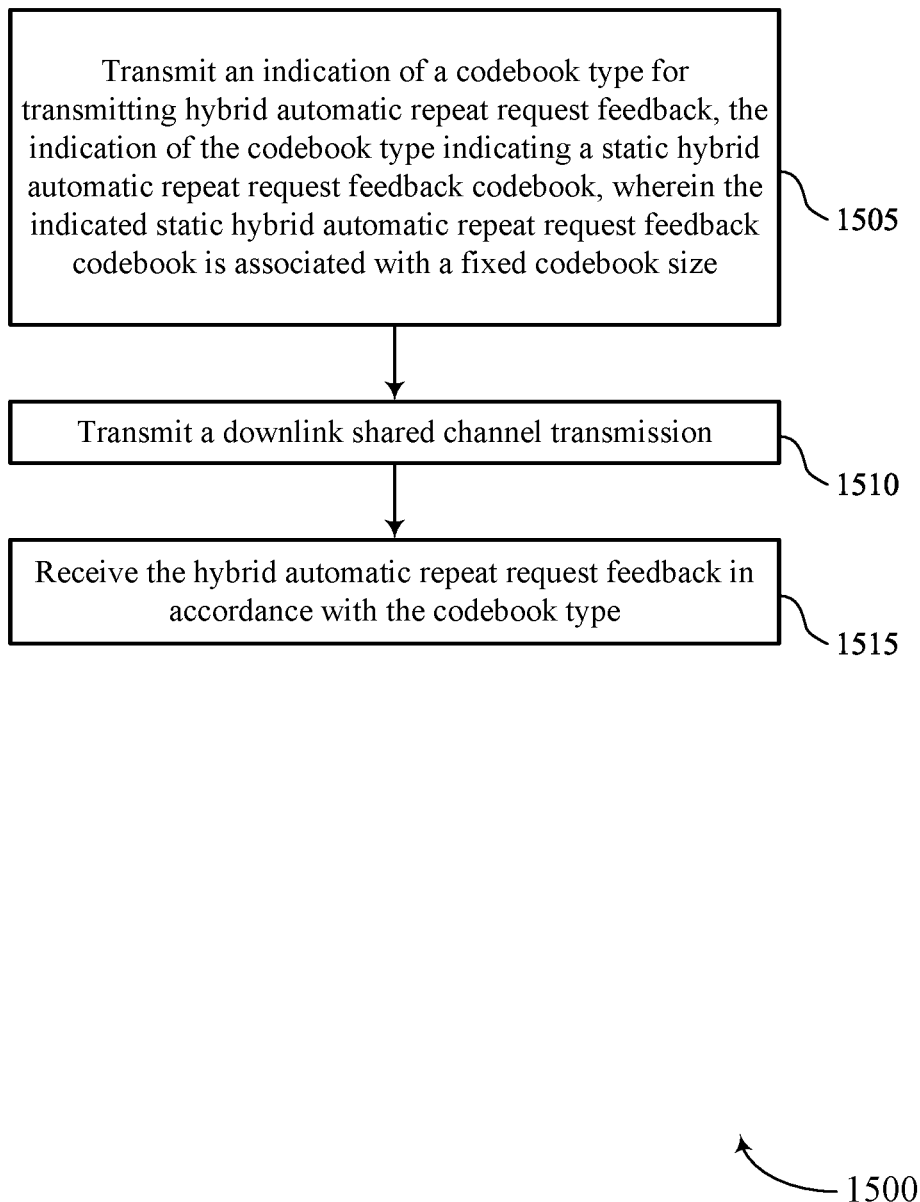

FIG. 15 shows a flowchart illustrating a method 1500 that supports techniques for transmitting HARQ feedback in accordance with one or more aspects of the present disclosure. The operations of the method 1500 may be implemented by a network device or its components as described herein. For example, the operations of the method 1500 may be performed by a base station 105 or a network device 140 as described with reference to FIGS. 1 through 4 and 9 through 12. In some examples, a network device may execute a set of instructions to control the functional elements of the network device to perform the described functions. Additionally or alternatively, the network device may perform aspects of the described functions using special-purpose hardware.

At 1505, the method may include transmitting an indication of a codebook type for transmitting HARQ feedback, the indication of the codebook type indicating a static HARQ feedback codebook, where the indicated static HARQ feedback codebook is associated with a fixed codebook size. The operations of 1505 may be performed in accordance with examples as disclosed herein. In some examples, aspects of the operations of 1505 may be performed by a codebook type indication component 1125 as described with reference to FIG. 11.

At 1510, the method may include transmitting a downlink shared channel transmission. The operations of 1510 may be performed in accordance with examples as disclosed herein. In some examples, aspects of the operations of 1510 may be performed by a downlink shared channel transmission component 1130 as described with reference to FIG. 11.

At 1515, the method may include receiving the HARQ feedback in accordance with the codebook type. The operations of 1515 may be performed in accordance with examples as disclosed herein. In some examples, aspects of the operations of 1515 may be performed by an HARQ feedback component 1135 as described with reference to FIG. 11.

Figure 16:
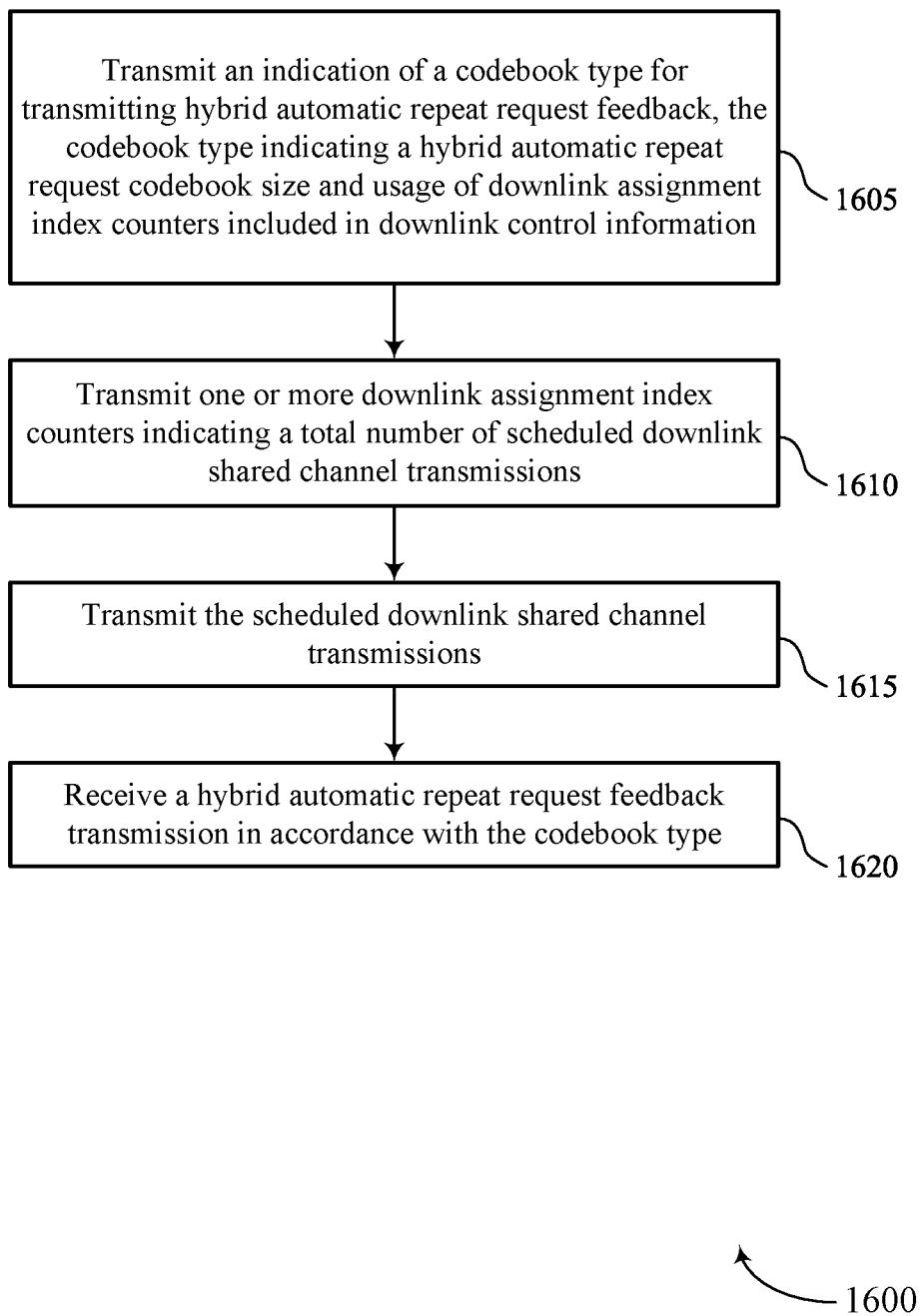

FIG. 16 shows a flowchart illustrating a method 1600 that supports techniques for transmitting HARQ feedback in accordance with one or more aspects of the present disclosure. The operations of the method 1600 may be implemented by a network device or its components as described herein. For example, the operations of the method 1600 may be performed by a base station 105 or a network device 140 as described with reference to FIGS. 1 through 4 and 9 through 12. In some examples, a network device may execute a set of instructions to control the functional elements of the network device to perform the described functions. Additionally or alternatively, the network device may perform aspects of the described functions using special-purpose hardware.

At 1605, the method may include transmitting an indication of a codebook type for transmitting HARQ feedback, the codebook type indicating a HARQ codebook size and usage of downlink assignment index counters included in DCI. The operations of 1605 may be performed in accordance with examples as disclosed herein. In some examples, aspects of the operations of 1605 may be performed by a codebook type indication component 1125 as described with reference to FIG. 11.

At 1610, the method may include transmitting one or more downlink assignment index counters indicating a total number of scheduled downlink shared channel transmissions. The operations of 1610 may be performed in accordance with examples as disclosed herein. In some examples, aspects of the operations of 1610 may be performed by a DAI transmission component 1140 as described with reference to FIG. 11.

At 1615, the method may include transmitting the scheduled downlink shared channel transmissions. The operations of 1615 may be performed in accordance with examples as disclosed herein. In some examples, aspects of the operations of 1615 may be performed by a downlink shared channel transmission component 1130 as described with reference to FIG. 11.

At 1620, the method may include receiving a HARQ feedback transmission in accordance with the codebook type. The operations of 1620 may be performed in accordance with examples as disclosed herein. In some examples, aspects of the operations of 1620 may be performed by an HARQ feedback component 1135 as described with reference to FIG. 11.

The following provides an overview of aspects of the present disclosure:

Aspect 1: A method for wireless communications at a UE, comprising: receiving an indication of a codebook type for transmitting hybrid automatic repeat request feedback by the UE, the indication of the codebook type indicating a static hybrid automatic repeat request feedback codebook, wherein the indicated static hybrid automatic repeat request feedback codebook is associated with a fixed codebook size; receiving a downlink shared message; and transmitting the hybrid automatic repeat request feedback based at least in part on a decoding result of the received downlink shared message and in accordance with the codebook type.

Aspect 2: The method of aspect 72, wherein transmitting the hybrid automatic repeat request feedback comprises: transmitting a positive acknowledgement that the UE successfully decoded the received downlink shared message.

Aspect 3: The method of any of aspects 72 through 73, further comprising: determining that the UE unsuccessfully decoded a second downlink shared message; and determining to refrain from transmitting a second hybrid automatic repeat request feedback transmission based at least in part on the second downlink shared message being unsuccessfully decoded.

Aspect 4: The method of any of aspects 72 through 74, further comprising: receiving a downlink control message, the downlink control message associated with the received downlink shared message; and decoding the received downlink control message, wherein transmitting the hybrid automatic repeat request feedback is based at least in part on the decoding of the received downlink control message and the received downlink shared message being successful.

Aspect 5: The method of any of aspects 72 through 75, further comprising: decoding a received downlink control message, the received downlink control message associated with a second downlink shared message; determining that the UE unsuccessfully decoded the second downlink shared message; and transmitting a second hybrid automatic repeat request feedback based at least in part on the second downlink shared message being unsuccessfully decoded and the received downlink control message being successfully decoded, the second hybrid automatic repeat request feedback comprising a negative acknowledgement.

Aspect 6: The method of any of aspects 72 through 76, wherein the codebook type is associated with a one bit hybrid automatic repeat request feedback size for the hybrid automatic repeat request feedback by the UE.

Aspect 7: The method of any of aspects 72 through 77, further comprising: receiving a first message indicating a first set of resources for the hybrid automatic repeat request feedback associated with the downlink shared message and a second message indicating a second set of resources for a second hybrid automatic repeat request feedback associated with a second downlink shared message, the first set of resources and the second set of resources associated with unique time resources.

Aspect 8: The method of any of aspects 72 through 78, further comprising: receiving a first message indicating a first set of resources for the hybrid automatic repeat request feedback associated with the downlink shared message and a second message indicating a second set of resources for a second hybrid automatic repeat request feedback associated with a second downlink shared message, the first set of resources and the second set of resources overlapping in time; and determining an error associated with the first set of resources and the second set of resources based at least in part on the first set of resources and the second set of resources overlapping in time.

Aspect 9: The method of any of aspects 72 through 79, wherein transmitting the hybrid automatic repeat request feedback comprises: transmitting an uplink control message comprising the hybrid automatic repeat request feedback.

Aspect 10: The method of any of aspects 72 through 80, wherein receiving the indication of the codebook type comprises: receiving a radio resource control message comprising the indication of the codebook type.

Aspect 11: A method for wireless communications at a UE, comprising: receiving an indication of a codebook type for hybrid automatic repeat request feedback by the UE, the codebook type indicating a hybrid automatic repeat request codebook size and usage of downlink assignment index counters included in downlink control information; receiving one or more downlink assignment index counters indicating a total number of scheduled downlink shared messages; receiving the scheduled downlink shared messages; and transmitting the hybrid automatic repeat request feedback based at least in part on a decoding result of the received scheduled downlink shared messages, the received downlink assignment index counter, and in accordance with the codebook type.

Aspect 12: The method of aspect 82, wherein the hybrid automatic repeat request codebook size is equal to one bit.

Aspect 13: The method of aspect 83, wherein transmitting the hybrid automatic repeat request feedback comprises: transmitting a positive acknowledgement based at least in part on the decoding result of the scheduled downlink shared messages being successful, wherein the positive acknowledgement comprises the one bit.

Aspect 14: The method of any of aspects 83 through 84, further comprising: determining that the UE unsuccessfully decoded at least one downlink shared message of a second set of scheduled downlink shared messages; and transmitting a negative acknowledgement based at least in part on the at least one downlink shared message being unsuccessfully decoded, wherein the negative acknowledgement comprises the one bit.

Aspect 15: The method of any of aspects 83 through 85, further comprising: determining that the UE unsuccessfully decoded each downlink shared message included in a second set of scheduled downlink shared messages; and determining to refrain from a transmission of a second hybrid automatic repeat request feedback based at least in part on each downlink shared message included in the second set of scheduled downlink shared messages being unsuccessfully decoded.

Aspect 16: The method of any of aspects 82 through 86, wherein the hybrid automatic repeat request codebook size is equal to two bits.

Aspect 17: The method of aspect 87, wherein transmitting the hybrid automatic repeat request feedback comprises: transmitting a two-bit hybrid automatic repeat request feedback transmission indicating that the UE successfully decoded the received scheduled downlink shared messages.

Aspect 18: The method of any of aspects 87 through 88, further comprising: determine that the UE unsuccessfully decoded one downlink shared message of a second set of scheduled downlink shared messages; and transmitting a two-bit hybrid automatic repeat request feedback transmission indicating that the UE unsuccessfully decoded one downlink shared message of the second set of scheduled downlink shared messages.

Aspect 19: The method of any of aspects 87 through 89, further comprising determine that the UE unsuccessfully decoded two downlink shared messages of a second set of scheduled downlink shared messages; and transmitting a two-bit hybrid automatic repeat request feedback transmission indicating that the UE unsuccessfully decoded two downlink shared messages of the second set of scheduled downlink shared messages.

Aspect 20: The method of any of aspects 87 through 90, further comprising determine that the UE unsuccessfully decoded more than two downlink shared messages of a second set of scheduled downlink shared messages; and transmitting a two-bit hybrid automatic repeat request feedback transmission indicating that the UE unsuccessfully decoded more than two downlink shared messages of the second set of scheduled downlink shared messages.

Aspect 21: The method of any of aspects 87 through 91, wherein the hybrid automatic repeat request codebook size and a hybrid automatic repeat request codebook configuration are predefined, where a bit combination included in a hybrid automatic repeat request codebook is based at least in part on a number of downlink shared messages successfully decoded by the UE.

Aspect 22: The method of any of aspects 82 through 92, further comprising: transmitting a second hybrid automatic repeat request feedback transmission indicating that the UE unsuccessfully decoded more than one downlink shared messages of a second set of scheduled downlink shared messages; and receiving a re-transmitted downlink shared message for each downlink shared message included in the second set of scheduled downlink shared messages.

Aspect 23: The method of any of aspects 82 through 93, further comprising: transmitting a second hybrid automatic repeat request feedback transmission indicating that the UE unsuccessfully decoded one downlink shared messages of a second set of scheduled downlink shared messages; and receiving a re-transmitted downlink shared message that is a bit-wise Exclusive OR of each downlink shared message included in the second set of scheduled downlink shared messages.

Aspect 24: The method of any of aspects 82 through 94, further comprising: receiving a re-transmitted downlink shared message, a configuration of the re-transmitted downlink shared message based at least in part on the hybrid automatic repeat request feedback, wherein the configuration comprises a number of retransmissions, a network encoding scheme, or a combination thereof.

Aspect 25: The method of any of aspects 82 through 95, further comprising: receiving a downlink control information message indicating the hybrid automatic repeat request codebook size.

Aspect 26: The method of any of aspects 82 through 96, wherein the hybrid automatic repeat request codebook size is predefined.

Aspect 27: The method of any of aspects 82 through 97, further comprising: comparing a number of scheduled downlink shared messages to a threshold; and determining the hybrid automatic repeat request codebook size based at least in part on the comparison.

Aspect 28: The method of any of aspects 82 through 98, further comprising: receiving a message indicating a downlink shared channel re-transmission configuration, the downlink shared channel re-transmission configuration based at least in part on a network encoding scheme, the hybrid automatic repeat request codebook size, a number of scheduled downlink shared messages, or a combination thereof.

Aspect 29: The method of any of aspects 82 through 99, further comprising: receiving a message indicating a channel quality indicator table, the channel quality indicator table being associated with the codebook type.

Aspect 30: The method of any of aspects 82 through 100, wherein receiving the one or more downlink assignment index counters comprises receiving one or more counter downlink assignment indices indicating a number of scheduled downlink shared messages; receiving one or more total downlink assignment indices indicating a number of scheduled downlink shared messages across multiple component carriers; and determine a number of downlink shared messages the UE unsuccessfully decoded based at least in part on the one or more counter downlink assignment indices and the one or more total downlink assignment indices.

Aspect 31: The method of any of aspects 82 through 101, wherein receiving the indication of the codebook type comprises: receiving a radio resource control signaling message comprising the indication of the codebook type.

Aspect 32: A method for wireless communications at a network device, comprising: transmitting an indication of a codebook type for hybrid automatic repeat request feedback, the indication of the codebook type indicating a static hybrid automatic repeat request feedback codebook, wherein the indicated static hybrid automatic repeat request feedback codebook is associated with a fixed codebook size; transmitting a downlink shared message; and receiving the hybrid automatic repeat request feedback in accordance with the codebook type.

Aspect 33: The method of aspect 103, wherein receiving the hybrid automatic repeat request feedback comprises: receiving a positive acknowledgement that a UE successfully decoded the downlink shared message.

Aspect 34: The method of any of aspects 103 through 104, further comprising: determining a failure by the network device to receive a second a second hybrid automatic repeat request feedback transmission associated with a second downlink shared message; and re-transmitting the second downlink shared message based at least in part on the failure by the network device to receive the second hybrid automatic repeat request feedback transmission.

Aspect 35: The method of any of aspects 103 through 105, further comprising: transmitting a downlink control message, the downlink control message associated with the downlink shared message, wherein the reception of the hybrid automatic repeat request feedback is based at least in part on a decoding result of the downlink control message and the downlink shared message by a UE being successful.

Aspect 36: The method of any of aspects 103 through 106, further comprising: transmitting a downlink control message, wherein the reception of the hybrid automatic repeat request feedback is based at least in part on a decoding result of the downlink shared message by a UE being unsuccessful and a decoding result of the downlink control message by the UE being successful, the hybrid automatic repeat request feedback comprising a negative acknowledgement.

Aspect 37: The method of any of aspects 103 through 107, wherein the codebook type is associated with a one bit hybrid automatic repeat request feedback size.

Aspect 38: The method of any of aspects 103 through 108, further comprising: transmitting a first message indicating a first set of resources for the hybrid automatic repeat request feedback associated with the downlink shared message and a second message indicating a second set of resources for a second hybrid automatic repeat request feedback associated with a second downlink shared message, the first set of resources and the second set of resources associated with unique time resources.

Aspect 39: The method of any of aspects 103 through 109, wherein receiving the hybrid automatic repeat request feedback comprises receiving an uplink control message comprising the hybrid automatic repeat request feedback.

Aspect 40: The apparatus of any of aspects 103 through 110, wherein transmitting the indication of the codebook type comprises transmitting a radio resource control message comprising the indication of the codebook type.

Aspect 41: A method for wireless communications at a network device, comprising: transmitting an indication of a codebook type for hybrid automatic repeat request feedback, the codebook type indicating a hybrid automatic repeat request codebook size and usage of downlink assignment index counters included in downlink control information; transmitting one or more downlink assignment index counters indicating a total number of scheduled downlink shared messages; transmitting the scheduled downlink shared messages; and receiving a hybrid automatic repeat request feedback transmission in accordance with the codebook type.

Aspect 42: The method of aspect 112, wherein the hybrid automatic repeat request codebook size is equal to one bit.

Aspect 43: The method of aspect 113, wherein receiving the hybrid automatic repeat request feedback comprises receiving a positive acknowledgement, wherein the positive acknowledgement comprises: the one bit; and determining that a UE successfully decoded the scheduled downlink shared messages based at least in part on the positive acknowledgement.

Aspect 44: The method of any of aspects 113 through 114, wherein receiving the hybrid automatic repeat request feedback comprises: receiving a negative acknowledgement, wherein the negative acknowledgement comprises the one bit; and determining that a UE unsuccessfully decoded at least one downlink shared message of the scheduled downlink shared messages based at least in part on the negative acknowledgement.

Aspect 45: The method of any of aspects 113 through 115, further comprising: determining a failure by the network device to receive a second hybrid automatic repeat request feedback; and determining that a UE unsuccessfully decoded each downlink shared message included in a second set of scheduled downlink shared messages based at least in part on the failure.

Aspect 46: The method of any of aspects 112 through 116, wherein the hybrid automatic repeat request codebook size is equal to two bits.

Aspect 47: The method of aspect 117, wherein receiving the hybrid automatic repeat request feedback comprises: receiving a two-bit hybrid automatic repeat request feedback transmission indicating that a UE successfully decoded the scheduled downlink shared messages.

Aspect 48: The method of any of aspects 117 through 118, further comprising: receiving a two-bit hybrid automatic repeat request feedback transmission indicating that a UE unsuccessfully decoded one downlink shared message of the scheduled downlink shared messages.

Aspect 49: The method of any of aspects 117 through 119, further comprising: receiving a two-bit hybrid automatic repeat request feedback transmission indicating that a UE unsuccessfully decoded two downlink shared messages of the scheduled downlink shared messages.

Aspect 50: The method of any of aspects 117 through 120, further comprising: receiving a two-bit hybrid automatic repeat request feedback transmission indicating that a UE unsuccessfully decoded more than two downlink shared messages of the scheduled downlink shared messages.

Aspect 51: The method of any of aspects 117 through 121, wherein the hybrid automatic repeat request codebook size and a hybrid automatic repeat request codebook configuration are predefined, where a bit combination included in a hybrid automatic repeat request codebook is based at least in part on a number of downlink shared messages successfully decoded by a UE.

Aspect 52: The method of any of aspects 112 through 122, wherein receiving the hybrid automatic repeat request feedback transmission comprises: receiving the hybrid automatic repeat request feedback transmission indicating that a UE unsuccessfully decoded more than one downlink shared message of a second set of scheduled downlink shared messages; and transmitting a re-transmitted downlink shared message for each of the scheduled downlink shared messages.

Aspect 53: The method of aspect 123, further comprising: encoding each of the scheduled downlink shared messages via a bit-wise Exclusive OR network encoding procedure; and re-transmitting the encoded scheduled downlink shared messages in a single downlink transmission.

Aspect 54: The method of any of aspects 112 through 124, further comprising: transmitting a downlink control information message indicating the hybrid automatic repeat request codebook size.

Aspect 55: The method of any of aspects 112 through 125, wherein the hybrid automatic repeat request codebook size is predefined.

Aspect 56: The method of any of aspects 112 through 126, further comprising: transmitting a message indicating a downlink shared channel re-transmission configuration, the downlink shared channel re-transmission configuration based at least in part on a network encoding scheme, the hybrid automatic repeat request codebook size, a number of scheduled downlink shared messages, or a combination thereof.

Aspect 57: The method of any of aspects 112 through 127, further comprising: transmitting a message indicating a channel quality indicator table, the channel quality indicator table being associated with the codebook type.

Aspect 58: The method of any of aspects 112 through 128, wherein transmitting the one or more downlink assignment index counters comprises: transmitting one or more counter downlink assignment indices indicating a number of scheduled downlink shared messages; and transmitting one or more total downlink assignment indices indicating a number of scheduled downlink shared messages across multiple component carriers, wherein the hybrid automatic repeat request feedback is based at on the one or more counter downlink assignment indices and the one or more total downlink assignment indices.

Aspect 59: The method of any of aspects 112 through 129, wherein transmitting the indication of the codebook type comprises: transmitting a radio resource control message comprising the indication of the codebook type.

Aspect 60: An apparatus for wireless communications at a UE, comprising a processor; memory coupled with the processor; the processor configured to perform a method of any of aspects 72 through 81.

Aspect 61: An apparatus for wireless communications at a UE, comprising at least one means for performing a method of any of aspects 72 through 81.

Aspect 62: A non-transitory computer-readable medium storing code for wireless communications at a UE, the code comprising instructions executable by a processor to perform a method of any of aspects 72 through 81.

Aspect 63: An apparatus for wireless communications at a UE, comprising a processor; memory coupled with processor; the processor configured to perform a method of any of aspects 82 through 102.

Aspect 64: An apparatus for wireless communications at a UE, comprising at least one means for performing a method of any of aspects 82 through 102.

Aspect 65: A non-transitory computer-readable medium storing code for wireless communications at a UE, the code comprising instructions executable by a processor to perform a method of any of aspects 82 through 102.

Aspect 66: An apparatus for wireless communications at a network device, comprising a processor; memory coupled with the processor; the processor configured to perform a method of any of aspects 103 through 111.

Aspect 67: An apparatus for wireless communications at a network device, comprising at least one means for performing a method of any of aspects 103 through 111.

Aspect 68: A non-transitory computer-readable medium storing code for wireless communications at a network device, the code comprising instructions executable by a processor to perform a method of any of aspects 103 through 111.

Aspect 69: An apparatus for wireless communications at a network device, comprising a processor; memory coupled with the processor; the processor configured to perform a method of any of aspects 112 through 130.

Aspect 70: An apparatus for wireless communications at a network device, comprising at least one means for performing a method of any of aspects 112 through 130.

Aspect 71: A non-transitory computer-readable medium storing code for wireless communications at a network device, the code comprising instructions executable by a processor to perform a method of any of aspects 112 through 130.

Aspect 72: A method for wireless communications at a UE, comprising: receiving an indication of a codebook type for transmitting hybrid automatic repeat request feedback by the UE, the indication of the codebook type indicating a static hybrid automatic repeat request feedback codebook, wherein the indicated static hybrid automatic repeat request feedback codebook is associated with a fixed codebook size; receiving a downlink shared channel transmission; decoding the received downlink shared channel transmission; and transmitting the hybrid automatic repeat request feedback based at least in part on the decoding of the received downlink shared channel transmission and in accordance with the codebook type.

Aspect 73: The method of aspect 72, wherein transmitting the hybrid automatic repeat request feedback further comprises: transmitting a positive acknowledgement that the UE successfully decoded the received downlink shared channel transmission.

Aspect 74: The method of any of aspects 72 through 73, further comprising: determining that the UE unsuccessfully decoded a second downlink shared channel transmission; and determining to refrain from transmitting a second hybrid automatic repeat request feedback transmission based at least in part on the decoding of the second downlink shared channel transmission being unsuccessful.

Aspect 75: The method of any of aspects 72 through 74, further comprising: receiving a downlink control channel transmission, the downlink control channel transmission associated with the received downlink shared channel transmission; and decoding the received downlink control channel transmission, wherein transmitting the hybrid automatic repeat request feedback is based at least in part on the decoding of the received downlink control channel transmission and the received downlink shared channel transmission being successful.

Aspect 76: The method of any of aspects 72 through 75, further comprising: decoding a received downlink control channel transmission, the received downlink control channel transmission associated with a second downlink shared channel transmission; determining that the UE unsuccessfully decoded the second downlink shared channel transmission; and transmitting a second hybrid automatic repeat request feedback based at least in part on the decoding of the second downlink shared channel transmission being unsuccessful and the decoding of the received downlink control channel transmission being successful, the second hybrid automatic repeat request feedback comprising a negative acknowledgement.

Aspect 77: The method of any of aspects 72 through 76, wherein the codebook type is associated with a one bit hybrid automatic repeat request feedback size for transmitting the hybrid automatic repeat request feedback by the UE.

Aspect 78: The method of any of aspects 72 through 77, further comprising: receiving a first message indicating of a first set of resources for transmitting the hybrid automatic repeat request feedback associated with the downlink shared channel transmission and a second message indicating a second set of resources for transmitting a second hybrid automatic repeat request feedback associated with a second downlink shared channel transmission, the first set of resources and the second set of resources associated with unique time resources.

Aspect 79: The method of any of aspects 72 through 78, further comprising: receiving a first message indicating a first set of resources for transmitting the hybrid automatic repeat request feedback associated with the downlink shared channel transmission and a second message indicating a second set of resources for transmitting a second hybrid automatic repeat request feedback associated with a second downlink shared channel transmission, the first set of resources and the second set of resources overlapping in time; and determining an error associated with the first set of resources and the second set of resources based at least in part on the first set of resources and the second set of resources overlapping in time.

Aspect 80: The method of any of aspects 72 through 79, wherein transmitting the hybrid automatic repeat request feedback further comprises: transmitting an uplink control channel transmission comprising the hybrid automatic repeat request feedback.

Aspect 81: The method of any of aspects 72 through 80, wherein receiving the indication of the codebook type further comprises: receiving a radio resource control message comprising the indication of the codebook type.

Aspect 82: A method for wireless communications at a UE, comprising: receiving an indication of a codebook type for transmitting hybrid automatic repeat request feedback by the UE, the codebook type indicating a hybrid automatic repeat request codebook size and usage of downlink assignment index counters included in downlink control information; receiving one or more downlink assignment index counters indicating a total number of scheduled downlink shared channel transmissions; receiving the scheduled downlink shared channel transmissions; decoding the received scheduled downlink shared channel transmissions; and transmitting the hybrid automatic repeat request feedback based at least in part on the decoding of the received scheduled downlink shared channel transmissions, the received downlink assignment index counter, and in accordance with the codebook type.

Aspect 83: The method of aspect 82, wherein the hybrid automatic repeat request codebook size is equal to one bit.

Aspect 84: The method of aspect 83, wherein transmitting the hybrid automatic repeat request feedback further comprises: transmitting a positive acknowledgement based at least in part on the decoding of the scheduled downlink shared channel transmissions being successful, wherein the positive acknowledgement comprises the one bit.

Aspect 85: The method of any of aspects 83 through 84, further comprising: determining that the UE unsuccessfully decoded at least one downlink shared channel transmission of a second set of scheduled downlink shared channel transmissions; and transmitting a negative acknowledgement based at least in part on the decoding of the at least one downlink shared channel transmission being unsuccessful, wherein the negative acknowledgement comprises the one bit.

Aspect 86: The method of any of aspects 83 through 85, further comprising: determining that the UE unsuccessfully decoded each downlink shared channel transmission included in a second set of scheduled downlink shared channel transmissions; and determining to refrain from transmitting a second hybrid automatic repeat request feedback based at least in part on the decoding of each of the downlink shared channel transmission included in the second set of scheduled downlink shared channel transmissions being unsuccessful.

Aspect 87: The method of any of aspects 82 through 86, wherein the hybrid automatic repeat request codebook size is equal to two bits.

Aspect 88: The method of aspect 87, wherein transmitting the hybrid automatic repeat request feedback further comprises: transmitting a two-bit hybrid automatic repeat request feedback transmission indicating that the UE successfully decoded the received scheduled downlink shared channel transmissions.

Aspect 89: The method of any of aspects 87 through 88, further comprising: determining that the UE unsuccessfully decoded one downlink shared channel transmission of a second set of scheduled downlink shared channel transmissions; and transmitting a two-bit hybrid automatic repeat request feedback transmission indicating that the UE unsuccessfully decoded one downlink shared channel transmission of the second set of scheduled downlink shared channel transmissions.

Aspect 90: The method of any of aspects 87 through 89, further comprising: determining that the UE unsuccessfully decoded two downlink shared channel transmissions of a second set of scheduled downlink shared channel transmissions; and transmitting a two-bit hybrid automatic repeat request feedback transmission indicating that the UE unsuccessfully decoded two downlink shared channel transmissions of the second set of scheduled downlink shared channel transmissions.

Aspect 91: The method of any of aspects 87 through 90, further comprising: determining that the UE unsuccessfully decoded more than two downlink shared channel transmissions of a second set of scheduled downlink shared channel transmissions; and transmitting a two-bit hybrid automatic repeat request feedback transmission indicating that the UE unsuccessfully decoded more than two downlink shared channel transmissions of the second set of scheduled downlink shared channel transmissions.

Aspect 92: The method of any of aspects 87 through 91, wherein the hybrid automatic repeat request codebook size and a hybrid automatic repeat request codebook configuration are predefined, a bit combination included in a hybrid automatic repeat request codebook based at least in part on a number of downlink shared channel transmissions successfully decoded by the UE.

Aspect 93: The method of any of aspects 82 through 92, further comprising: transmitting a second hybrid automatic repeat request feedback transmission indicating that the UE unsuccessfully decoded more than one downlink shared channel transmissions of a second set of scheduled downlink shared channel transmissions; and receiving a re-transmitted downlink shared channel transmission for each downlink shared channel transmission included in the second set of scheduled downlink shared channel transmissions.

Aspect 94: The method of any of aspects 82 through 93, further comprising: transmitting a second hybrid automatic repeat request feedback transmission indicating that the UE unsuccessfully decoded one downlink shared channel transmissions of a second set of scheduled downlink shared channel transmissions; and receiving a re-transmitted downlink shared channel transmission that is a bit-wise Exclusive OR of each downlink shared channel transmission included in the second set of scheduled downlink shared channel transmissions.

Aspect 95: The method of any of aspects 82 through 94, further comprising: receiving a re-transmitted downlink shared channel transmission, a configuration of the re-transmission based at least in part on the hybrid automatic repeat request feedback, wherein the configuration comprises a number of retransmissions, a network encoding scheme, or a combination thereof.

Aspect 96: The method of any of aspects 82 through 95, further comprising: receiving a downlink control information message indicating the hybrid automatic repeat request codebook size.

Aspect 97: The method of any of aspects 82 through 96, wherein the hybrid automatic repeat request codebook size is predefined.

Aspect 98: The method of any of aspects 82 through 97, further comprising: comparing a number of scheduled downlink shared channel transmissions to a threshold; and determining the hybrid automatic repeat request codebook size based at least in part on the comparison.

Aspect 99: The method of any of aspects 82 through 98, further comprising: receiving a message indicating a downlink shared channel re-transmission configuration, the downlink shared channel re-transmission configuration based at least in part on a network encoding scheme, the hybrid automatic repeat request codebook size, a number of scheduled downlink shared channel transmissions, or a combination thereof.

Aspect 100: The method of any of aspects 82 through 99, further comprising: receiving a message indicating a channel quality indicator table, the channel quality indicator table associated with the codebook type.

Aspect 101: The method of any of aspects 82 through 100, wherein receiving the one or more downlink assignment index counters further comprises: receiving one or more counter downlink assignment indices indicating a number of scheduled downlink shared channel transmissions; receiving one or more total downlink assignment indices indicating a number of scheduled downlink shared channel transmissions across multiple component carriers; and determining a number of downlink shared channel transmissions the UE unsuccessfully decoded based at least in part on the one or more counter downlink assignment indices and the one or more total downlink assignment indices.

Aspect 102: The method of any of aspects 82 through 101, wherein receiving the indication of the codebook type further comprises: receiving a radio resource control signaling message comprising the indication of the codebook type.

Aspect 103: A method for wireless communications at a base station, comprising: transmitting an indication of a codebook type for transmitting hybrid automatic repeat request feedback by the UE, the indication of the codebook type indicating a static hybrid automatic repeat request feedback codebook, wherein the indicated static hybrid automatic repeat request feedback codebook is associated with a fixed codebook size; transmitting a downlink shared channel transmission; and receiving the hybrid automatic repeat request feedback in accordance with the codebook type.

Aspect 104: The method of aspect 103, wherein receiving the hybrid automatic repeat request feedback further comprises: receiving a positive acknowledgement that the UE successfully decoded the downlink shared channel transmission.

Aspect 105: The method of any of aspects 103 through 104, further comprising: determining a failure by the base station to receive a second a second hybrid automatic repeat request feedback transmission associated with a second downlink shared channel transmission; and retransmitting the second downlink shared channel transmission based at least in part on the failure by the base station to receive the second hybrid automatic repeat request feedback transmission.

Aspect 106: The method of any of aspects 103 through 105, further comprising: transmitting a downlink control channel transmission, the downlink control channel transmission associated with the downlink shared channel transmission, wherein receiving the hybrid automatic repeat request feedback is based at least in part on decoding of the downlink control channel transmission and the downlink shared channel transmission by the UE being successful.

Aspect 107: The method of any of aspects 103 through 106, further comprising: transmitting a downlink control channel transmission, wherein receiving the hybrid automatic repeat request feedback is based at least in part on decoding of the downlink shared channel transmission by the UE being unsuccessful and decoding of the downlink control channel transmission by the UE being successful, the hybrid automatic repeat request feedback comprising a negative acknowledgement.

Aspect 108: The method of any of aspects 103 through 107, wherein the codebook type is associated with a one bit hybrid automatic repeat request feedback size.

Aspect 109: The method of any of aspects 103 through 108, further comprising: transmitting a first message indicating of a first set of resources for the hybrid automatic repeat request feedback associated with the downlink shared channel transmission and a second message indicating a second set of resources for a second hybrid automatic repeat request feedback associated with a second downlink shared channel transmission, the first set of resources and the second set of resources associated with unique time resources.

Aspect 110: The method of any of aspects 103 through 109, wherein receiving the hybrid automatic repeat request feedback further comprises: receiving an uplink control channel transmission comprising the hybrid automatic repeat request feedback.

Aspect 111: The method of any of aspects 103 through 110, wherein transmitting the indication of the codebook type further comprises: transmitting a radio resource control message comprising the indication of the codebook type.

Aspect 112: A method for wireless communications at a base station, comprising: transmitting an indication of a codebook type for transmitting hybrid automatic repeat request feedback by the UE, the codebook type indicating a hybrid automatic repeat request codebook size and usage of downlink assignment index counters included in downlink control information; transmitting one or more downlink assignment index counters indicating a total number of scheduled downlink shared channel transmissions; transmitting the scheduled downlink shared channel transmissions; and receiving a hybrid automatic repeat request feedback transmission in accordance with the codebook type.

Aspect 113: The method of aspect 112, wherein the hybrid automatic repeat request codebook size is equal to one bit.

Aspect 114: The method of aspect 113, wherein receiving the hybrid automatic repeat request feedback further comprises: receiving a positive acknowledgement, wherein the positive acknowledgement comprises the one bit; and determining that the UE successfully decoded the scheduled downlink shared channel transmissions based at least in part on the positive acknowledgement.

Aspect 115: The method of any of aspects 113 through 114, wherein receiving the hybrid automatic repeat request feedback further comprises: receiving a negative acknowledgement, wherein the negative acknowledgement comprises the one bit; and determining that the UE unsuccessfully decoded at least one downlink shared channel transmission of the scheduled downlink shared channel transmissions based at least in part on the negative acknowledgement.

Aspect 116: The method of any of aspects 113 through 115, further comprising: determining a failure by the base station to receive a second hybrid automatic repeat request feedback; and determining that the UE unsuccessfully decoded each downlink shared channel transmission included in a second set of scheduled downlink shared channel transmissions based at least in part on the failure.

Aspect 117: The method of any of aspects 112 through 116, wherein the hybrid automatic repeat request codebook size is equal to two bits.

Aspect 118: The method of aspect 117, wherein receiving the hybrid automatic repeat request feedback further comprises: receiving a two-bit hybrid automatic repeat request feedback transmission indicating that the UE successfully decoded the scheduled downlink shared channel transmissions.

Aspect 119: The method of any of aspects 117 through 118, further comprising: receiving a two-bit hybrid automatic repeat request feedback transmission indicating that the UE unsuccessfully decoded one downlink shared channel transmission of the scheduled downlink shared channel transmissions.

Aspect 120: The method of any of aspects 117 through 119, further comprising: receiving a two-bit hybrid automatic repeat request feedback transmission indicating that the UE unsuccessfully decoded two downlink shared channel transmissions of the scheduled downlink shared channel transmissions.

Aspect 121: The method of any of aspects 117 through 120, further comprising: receiving a two-bit hybrid automatic repeat request feedback transmission indicating that the UE unsuccessfully decoded more than two downlink shared channel transmissions of the scheduled downlink shared channel transmissions.

Aspect 122: The method of any of aspects 117 through 121, wherein the hybrid automatic repeat request codebook size and a hybrid automatic repeat request codebook configuration are predefined, a bit combination included in a hybrid automatic repeat request codebook based at least in part on a number of downlink shared channel transmissions successfully decoded by the UE.

Aspect 123: The method of any of aspects 112 through 122, wherein receiving the hybrid automatic repeat request feedback transmission further comprises: receiving the hybrid automatic repeat request feedback transmission indicating that the UE unsuccessfully decoded more than one downlink shared channel transmission of a second set of scheduled downlink shared channel transmissions; and transmitting a re-transmitted downlink shared channel transmission for each of the scheduled downlink shared channel transmissions.

Aspect 124: The method of aspect 123, further comprising: encoding each of the scheduled downlink shared channel transmissions via a bit-wise Exclusive OR network encoding procedure; and re-transmitting the encoded scheduled downlink shared channel transmissions in a single downlink transmission.

Aspect 125: The method of any of aspects 112 through 124, further comprising: transmitting a downlink control information message indicating the hybrid automatic repeat request codebook size.

Aspect 126: The method of any of aspects 112 through 125, wherein the hybrid automatic repeat request codebook size is predefined.

Aspect 127: The method of any of aspects 112 through 126, further comprising: transmitting a message indicating a downlink shared channel re-transmission configuration, the downlink shared channel re-transmission configuration based at least in part on a network encoding scheme, the hybrid automatic repeat request codebook size, a number of scheduled downlink shared channel transmissions, or a combination thereof.

Aspect 128: The method of any of aspects 112 through 127, further comprising: transmitting a message indicating a channel quality indicator table, the channel quality indicator table associated with the codebook type.

Aspect 129: The method of any of aspects 112 through 128, wherein transmitting the one or more downlink assignment index counters further comprises: transmitting one or more counter downlink assignment indices indicating a number of scheduled downlink shared channel transmissions; and transmitting one or more total downlink assignment indices indicating a number of scheduled downlink shared channel transmissions across multiple component carriers, wherein the hybrid automatic repeat request feedback is based at on the one or more counter downlink assignment indices and the one or more total downlink assignment indices.

Aspect 130: The method of any of aspects 112 through 129, wherein transmitting the indication of the codebook type further comprises: transmitting a radio resource control message comprising the indication of the codebook type.

Aspect 131: An apparatus for wireless communications at a UE, comprising a processor; memory coupled with the processor, the processor configured to perform a method of any of aspects 72 through 81.

Aspect 132: An apparatus for wireless communications at a UE, comprising at least one means for performing a method of any of aspects 72 through 81.

Aspect 133: A non-transitory computer-readable medium storing code for wireless communications at a UE, the code comprising instructions executable by a processor to perform a method of any of aspects 72 through 81.

Aspect 134: An apparatus for wireless communications at a UE, comprising a processor; memory coupled with the processor, the processor configured to perform a method of any of aspects 82 through 102.

Aspect 135: An apparatus for wireless communications at a UE, comprising at least one means for performing a method of any of aspects 82 through 102.

Aspect 136: A non-transitory computer-readable medium storing code for wireless communications at a UE, the code comprising instructions executable by a processor to perform a method of any of aspects 82 through 102.

Aspect 137: An apparatus for wireless communications at a base station, comprising a processor; memory coupled with the processor, the processor configured to perform a method of any of aspects 103 through 111.

Aspect 138: An apparatus for wireless communications at a base station, comprising at least one means for performing a method of any of aspects 103 through 111.

Aspect 139: A non-transitory computer-readable medium storing code for wireless communications at a base station, the code comprising instructions executable by a processor to perform a method of any of aspects 103 through 111.

Aspect 140: An apparatus for wireless communications at a base station, comprising a processor; memory coupled with the processor, the processor configured to perform a method of any of aspects 112 through 130.

Aspect 141: An apparatus for wireless communications at a base station, comprising at least one means for performing a method of any of aspects 112 through 130.

Aspect 142: A non-transitory computer-readable medium storing code for wireless communications at a base station, the code comprising instructions executable by a processor to perform a method of any of aspects 112 through 130.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories storing processor-executable code; and
   one or more processors coupled with the one or more memories and individually or collectively operable to execute the code to cause the UE to:
      receive an indication of a codebook type for hybrid automatic repeat request feedback, the codebook type indicating a hybrid automatic repeat request codebook size and usage of downlink assignment index counters included in downlink control information;
      receive one or more downlink assignment index counters that indicate a total number of scheduled downlink shared messages;
      receive the scheduled downlink shared messages; and
      transmit the hybrid automatic repeat request feedback based at least in part on a decoding result of the received scheduled downlink shared messages, the received downlink assignment index counter, and in accordance with the codebook type.

2. The UE of claim 1, wherein the hybrid automatic repeat request codebook size is equal to one bit.

3. The UE of claim 2, further comprising:
   an antenna panel, wherein the one or more processors and the antenna panel are individually or collectively further operable to execute the code to cause the UE to:
      transmit a positive acknowledgement based at least in part on the decoding result of the scheduled downlink shared messages being successful, wherein the positive acknowledgement comprises the one bit.

4. The UE of claim 2, wherein the one or more processors are individually or collectively further operable to execute the code to cause the UE to:
   determine that the UE unsuccessfully decoded at least one downlink shared message of a second set of scheduled downlink shared messages; and
   transmit a negative acknowledgement based at least in part on the at least one downlink shared message being unsuccessfully decoded, wherein the negative acknowledgement comprises the one bit.

5. The UE of claim 2, wherein the one or more processors are individually or collectively further operable to execute the code to cause the UE to:
   determine that the UE unsuccessfully decoded each downlink shared message included in a second set of scheduled downlink shared messages; and
   determine to refrain from a transmission of a second hybrid automatic repeat request feedback based at least in part on each downlink shared message included in the second set of scheduled downlink shared messages being unsuccessfully decoded.

6. The UE of claim 1, wherein the hybrid automatic repeat request codebook size is equal to two bits.

7. The UE of claim 6, further comprising:
   an antenna panel, wherein the one or more processors and the antenna panel are individually or collectively further operable to execute the code to cause the UE to:
      transmit a two-bit hybrid automatic repeat request feedback transmission that indicate that the UE successfully decoded the received scheduled downlink shared messages.

8. The UE of claim 6, wherein the one or more processors are individually or collectively further operable to execute the code to cause the UE to:
   determine that the UE unsuccessfully decoded one downlink shared message of a second set of scheduled downlink shared messages; and
   transmit a two-bit hybrid automatic repeat request feedback transmission that indicates that the UE unsuccessfully decoded one downlink shared message of the second set of scheduled downlink shared messages.

9. The UE of claim 6, wherein the one or more processors are individually or collectively further operable to execute the code to cause the UE to:
   determine that the UE unsuccessfully decoded two downlink shared messages of a second set of scheduled downlink shared messages; and
   transmit a two-bit hybrid automatic repeat request feedback transmission that indicates that the UE unsuccessfully decoded two downlink shared messages of the second set of scheduled downlink shared messages.

10. The UE of claim 6, wherein the one or more processors are individually or collectively further operable to execute the code to cause the UE to:
    determine that the UE unsuccessfully decoded more than two downlink shared messages of a second set of scheduled downlink shared messages; and
    transmit a two-bit hybrid automatic repeat request feedback transmission that indicates that the UE unsuccessfully decoded more than two downlink shared messages of the second set of scheduled downlink shared messages.

11. The UE of claim 6, wherein the hybrid automatic repeat request codebook size and a hybrid automatic repeat request codebook configuration are predefined, and wherein a bit combination included in a hybrid automatic repeat request codebook is based at least in part on a number of downlink shared messages successfully decoded by the UE.

12. The UE of claim 1, wherein the one or more processors are individually or collectively further operable to execute the code to cause the UE to:
    transmit a second hybrid automatic repeat request feedback transmission that indicates that the UE unsuccessfully decoded more than one downlink shared messages of a second set of scheduled downlink shared messages; and
    receive a re-transmitted downlink shared message for each downlink shared message included in the second set of scheduled downlink shared messages.

13. The UE of claim 1, wherein the one or more processors are individually or collectively further operable to execute the code to cause the UE to:
    transmit a second hybrid automatic repeat request feedback transmission that indicates that the UE unsuccessfully decoded one downlink shared messages of a second set of scheduled downlink shared messages; and
    receive a re-transmitted downlink shared message that is a bit-wise Exclusive OR of each downlink shared message included in the second set of scheduled downlink shared messages.

14. The UE of claim 1, wherein the one or more processors are individually or collectively further operable to execute the code to cause the UE to:

receive a re-transmitted downlink shared message, wherein a configuration of the re-transmitted downlink shared message is based at least in part on the hybrid automatic repeat request feedback, and wherein the configuration comprises a number of retransmissions, a network encoding scheme, or a combination thereof.

15. The UE of claim 1, wherein the one or more processors are individually or collectively further operable to execute the code to cause the UE to:
compare a number of scheduled downlink shared messages to a threshold; and
determine the hybrid automatic repeat request codebook size based at least in part on the comparison.

16. The UE of claim 1, wherein the one or more processors are individually or collectively further operable to execute the code to cause the UE to:
receive a message that indicates a downlink shared channel re-transmission configuration, the downlink shared channel re-transmission configuration based at least in part on a network encoding scheme, the hybrid automatic repeat request codebook size, a number of scheduled downlink shared messages, or a combination thereof.

17. The UE of claim 1, wherein the one or more processors are individually or collectively further operable to execute the code to cause the UE to:
receive a message that indicates a channel quality indicator table, the channel quality indicator table being associated with the codebook type.

18. The UE of claim 1, wherein, to receive the one or more downlink assignment index counters, the one or more processors are individually or collectively further operable to execute the code to cause the UE to:
receive one or more counter downlink assignment indices that indicate a number of scheduled downlink shared messages;
receive one or more total downlink assignment indices that indicate a number of scheduled downlink shared messages across multiple component carriers; and
determine a number of downlink shared messages the UE unsuccessfully decoded based at least in part on the one or more counter downlink assignment indices and the one or more total downlink assignment indices.

19. A network device for wireless communications, comprising:
a one or more memories storing processor-executable code; and
one or more processors coupled with the one or more memories and individually or collectively operable to execute the code to cause the network device to:
transmit an indication of a codebook type for hybrid automatic repeat request feedback, the codebook type indicating a hybrid automatic repeat request codebook size and usage of downlink assignment index counters included in downlink control information;
transmit one or more downlink assignment index counters that indicate a total number of scheduled downlink shared messages;
transmit the scheduled downlink shared messages; and
receive a hybrid automatic repeat request feedback transmission in accordance with the codebook type.

20. The network device of claim 19, further comprising an antenna panel, and wherein:
the hybrid automatic repeat request codebook size is equal to one bit; or the hybrid automatic repeat request codebook size is equal to two bits.

21. A method for wireless communications by a user equipment (UE), comprising:
receiving an indication of a codebook type for hybrid automatic repeat request feedback, the codebook type indicating a hybrid automatic repeat request codebook size and usage of downlink assignment index counters included in downlink control information;
receiving one or more downlink assignment index counters that indicate a total number of scheduled downlink shared messages;
receiving the scheduled downlink shared messages; and
transmitting the hybrid automatic repeat request feedback based at least in part on a decoding result of the received scheduled downlink shared messages, the received downlink assignment index counter, and in accordance with the codebook type.

22. The method of claim 21, wherein the hybrid automatic repeat request codebook size is equal to one bit.

23. The method of claim 22, further comprising:
transmitting, by an antenna panel, a positive acknowledgement based at least in part on the decoding result of the scheduled downlink shared messages being successful, wherein the positive acknowledgement comprises the one bit.

24. The method of claim 22, further comprising:
determining that the UE unsuccessfully decoded at least one downlink shared message of a second set of scheduled downlink shared messages; and
transmitting a negative acknowledgement based at least in part on the at least one downlink shared message being unsuccessfully decoded, wherein the negative acknowledgement comprises the one bit.

25. The method of claim 21, wherein the hybrid automatic repeat request codebook size is equal to two bits.

26. The method of claim 25, further comprising:
transmitting, by an antenna panel, a two-bit hybrid automatic repeat request feedback transmission that indicates that the UE successfully decoded the received scheduled downlink shared messages.

27. The method of claim 25, further comprising:
determining that the UE unsuccessfully decoded one downlink shared message of a second set of scheduled downlink shared messages; and
transmitting a two-bit hybrid automatic repeat request feedback transmission that indicates that the UE unsuccessfully decoded one downlink shared message of the second set of scheduled downlink shared messages.

28. The method of claim 25, further comprising:
determining that the UE unsuccessfully decoded two downlink shared messages of a second set of scheduled downlink shared messages; and
transmitting a two-bit hybrid automatic repeat request feedback transmission that indicates that the UE unsuccessfully decoded two downlink shared messages of the second set of scheduled downlink shared messages.

29. The method of claim 25, further comprising:
determining that the UE unsuccessfully decoded more than two downlink shared messages of a second set of scheduled downlink shared messages; and
transmitting a two-bit hybrid automatic repeat request feedback transmission that indicates that the UE unsuccessfully decoded more than two downlink shared messages of the second set of scheduled downlink shared messages.

30. A method for wireless communications by a network device, comprising:
- transmitting an indication of a codebook type for hybrid automatic repeat request feedback, the codebook type indicating a hybrid automatic repeat request codebook size and usage of downlink assignment index counters included in downlink control information;
- transmitting one or more downlink assignment index counters that indicate a total number of scheduled downlink shared messages;
- transmitting the scheduled downlink shared messages; and
- receiving a hybrid automatic repeat request feedback transmission in accordance with the codebook type.

* * * * *